(12) United States Patent
Babaei

(10) Patent No.: US 11,252,714 B1
(45) Date of Patent: Feb. 15, 2022

(54) WIRELESS DEVICE AND WIRELESS NETWORK PROCESSES FOR CONTROL CHANNEL TRANSMISSION

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/392,149

(22) Filed: Aug. 2, 2021

Related U.S. Application Data

(60) Provisional application No. 63/060,040, filed on Aug. 1, 2020.

(51) Int. Cl.
*H04W 72/04* (2009.01)

(52) U.S. Cl.
CPC ..... *H04W 72/042* (2013.01); *H04W 72/0446* (2013.01)

(58) Field of Classification Search
CPC ........... H04W 72/0446; H04W 72/042; H04W 84/06; H04L 5/005; H04L 5/0057; H04L 5/0048; H04L 5/0094
See application file for complete search history.

(56) References Cited

U.S. PATENT DOCUMENTS

| | | | |
|---|---|---|---|
| 10,863,494 B2 * | 12/2020 | Zhang | H04L 5/005 |
| 2020/0287691 A1 * | 9/2020 | Baldemair | H04L 1/18 |
| 2021/0168779 A1 * | 6/2021 | Mondal | H04L 5/0035 |

OTHER PUBLICATIONS

3GPP TS 38.211 V16.2.0 (Jun. 2020); Technical Specification; 3rd Generation Partnership Project; Technical Specification Group Radio Access Network; NR; Physical channels and modulation; (Release 16).
3GPP TS 38.212 V16.2.0 (Jun. 2020); Technical Specification; 3rd Generation Partnership Project; Technical Specification Group Radio Access Network; NR; Multiplexing and channel coding; (Release 16).
3GPP TS 38.213 V16.2.0 (Jun. 2020); Technical Specification; 3rd Generation Partnership Project; Technical Specification Group Radio Access Network; NR; Physical layer procedures for control; (Release 16).

(Continued)

*Primary Examiner* — Wei Zhao
(74) *Attorney, Agent, or Firm* — Alireza Babaei

(57) ABSTRACT

A wireless device receives configuration parameters comprising first configuration parameters of a first search space and second configuration parameters of a second search space. The configuration parameters may comprise at least one configuration parameter indicating that the first search space and the second search space are used together for reception of DCI. The wireless device may receive a first signal associated with a first DCI via a downlink control channel and based on the first configuration parameters of the first search space. The wireless device may receive a second signal associated with a repetition of the first DCI via the downlink control channel and based on the second configuration parameters of the second search space. The wireless device may transmit or receive a transport block based on the first DCI.

20 Claims, 58 Drawing Sheets

(56) References Cited

OTHER PUBLICATIONS

3GPP TS 38.214 V16.2.0 (Jun. 2020); Technical Specification; 3rd Generation Partnership Project; Technical Specification Group Radio Access Network; NR; Physical layer procedures for data; (Release 16).
3GPP TS 38.300 V16.2.0 (Jul. 2020); Technical Specification; 3rd Generation Partnership Project; Technical Specification Group Radio Access Network; NR; NR and NG-RAN Overall Description; Stage 2; (Release 16).
3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).
3GPP TS 38.331 V16.1.0 (Jul. 2020); Technical Specification; 3rd Generation Partnership Project; Technical Specification Group Radio Access Network; NR; Radio Resource Control (RRC); Protocol specification; (Release 16).
3GPP TSG RAN WG1 Meeting #101-e; R1-2003282; eMeeting, May 25-Jun. 5, 2020; Agenda Item: 8.3.3; Source: Futurewei; Title: Coverage recovery for RedCap; Document for: Discussion and decision.
3GPP TSG-RAN WG1 Meeting #101-e; R1-2003291; e-Meeting, May 25-Jun. 5, 2020; Agenda Item: 8.3.3 Source: Ericsson; Title: Functionality for coverage recovery for Redcap; Document for: Discussion and Decision.
3GPP TSG RAN WG1 Meeting #101-e; R1-2003303; E-meeting, May 25-Jun. 5, 2020; Agenda Item: 8.3.3; Source: Huawei, HiSilicon; Title: Functionality for coverage recovery; Document for: Discussion and Decision.
3GPP TSG-RAN WG1 Meeting #101; R1-2003433; e-Meeting, May 25-Jun. 5, 2020; Source: vivo, Guangdong Genius; Title: Discussion on functionality for coverage recovery; Agenda Item: 8.3.3; Document for: Discussion and Decision.
3GPP TSG-RAN WG1 #101; R1-2003558; e-Meeting, May 25-Jun. 5, 2020; Agenda Item: 8.3.3; Source: Panasonic; Title: Functionality for coverage recovery; Document for: Discussion, Decision.
3GPP TSG RAN WG1 Meeting #101; R1-2003646e-Meeting, May 25-Jun. 5, 2020; Source: CATT; Title: Coverage recovery for reduced capability NR devices; Agenda Item: 8.3.3; Document for: Discussion and Decision.
3GPP TSG RAN WG1 Meeting #101-e; R1-2003689; e-Meeting, May 25-Jun. 5, 2020; Agenda Item: 8.3.3; Source: MediaTek Inc.; Title: Discussion on coverage recovery for NR RedCap UEs; Document for: Discussion and Decision.
3GPP TSG RAN WG1 Meeting #101_e; R1-2003772; e-Meeting, May 25-Jun. 5, 2020; Agenda Item: 8.3.3 Source: Intel Corporation; Title: On coverage recovery for RedCap NR UEs; Document for: Discussion/Decision.
3GPP TSG RAN WG1 Meeting #101; R1-2003803; e-Meeting, May 25-Jun. 5, 2020; Source: ZTE; Title: Discussion on functionality for coverage recovery; Agenda item: 8.3.3; Document for: Discussion and Decision.
3GPP TSG RAN WG1 Meeting #101; R1-2003829; E-meeting, May 25-Jun. 5, 2020; Agenda Item: 8.3.3; Source: Lenovo, Motorola Mobility; Title: On coverage enhancement for RedCap; Document for: Discussion and decision.
3GPP TSG RAN WG1 #101-e; R1-2003912; e-Meeting, May 25-Jun. 5, 2020; Agenda Item: 8.3.3; Source: Samsung; Title: Coverage recovery for low capability device; Document for: Discussion and decision.
3GPP TSG RAN WG1 Meeting #101; R1-2003936; e-Meeting, May 25-Jun. 5, 2020; Agenda item: 8.3.3; Source: Nokia, Nokia Shanghai Bell; Title: Functionality for coverage recovery; Document for: Discussion and Decision.
3GPP TSG RAN WG1 #101; R1-2003968; e-Meeting, May 25-Jun. 5, 2020; Source: CMCC; Title: Consideration on coverage recovery for reduced capability NR devices; Agenda item: 8.3.3; Document for: Discussion & Decision.
3GPP TSG RAN WG1 #101; R1-2003998; e-Meeting, May 25-Jun. 5, 2020; Agenda Item: 8.3.3; Source: Spreadtrum Communications; Title: Discussion on functionality for coverage recovery; Document for: Discussion and decision.
3GPP TSG RAN WG1 #101; R1-2004023; e-Meeting, May 25-Jun. 5, 2020; Agenda Item: 8.3.3; Source: LG Electronics; Title: Discussion on the coverage recovery of reduced capability NR devices; Document for: Discussion and decision.
3GPP TSG RAN WG1 #101; R1-2004106; e-Meeting, May 25-Jun. 5, 2020; Source: OPPO; Title: Discussion on functionality for coverage recovery; Agenda Item: 8.3.3; Document for: Discussion.
3GPP TSG RAN WG1 Meeting #101-e; R1-2004195; e-Meeting, May 25-Jun. 5, 2020; Agenda Item: 8.3.3; Source: Sony; Title: Coverage recovery techniques for reduced capability NR devices; Document for: Discussion / Decision.
3GPP TSG-RAN WG1 #101; R1-2004253; e-Meeting, May 25-Jun. 5, 2020; Source: Apple Inc.; Title: Coverage recovery for reduced capability NR devices; Agenda item: 8.3.3; Document for: Discussion and Decision.
3GPP TSG RAN WG1 #101-e; R1-2004317; e-Meeting, May 25-Jun. 5, 2020; Agenda Item: 8.3.3; Source: InterDigital Inc.; Title: Coverage enhancement for reduced capability NR devices; Document for: Discussion.
3GPP TSG RAN WG1 #101; R1-2004337; e-Meeting, May 25-Jun. 5, 2020; Source: Sharp; Title: Coverage recovery for reduced capability UEs; Agenda Item: 8.3.3; Document for: Discussion and Decision.
3GPP TSG RAN WG1 #101; R1-2004423; e-Meeting, May 25-Jun. 5, 2020; Source: NTT Docomo, Inc.; Title: Functionality for coverage recovery for RedCap; Agenda Item: 8.3.3; Document for: Discussion and Decision.
3GPP TSG-RAN WG1 Meeting #101; R1-2004495; e-Meeting, May 25-Jun. 5, 2020; Agenda item: 8.3.3; Source: Qualcomm Incorporated; Title: Considerations for Coverage Recovery of RedCap Devices; Document for: Discussion/Decision.
3GPP TSG RAN WG1 #101; R1-2004532; e-Meeting, May 25-Jun. 5, 2020; Source: Xiaomi; Title: Initial discussion on coverage recovery for reduced capability device; Agenda item: 8.3.3; Document for: Discussion.
3GPP TSG-RAN WG1 #101-e; R1-2004596; e-Meeting, May 25-Jun. 5, 2020; Agenda item: 8.3.3 Functionality for coverage recovery; Title: On coverage recovery for reduced capability UEs; Source: Convida Wireless; Document for: Discussion.
3GPP TSG RAN Meeting #86; RP-193133; Sitges, Spain, Dec. 9-12, 2019; Source: Samsung; Title: New WID: Further enhancements on MIMO for NR; Document for: Approval; Agenda Item: 9.1.1.
3GPP TSG RAN Meeting #86; RP-193238; Sitges, Spain, Dec. 9-12, 2019; Source: Ericsson; Title: New SID on support of reduced capability NR devices; Document for: Information; Agenda Item: 9.1.1.

* cited by examiner

Transmit a capability message comprising an IE indicating a minimum number of symbols to apply a spatial QCL information
5510

Receive configuration parameters, of a 1st CORESET and a 2nd CORESET, indicating 1st symbol(s) for the 1st CORESET and 2nd symbol(s) for the 2nd CORESET
5520

Receive, based on the 1st CORESET and during 1st symbol(s), a 1st signal associated with a DCI
5530

Receive, based on the 2nd CORESET and during 2nd symbol(s), a 2nd signal associated with a repetition of the DCI
5540

Determine the DCI based on the 1st signal and the 2nd signal
5550

Receive a TB based on the DCI

A duration between a last symbol of 2nd symbol(s) and the TB is larger than the minimum number of symbols
5560

FIG. 55

Receive configuration parameters comprising: 1st configuration parameters of a 1st CORESET and a second CORESET, indicating 1st symbol(s) for the 1st CORESET and 2nd symbol(s) for the 2nd CORESET; and a 2nd configuration parameter indicating a value of a DRX timer

5610

Receive, based on the 1st CORESET and during the 1st symbol(s), a 1st signal associated with a 1st DCI

5620

Receive, based on the 2nd CORESET and during the 2nd symbol(s), a 2nd signal associated with a repetition of the 1st DCI

5630

Determine the 1st DCI based on the 1st signal and the second signal

5640 start the DRX timer after a last symbol of the 2nd symbol(s)

WIRELESS DEVICE AND WIRELESS NETWORK PROCESSES FOR CONTROL CHANNEL TRANSMISSION

CROSS-REFERENCE TO RELATED APPLICATIONS

This application claims the benefit of U.S. Provisional Application No. 63/060,040, filed Aug. 1, 2020, which is hereby incorporated by reference in its entirety.

BRIEF DESCRIPTION OF THE DRAWINGS

FIG. 55 shows an example flow diagram in accordance with several of various embodiments of the present disclosure.

FIG. 56 shows an example flow diagram in accordance with several of various embodiments of the present disclosure.

DETAILED DESCRIPTION

The exemplary embodiments of the disclosed technology enable processes for a wireless device and/or one or more base stations for control channel transmission enhancement. The exemplary disclosed embodiments may be implemented in the technical field of wireless communication systems. More particularly, the embodiment of the disclosed technology may relate to enhancement of configuration signaling and control channel transmission processes to enhance the reliability of control channel transmission.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary.

In this disclosure, the terms "mobile communications system" and "wireless communications system" may be used interchangeably.

Figure 1A:
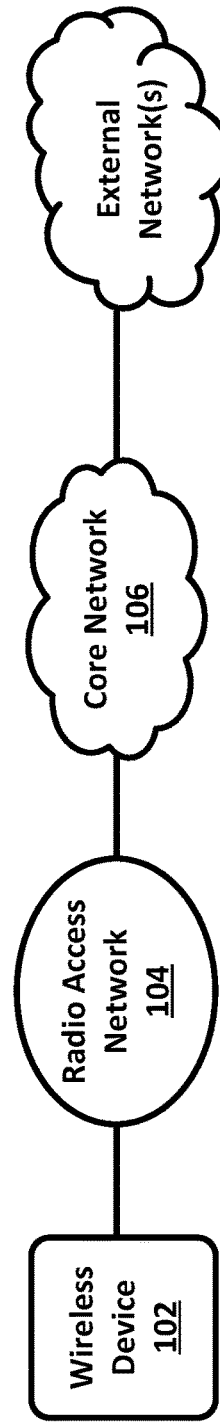
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
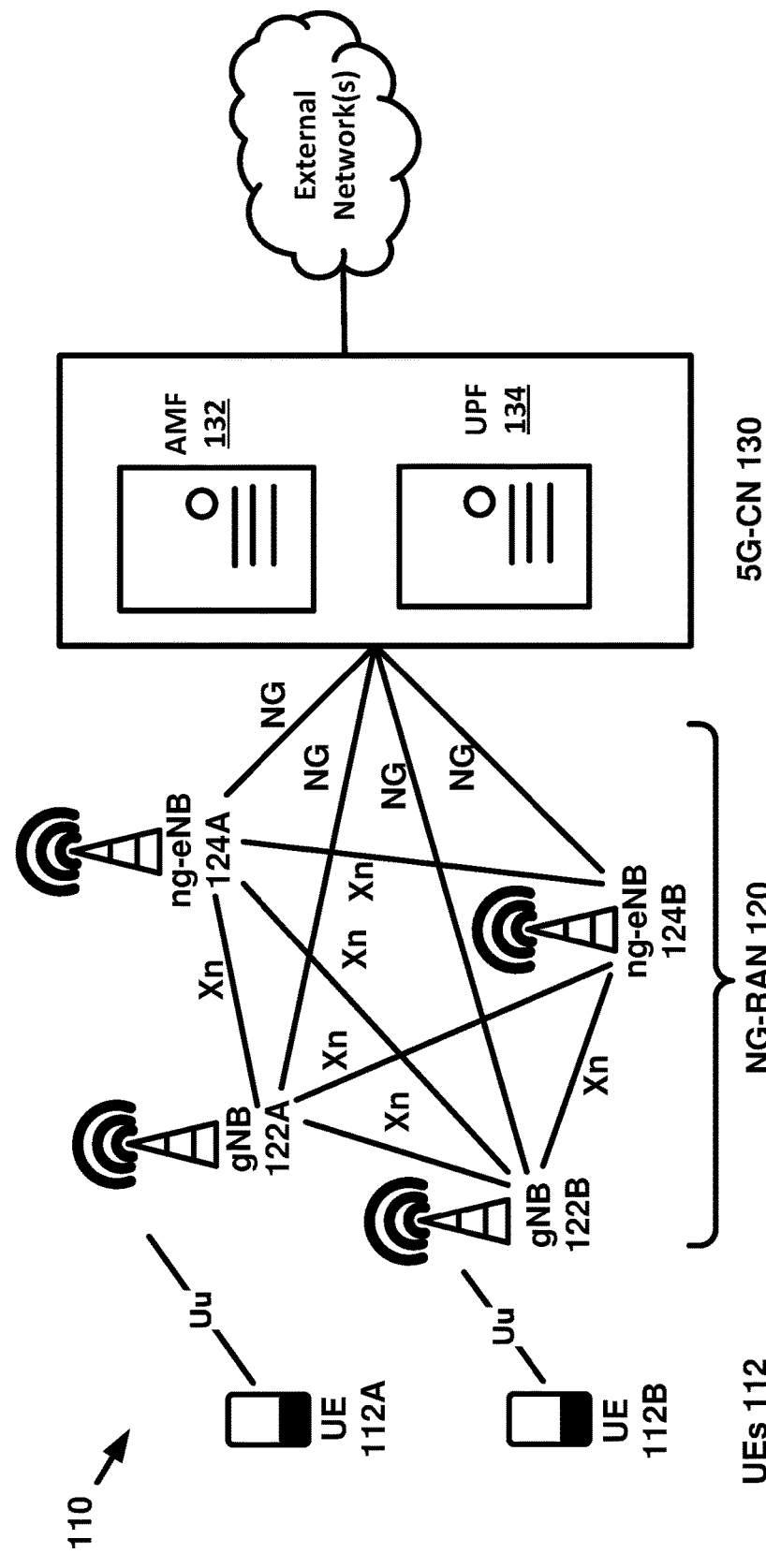

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter- 3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
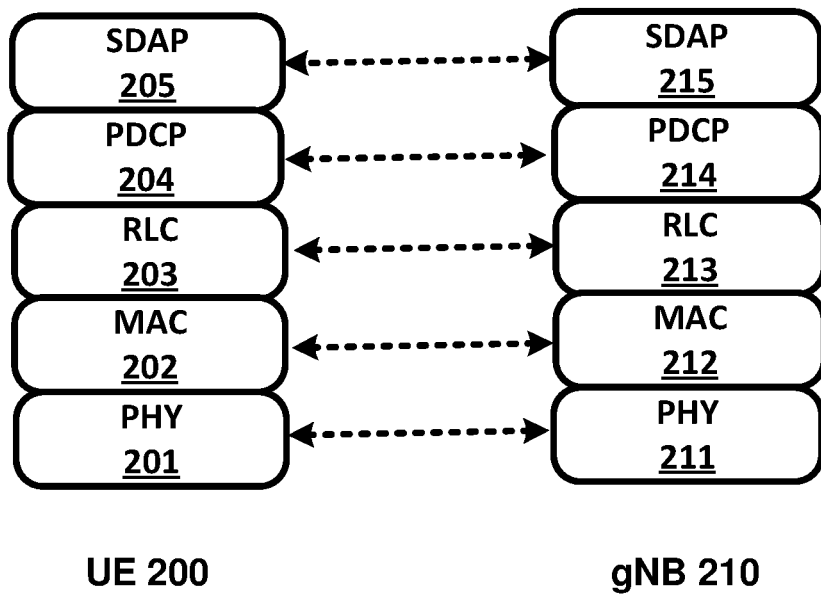
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
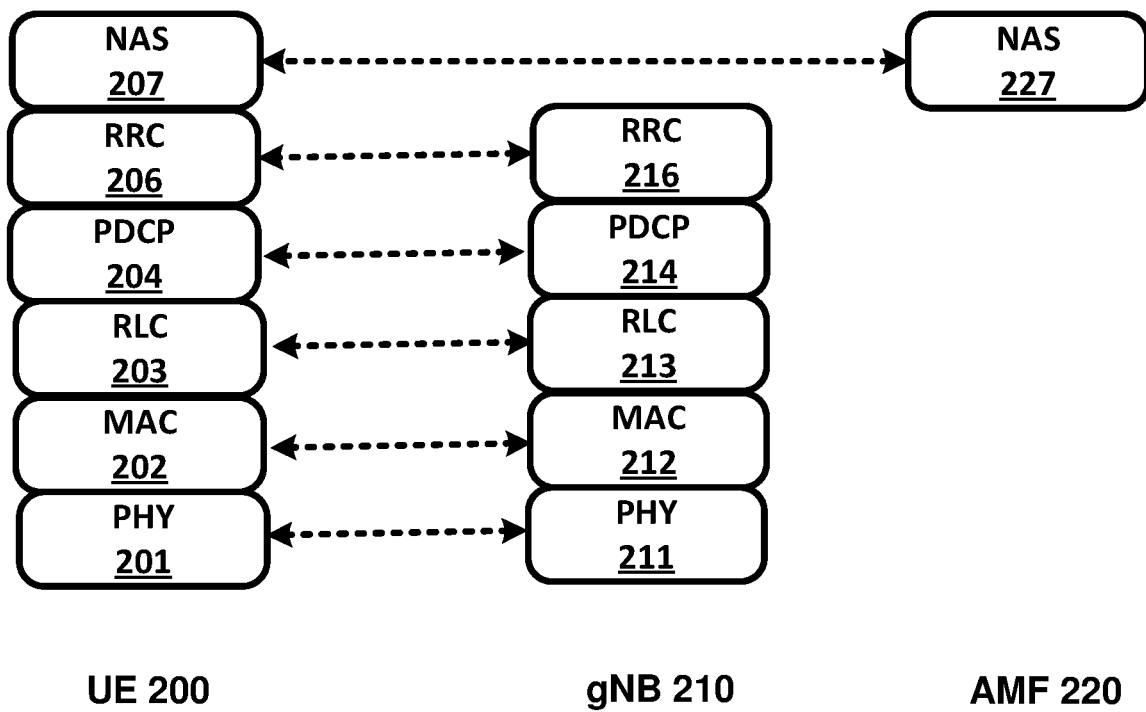

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
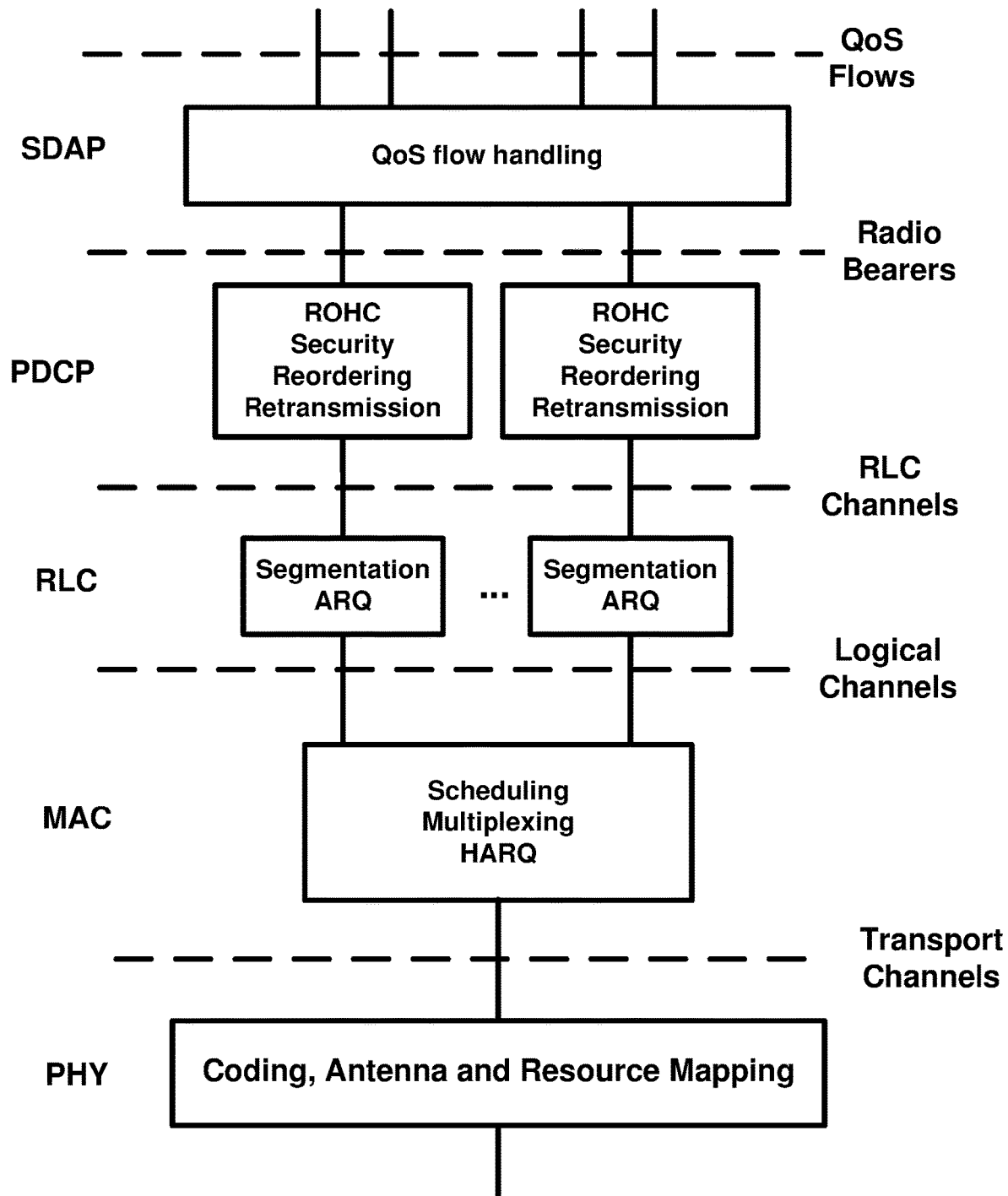
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
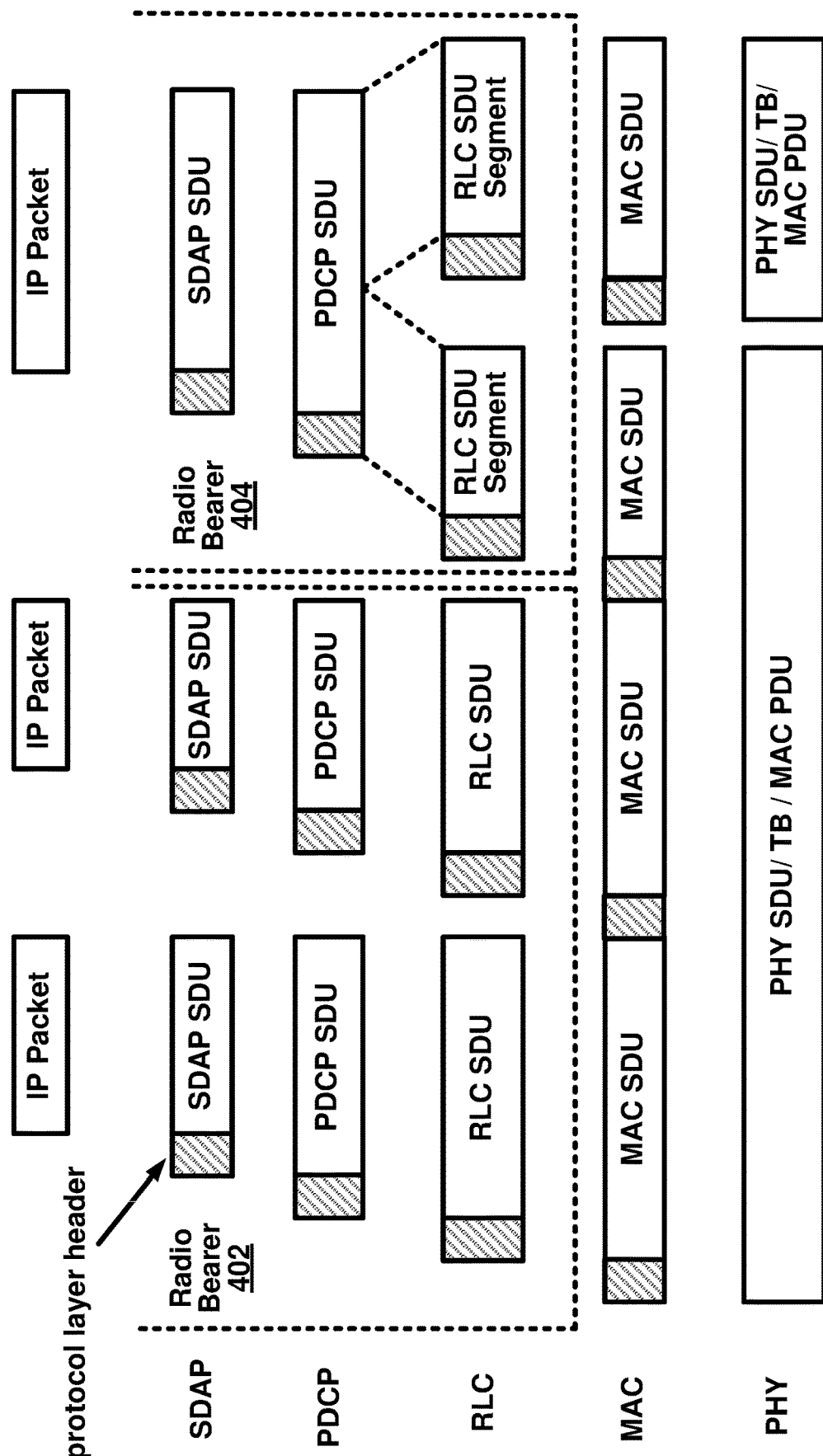
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
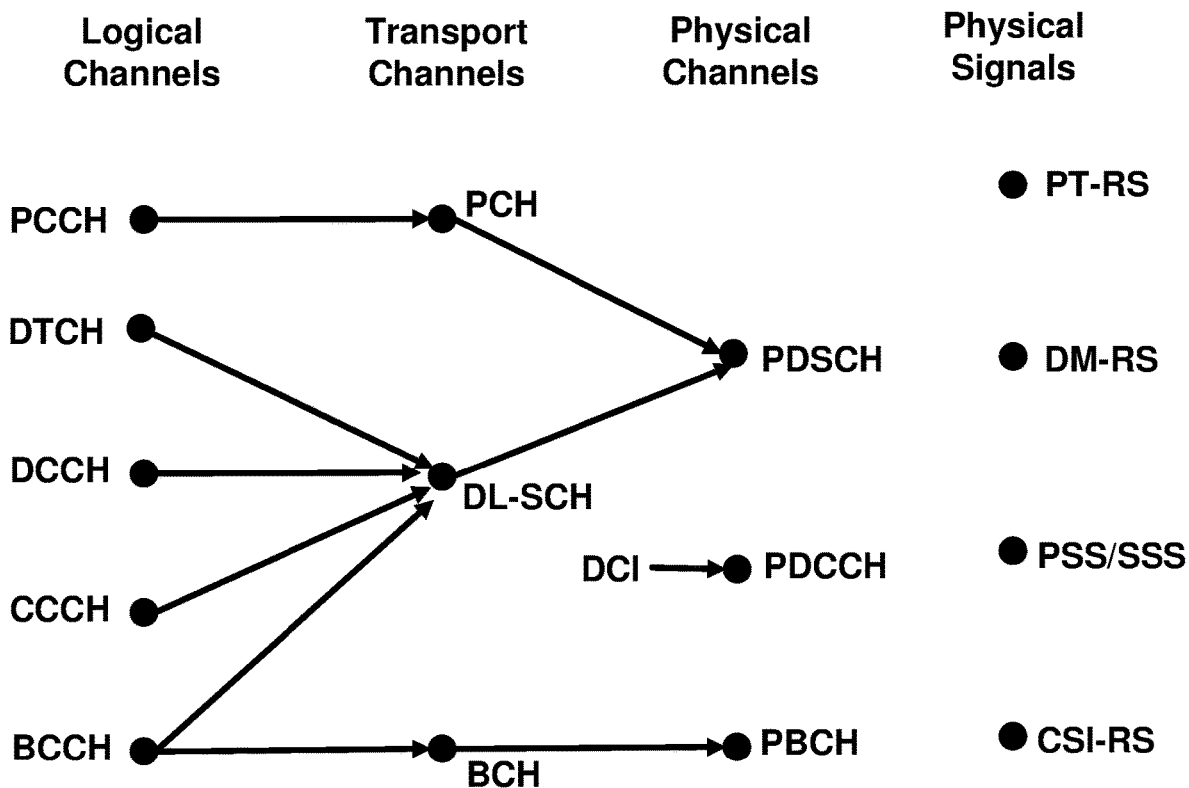
FIG. 5A shows example mapping of channels between layers of the protocol stack and different physical signals in downlink in accordance with several of various embodiments of the present disclosure.
Figure 5B:
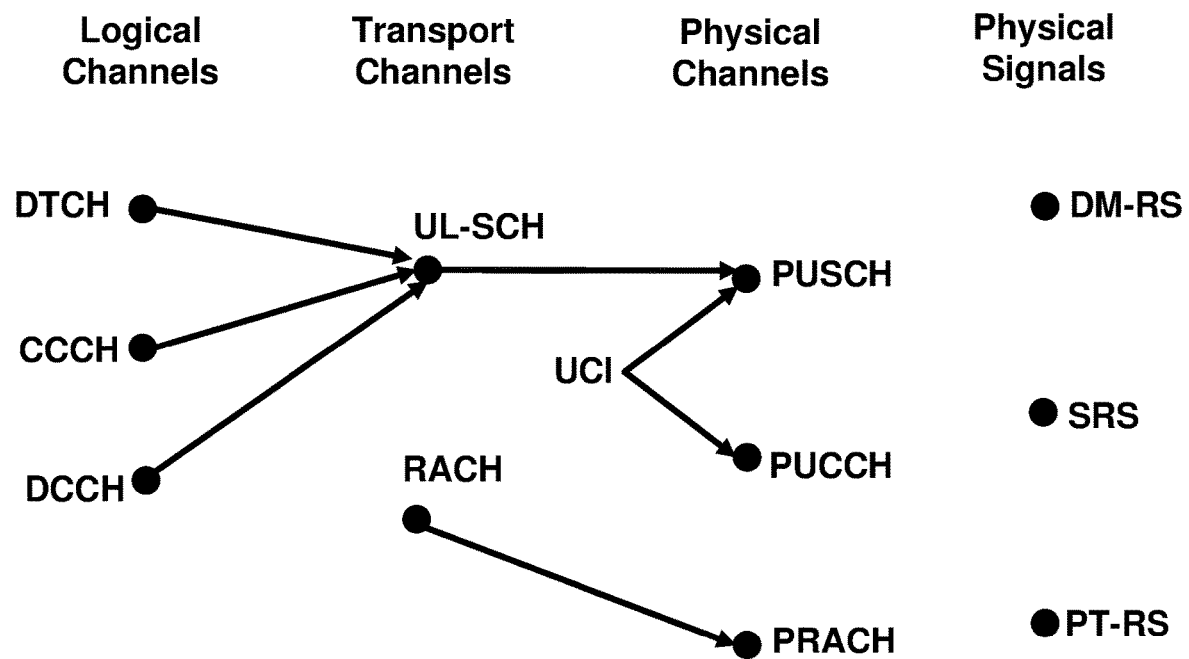
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
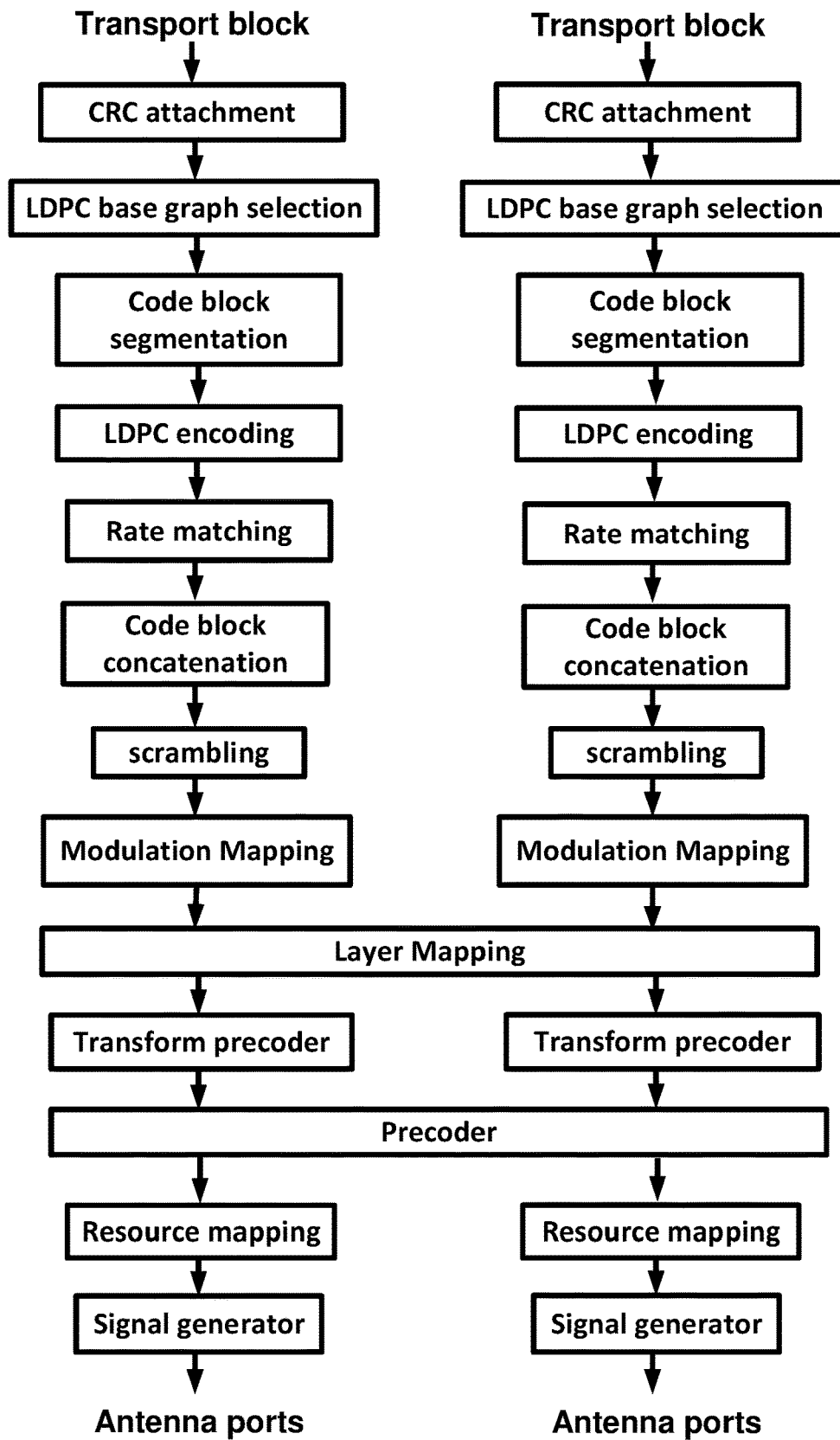
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
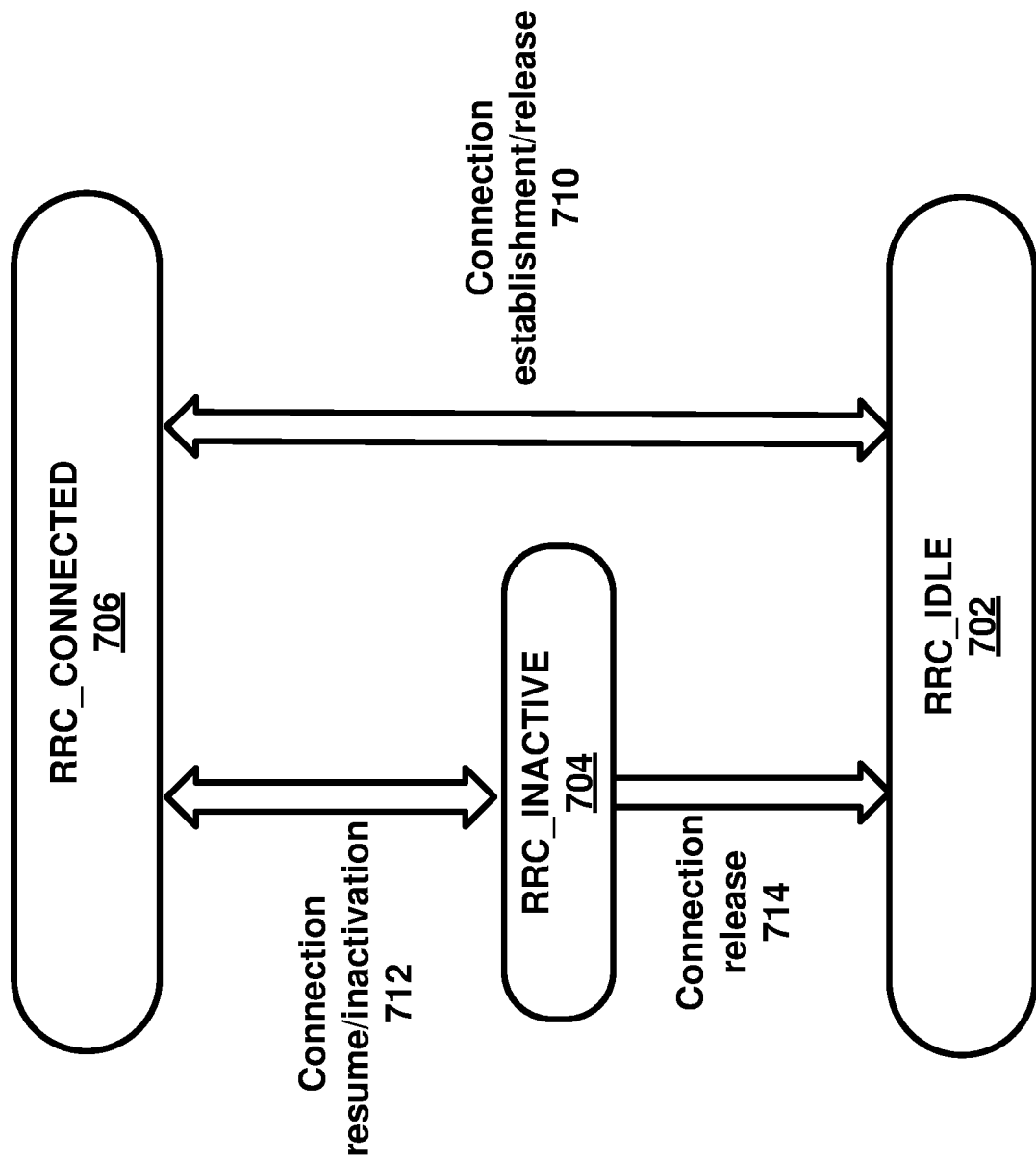
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g. the μ value).

Figure 8:
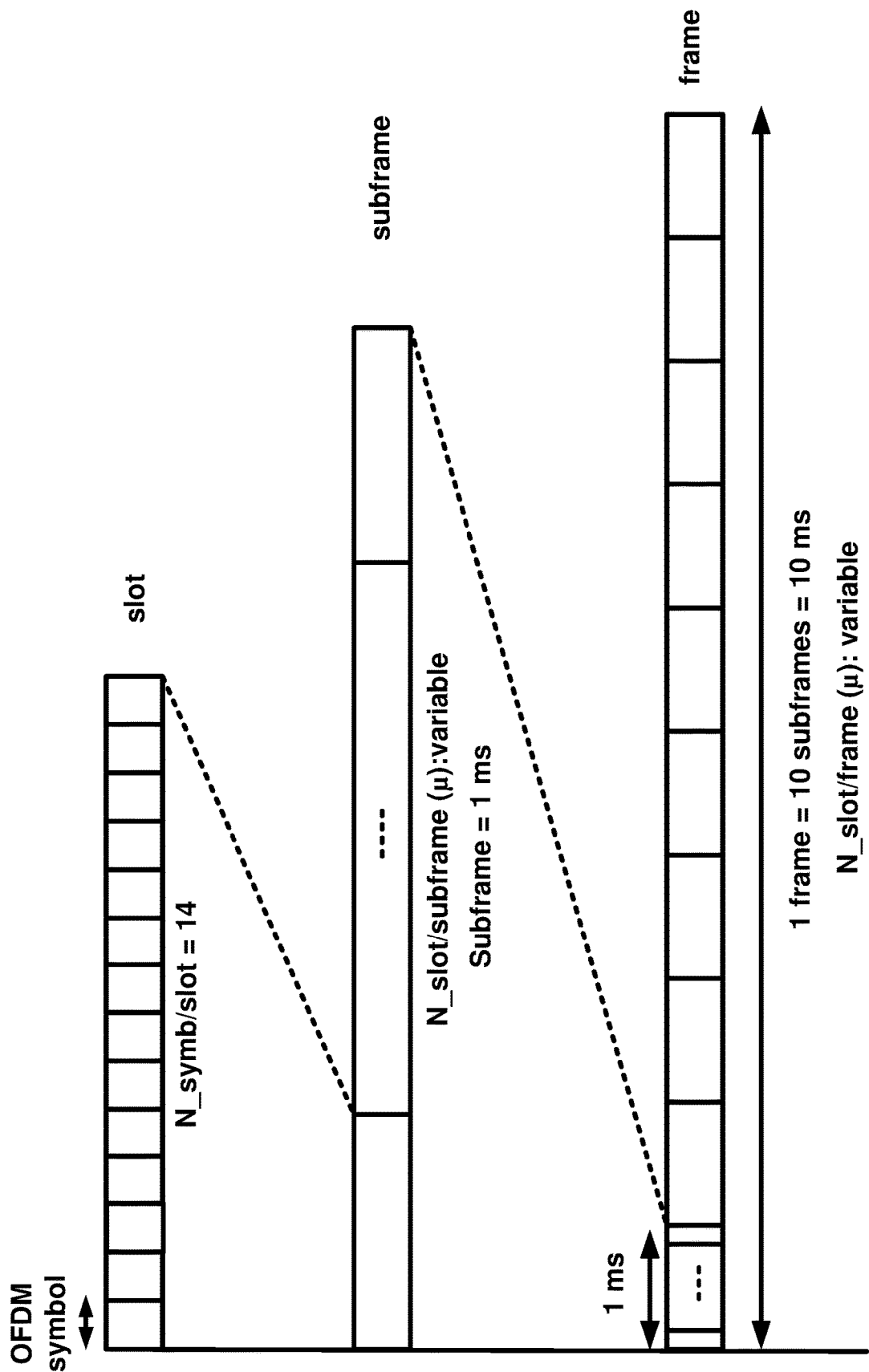
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{symb}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
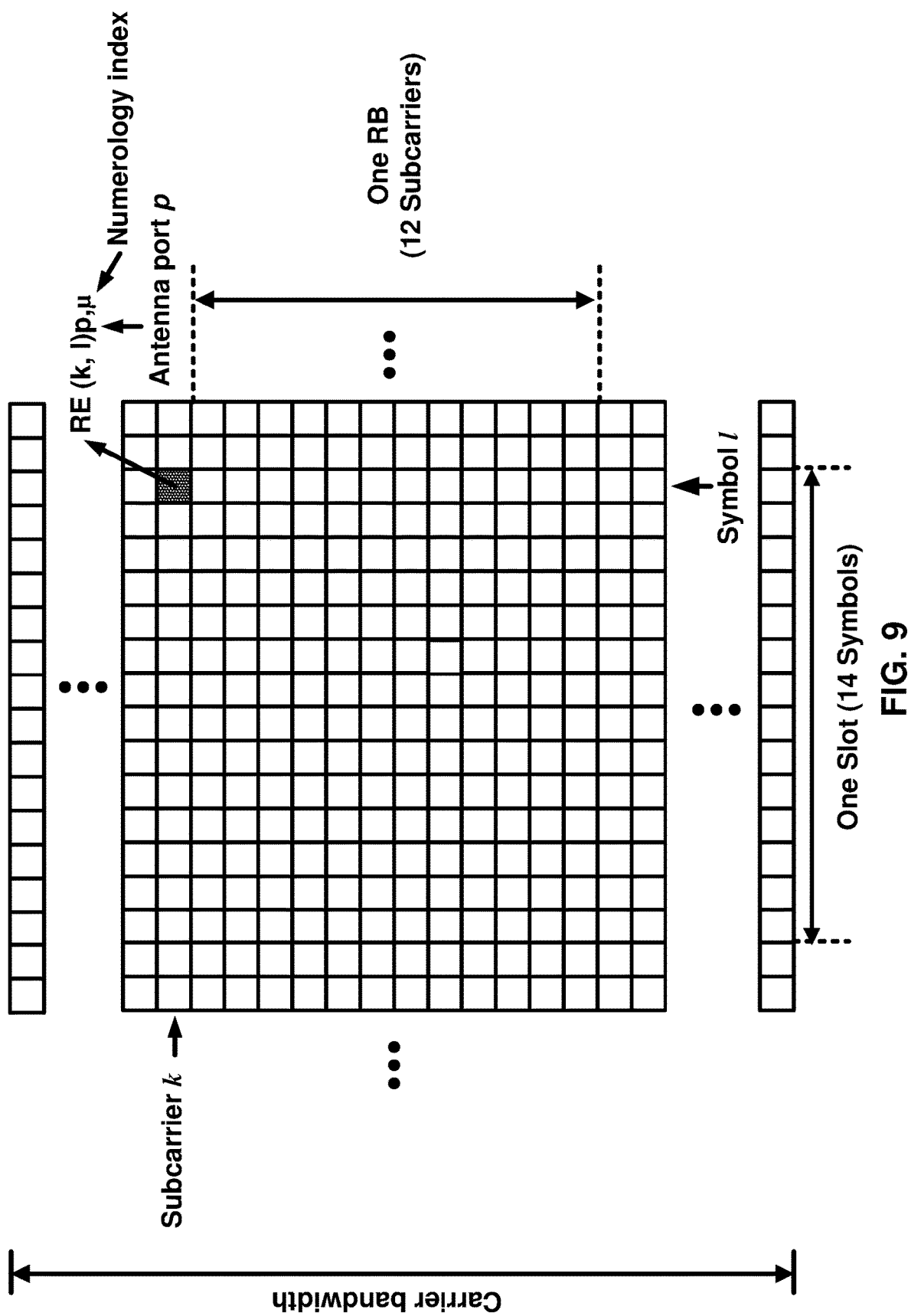
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration µ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., µ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
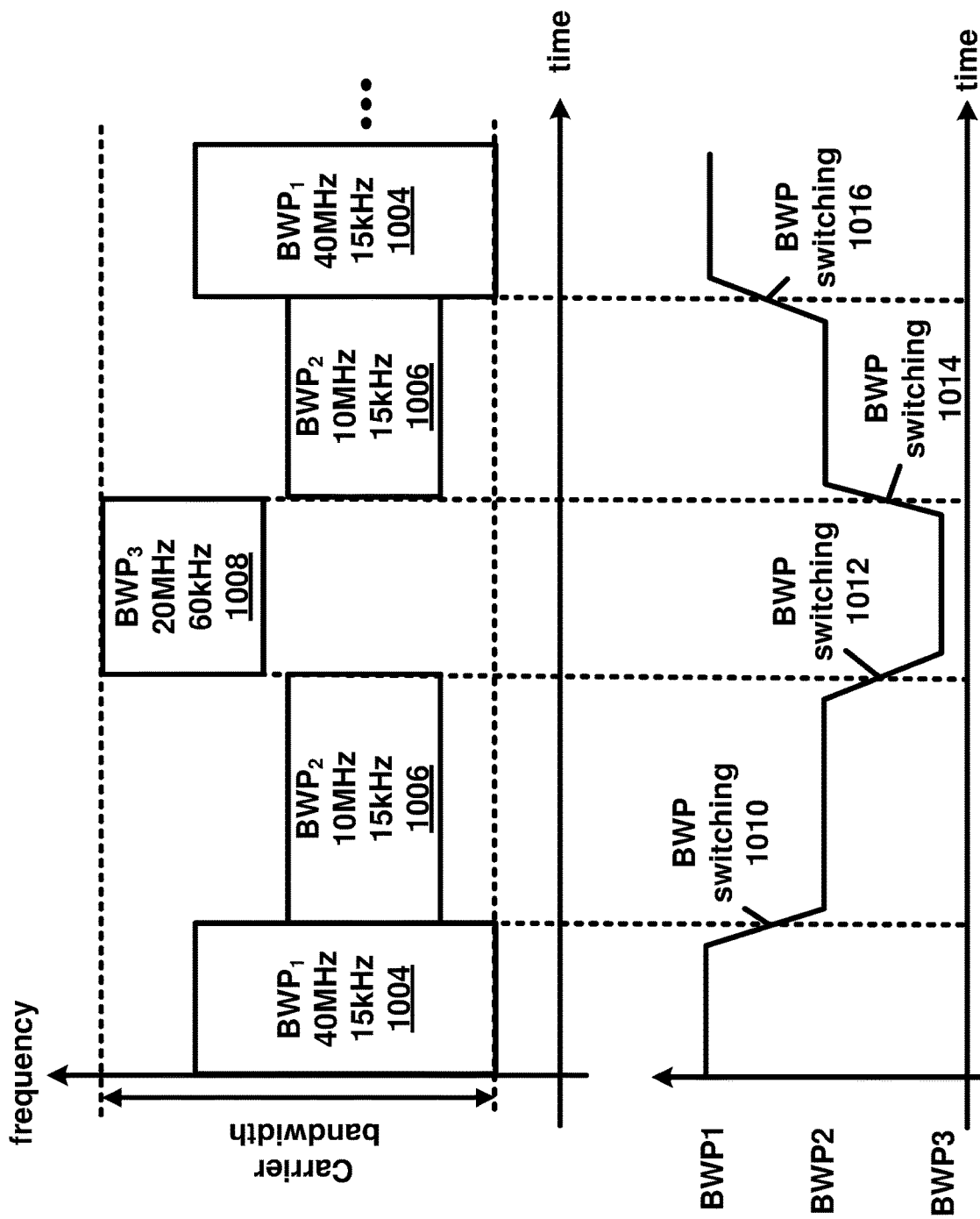
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
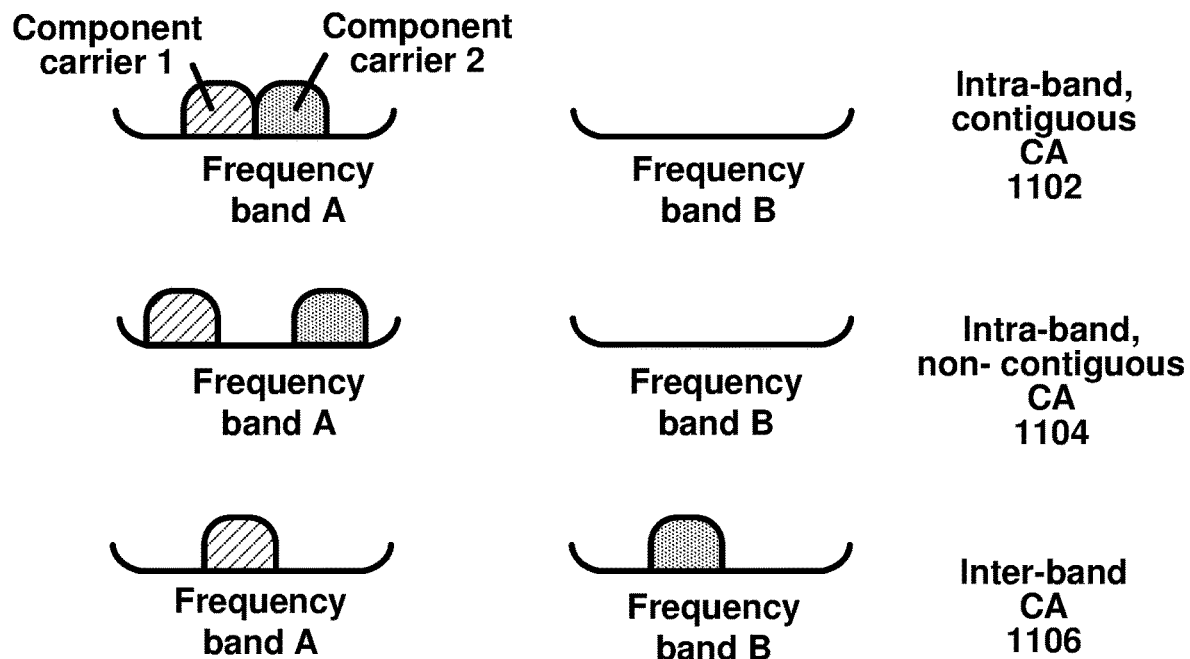
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
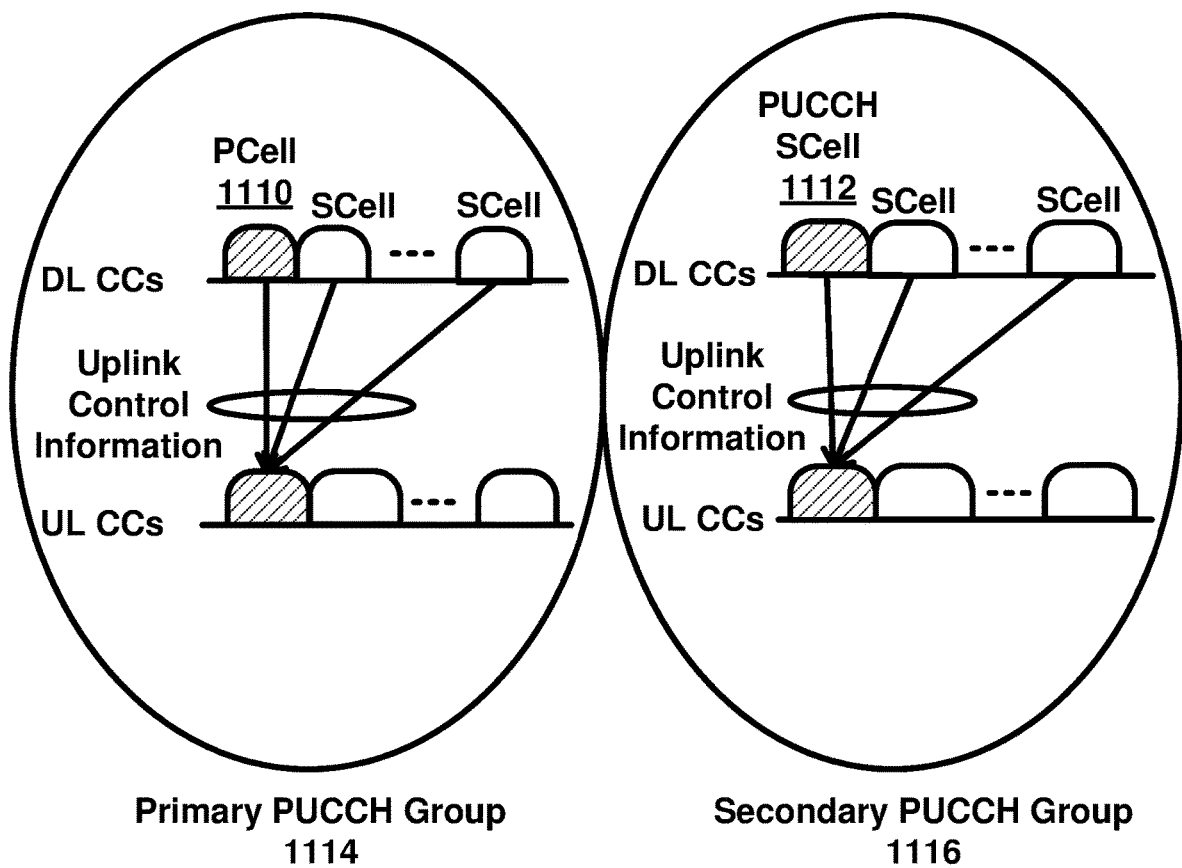
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
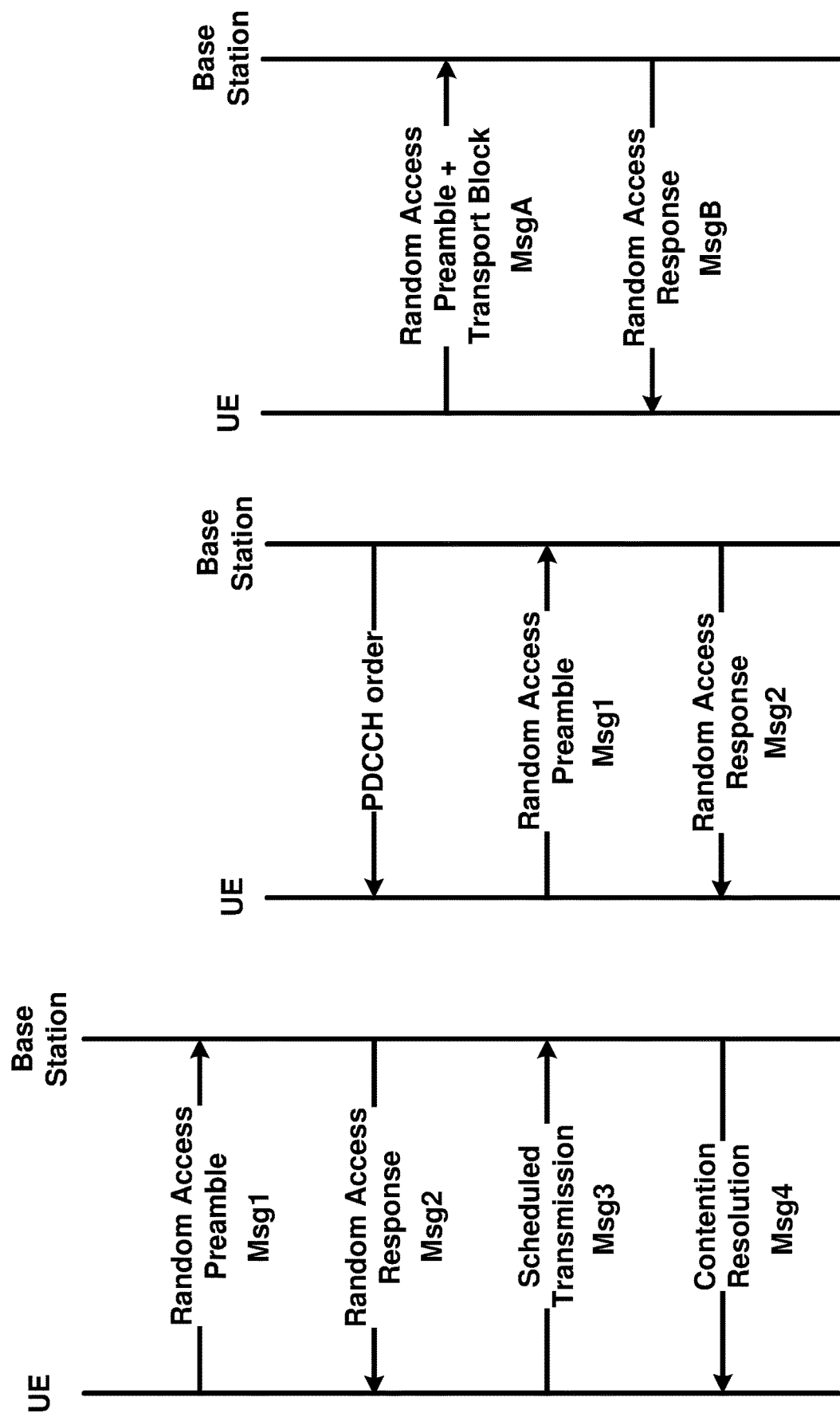
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
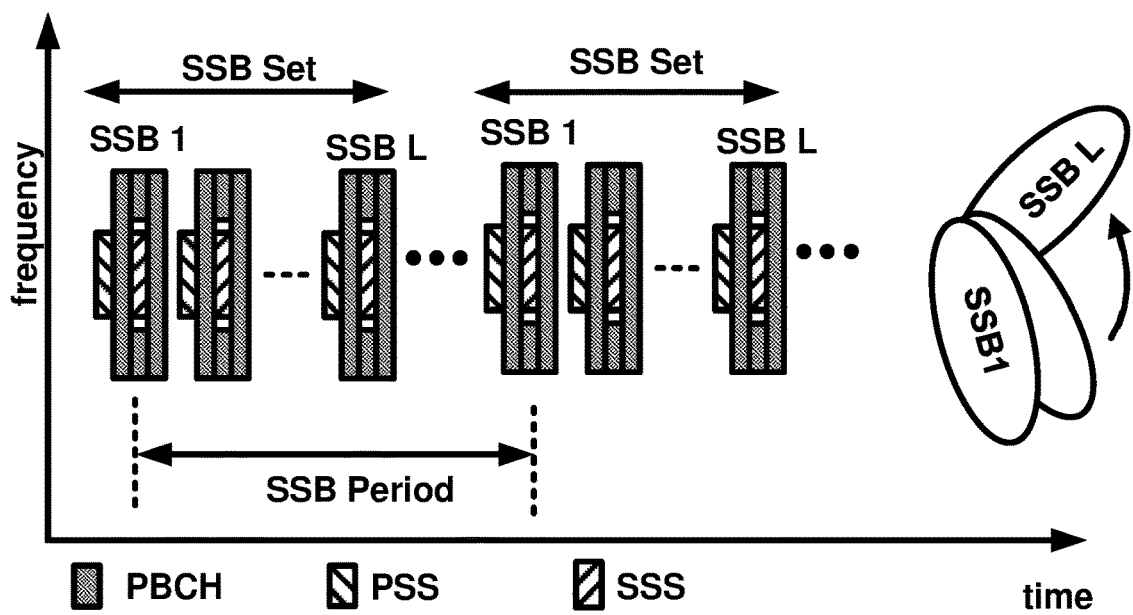
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
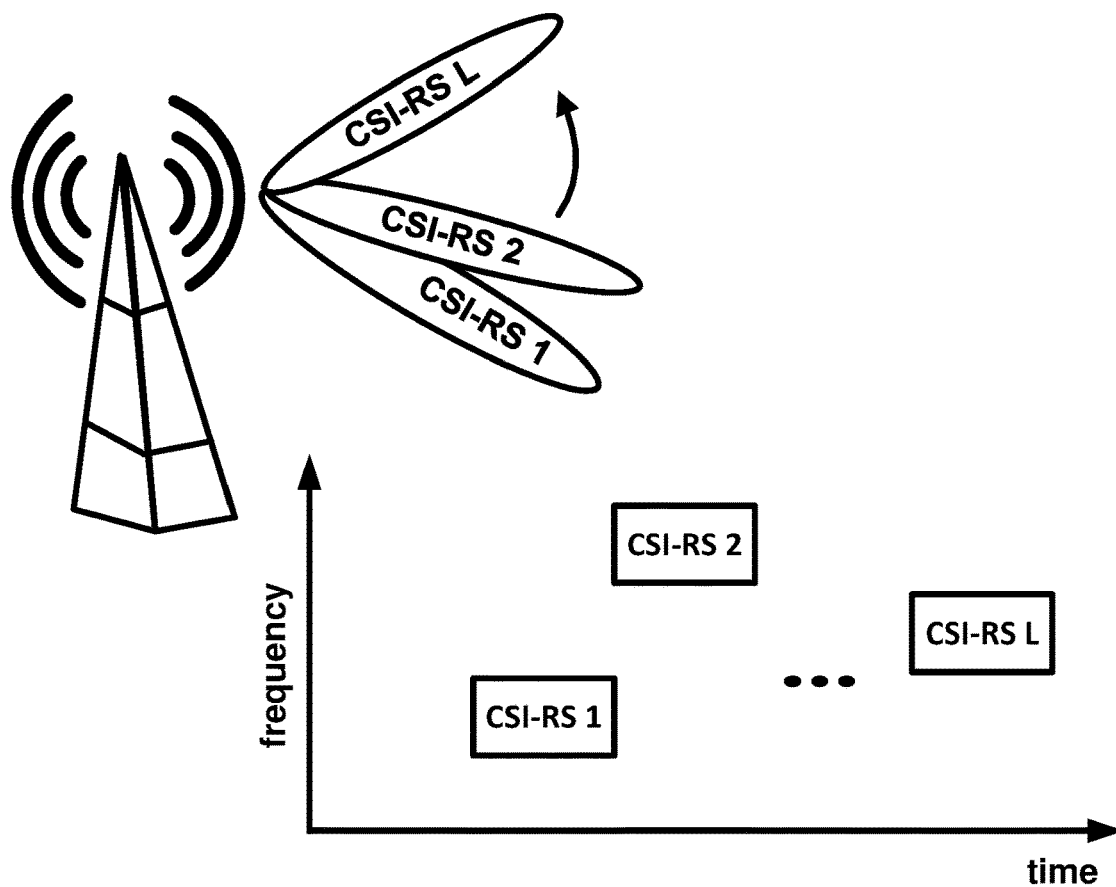
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
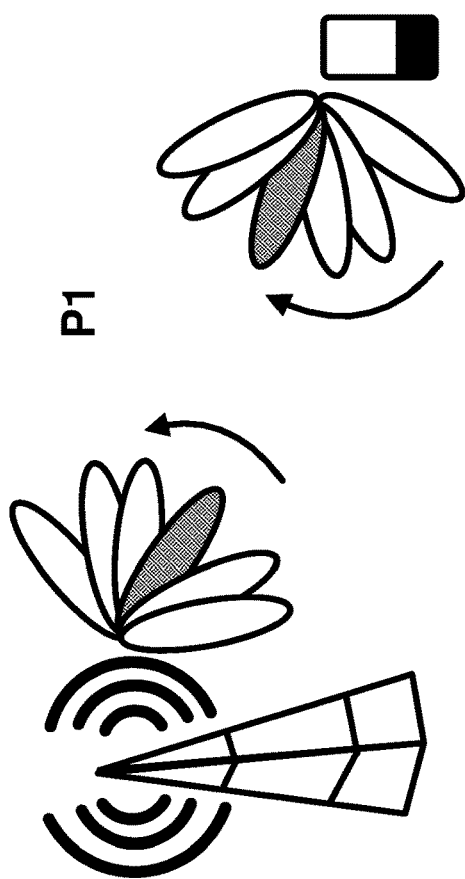
FIG. 14A, FIG. 14B and FIG. 14C show example beam management processes in accordance with several of various embodiments of the present disclosure.
Figure 14C:
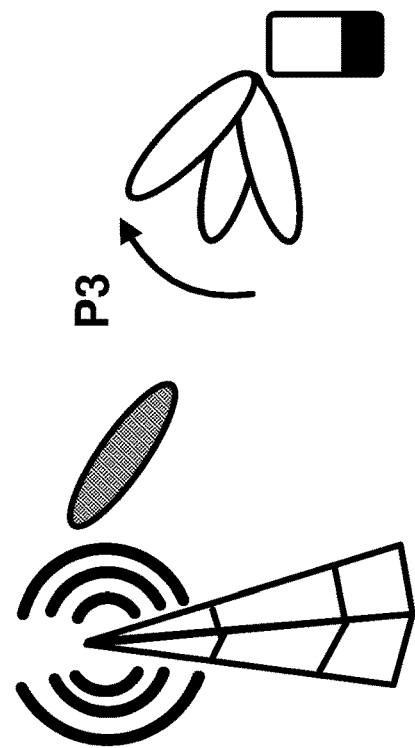
Figure 14B:
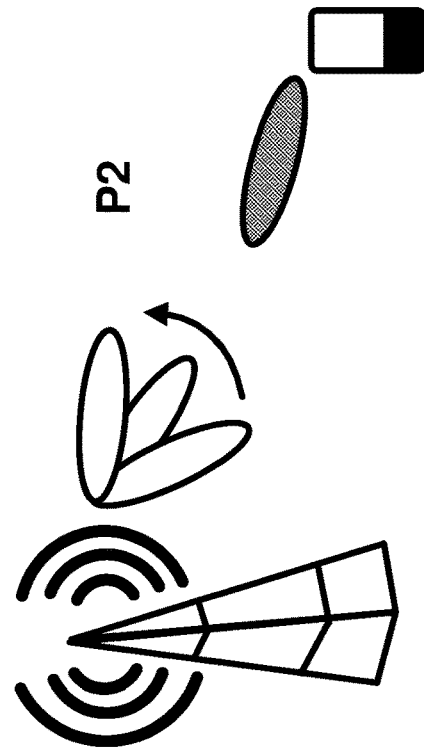

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
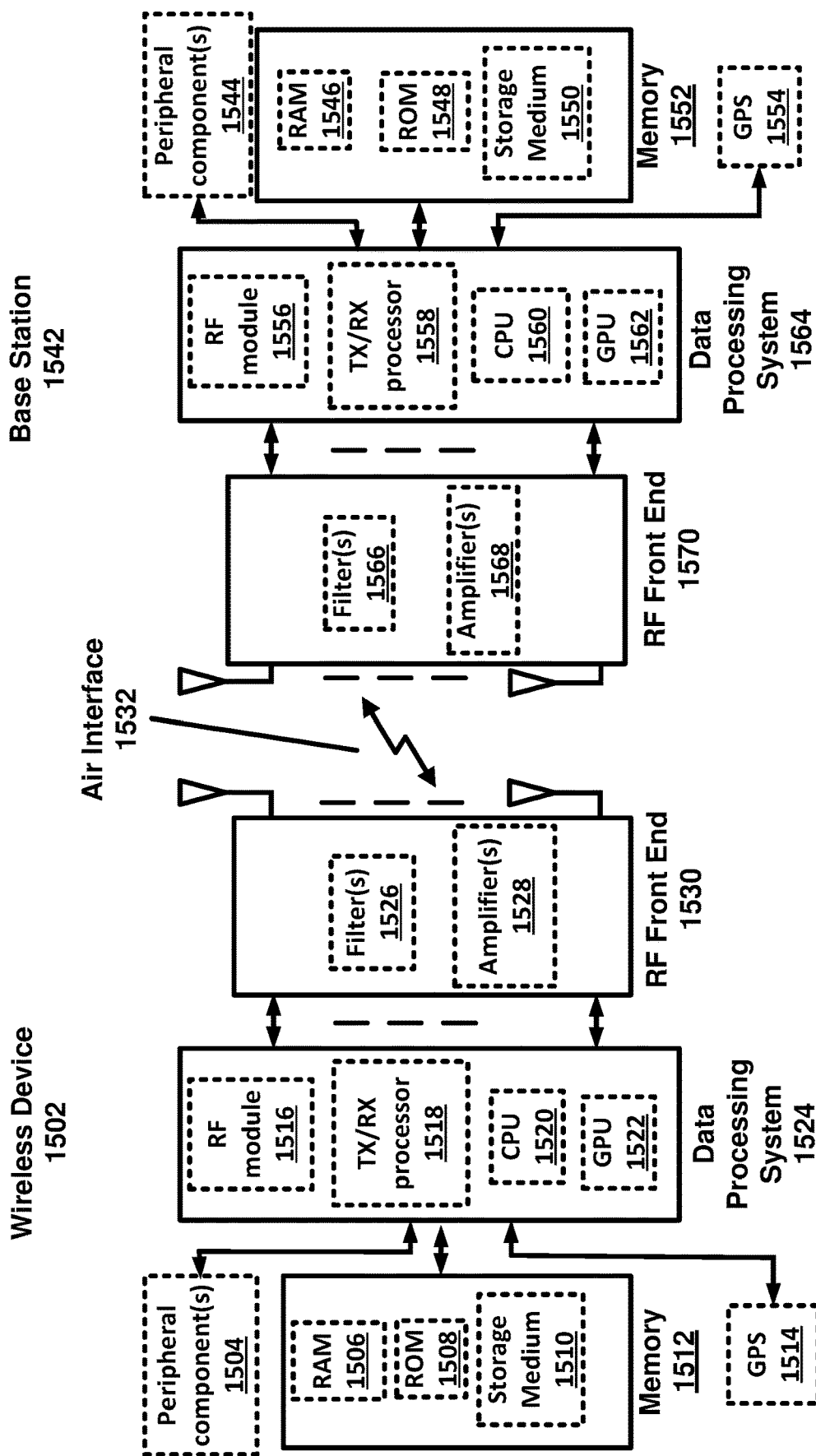
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, a Physical Downlink Control Channel (PDCCH) may be used to schedule DL transmissions on PDSCH and UL transmissions on PUSCH, where the Downlink Control Information (DCI) on PDCCH may include: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH.

In an example, in addition to scheduling, PDCCH can be used to for Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure; Indicating the UE(s) to monitor the PDCCH during the next occurrence of the DRX on-duration.

In an example, a UE may monitor a set of PDCCH candidates in the configured monitoring occasions in one or more configured COntrol REsource SETs (CORESETs) according to the corresponding search space configurations.

In an example, a CORESET may comprise a set of PRBs with a time duration of 1 to 3 OFDM symbols. The resource units Resource Element Groups (REGs) and Control Channel Elements (CCEs) may be defined within a CORESET with each CCE comprising a set of REGs. Control channels may be formed by aggregation of CCE. Different code rates for the control channels may be realized by aggregating different number of CCE. Interleaved and non-interleaved CCE-to-REG mapping may be supported in a CORESET.

In an example, a resource element group carrying PDCCH my carry its own DMRS.

In an example, an IE PDCCH-Config may be used to configure UE specific PDCCH parameters such as control resource sets (CORESET), search spaces and additional parameters for acquiring the PDCCH. If this IE is used for the scheduled cell in case of cross carrier scheduling, the fields other than searchSpacesToAddModList and searchSpacesToReleaseList may be absent. The IE PDCCH-Config may comprise a plurality of parameters. A parameter controlResourceSetToAddModList may indicate a list of UE specifically configured Control Resource Sets (CORESETs) to be used by the UE. The network may configure at most 3 CORESETs per BWP per cell (including UE-specific and common CORESETs). In case network reconfigures control resource set with the same ControlResourceSetId as used for commonControlResourceSet configured via PDCCH-ConfigCommon, the configuration from PDCCH-Config may take precedence and may not be updated by the UE based on servingCellConfigCommon.

A parameter downlinkPreemption may indicate configuration of downlink preemption indications to be monitored in a cell. A parameter monitoringCapabilityConfig may configure Rel-15 PDCCH monitoring capability or Rel-16 PDCCH monitoring capability for PDCCH monitoring on a serving cell. Value r15monitoringcapablity may enable the Rel-15 monitoring capability, and value r16monitoringcapablity may enable the Rel-16 PDCCH monitoring capability. The parameter searchSpacesToAddModList may indicate a list of UE specifically configured Search Spaces. In an example, the network may configure at most 10 Search Spaces per BWP per cell (including UE-specific and common Search Spaces). The parameter searchSpaceSwitchingGroupList may indicate a list of serving cells which may be bundled for the search space group switching purpose. The parameter searchSpaceSwitchingTimer may indicate the timer in slots for monitoring PDCCH in the active DL BWP of the serving cell before moving to the default search space group. The parameter tpc-PUCCH may enable and configure reception of group TPC commands for PUCCH. The parameter tpc-PUSCH may enable and configure reception of group TPC commands for PUSCH. The parameter tpc-SRS may enable and configure reception of group TPC commands for SRS. The parameter uplinkCancellation may be used for configuration of uplink cancellation indications to be monitored in a cell.

In an example, an IE PDCCH-ConfigCommon may be used to configure cell specific PDCCH parameters provided in SIB as well as in dedicated signalling. The PDCCH-ConfigCommon IE may comprise a plurality of parameters. A parameter commonControlResourceSet may indicate an additional common control resource set which may be configured and used for any common or UE-specific search space. If the network configures this field, it uses a ControlResourceSetId other than 0 for this ControlResourceSet. The network configures the commonControlResourceSet in SIB1 so that it is contained in the bandwidth of CORESET #0. A parameter commonSearchSpaceList may indicate a list of additional common search spaces. If the network configures this field, it uses the SearchSpaceIds other than 0. A parameter controlResourceSetZero may indicate parameters of the common CORESET #0 which may be used in any common or UE-specific search spaces. The values may be interpreted like the corresponding bits in MIB pdcch-ConfigSIB1. Even though this field may be configured in the initial BWP (BWP #0) controlResourceSetZero may be used in search spaces configured in other DL BWP(s) than the initial DL BWP. A parameter firstPDCCH-MonitoringOccasionOfPO may indicate the first PDCCH monitoring occasion of each PO of the PF on the BWP. A parameter pagingSearchSpace may indicate ID of the Search space for paging. A parameter ra-SearchSpace may indicate ID of the Search space for random access procedure. A parameter searchSpaceOtherSystemInformation may indicate ID of the Search space for other system information, e.g., SIB2 and beyond. A parameter searchSpaceSIB1 may indicate ID of the search space for SIB1 message. A parameter searchSpaceZero may indicate parameters of the common SearchSpace #0.

In an example, an IE PDCCH-ConfigSIB1 may be used to configure CORESET #0 and search space #0. A parameter controlResourceSetZero may indicate a common ControlResourceSet (CORESET) with ID #0. A parameter searchSpaceZero may indicate a common search space with ID #0.

In an example, an IE PDCCH-ServingCellConfig may be used to configure UE specific PDCCH parameters applicable across bandwidth parts of a serving cell. A parameter availabilityIndicator may be used to configure monitoring a PDCCH for Availability Indicators (AI). A parameter slotFormatIndicator may be used for configuration of Slot-Format-Indicators to be monitored in the correspondingly configured PDCCHs of the serving cell.

In an example, an IE ControlResourceSet may be used to configure a time/frequency control resource set (CORESET) in which to search for downlink control information. The IE ControlResourceSet may comprise a plurality of parameters. A parameter controlResourceSetId may identify the instance of the ControlResourceSet IE. A parameter coresetPoolIndex may indicate the index of the CORESET pool for the CORESET When absent, UE may use the index 0. A parameter duration may indicate contiguous time duration of the CORESET in number of symbols. A parameter frequencyDomainResourcesmay indicate frequency domain resources for the CORESET. A parameter tci-PresentInDCI may indicate if TCI field is present or absent in a DCI format (e.g., DCI format 1_1). When the field is absent the UE may consider the TCI to be absent/disabled. In case of cross carrier scheduling, the network may set this field to enabled for the ControlResourceSet used for cross carrier scheduling in the scheduling cell. A parameter tci-PresentInDCI-ForDCI-Format 1-2 may indicate the number of bits for "Transmission configuration indicator" in DCI format 1_2. When the field is absent the UE may apply the value of 0 bit for the "Transmission configuration indicator" in DCI format 1_2. A parameter tci-StatesPDCCH-ToAddList may indicate a subset of the TCI states defined in pdsch-Config included in the BWP-DownlinkDedicated corresponding to the serving cell and to the DL BWP to which the ControlResourceSet belong to. They may be used for providing QCL relationships between the DL RS(s) in one RS Set (TCI-State) and the PDCCH DMRS ports. The network may configure at most maxNrofTCI-StatesPDCCH entries.

In an example, the ControlResourceSetId IE may indicate a short identity, used to identify a control resource set within a serving cell. The ControlResourceSetId=0 may identify the ControlResourceSet #0 configured via PBCH (MIB) and in controlResourceSetZero (ServingCellConfigCommon). The ID space may be used across the BWPs of a Serving Cell.

In an example, an IE ControlResourceSetZero may be used to configure CORESET #0 of the initial BWP.

In an example, an IE SearchSpace may define how/where to search for PDCCH candidates. A search space may be associated with one ControlResourceSet. For a scheduled cell in the case of cross carrier scheduling, except for nrofCandidates, the optional fields may be absent. The ControlResourceSetZero IE may comprise a plurality of parameters. A parameter common may configure the search space as common search space (CSS) and DCI formats to monitor. A parameter controlResourceSetId may indicate a CORESET applicable for this SearchSpace. Value 0 may identify the common CORESET #0 configured in MIB and in ServingCellConfigCommon. Values 1 . . . maxNrofControlResourceSets-1 may identify CORESETs configured in System Information or by dedicated signalling. The CORESETs with non-zero controlResourceSetId may be configured in the same BWP as this SearchSpace. A parameter duration may indicate a number of consecutive slots that a SearchSpace lasts in every occasion, e.g., upon every period as given in the periodicityAndOffset. If the field is absent, the UE may apply the value 1 slot, except for DCI format 2_0. The UE may ignore this field for DCI format 2_0. The maximum valid duration may be periodicity-1 (periodicity as given in the monitoringSlotPeriodicityAndOffset). A parameter monitoringSlotPeriodicityAndOffset may indicate slots for PDCCH Monitoring configured as periodicity and offset. A parameter monitoringSymbolsWithinSlot may indicate the first symbol(s) for PDCCH monitoring in the slots configured for PDCCH monitoring (e.g., based on monitoringSlotPeriodicityAndOffset and duration). The most significant (left) bit may represent the first OFDM in a slot, and the second most significant (left) bit may represent the second OFDM symbol in a slot and so on. The bit(s) set to one may identify the first OFDM symbol(s) of the control resource set within a slot. If the cyclic prefix of the BWP is set to extended CP, the last two bits within the bit string may be ignored by the UE. For DCI format 2_0, the first one symbol may apply if the duration of CORESET (in the IE ControlResourceSet) identified by controlResourceSetId indicates 3 symbols, the first two symbols may apply if the duration of CORESET identified by controlResourceSetId indicates 2 symbols, and the first three symbols apply if the duration of CORESET identified by controlResourceSetId indicates 1 symbol. A parameter nrofCandidates may indicate a number of PDCCH candidates per aggregation level. A parameter searchSpaceGroupIdList may indicate a list of search space group IDs which the search space set is associated with. A parameter searchSpaceId may identify the search space. SearchSpaceId=0 may identify the searchSpaceZero configured via PBCH (MIB) or ServingCellConfigCommon and may not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The UE may apply the search space for the scheduled cell if the DL BWPs in which the linked search spaces are configured in scheduling cell and scheduled cell are both active. A parameter searchSpaceType may indicate whether this is a common search space (present) or a UE specific search space as well as DCI formats to monitor for. A parameter ue-Specific may configure the search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero). The number of Search Spaces per BWP may be limited to 10 including the common and UE specific Search Spaces.

In an example, an IE SearchSpaceZero may be used to configure SearchSpace #0 of the initial BWP.

In an example, a UE may monitor a set of PDCCH candidates in one or more CORESETs on the active DL BWP on an activated serving cell configured with PDCCH monitoring according to corresponding search space sets where monitoring implies decoding a PDCCH candidate according to the monitored DCI formats.

In an example, if a UE is provided PDCCHMonitoringCapabilityConfig for a serving cell, the UE may obtain an indication to monitor PDCCH on the serving cell for a maximum number of PDCCH candidates and non-overlapping CCEs per slot or per span depending on a value of the PDCCHMonitoringCapabilityConfig parameter. If the UE is not provided PDCCHMonitoringCapabilityConfig, the UE may monitor PDCCH on the serving cell per slot.

In an example, a UE may report one or more combinations of (X, Y) number of symbols, where X≥Y, for PDCCH monitoring. A span may be a set of consecutive symbols in a slot in which the UE may be configured to monitor PDCCH candidates. The UE may support PDCCH monitoring occasions in a symbol of a slot with minimum time separation of X symbols between the first symbol of two consecutive spans, including across slots. The duration of a span may be $d_{span}=\max(d_{CORESET,max}, Y_{min})$, where $d_{CORESET,max}$ may be a maximum duration among durations of CORESETs that are configured to the UE and $Y_{min}$ may be a minimum value of Y in the combinations of (X, Y) that are reported by the UE. A last span in a slot may have a shorter duration than other spans in the slot.

In an example, a UE capability for PDCCH monitoring per slot or per span on an active DL BWP of a serving cell may be defined by a maximum number of PDCCH candidates and non-overlapped CCEs the UE may monitor per slot or per span, respectively, on the active DL BWP of the serving cell.

In an example, a set of PDCCH candidates for a UE to monitor may be defined in terms of PDCCH search space sets. A search space set may be a common search space (CSS) set or a UE specific search space (USS) set. A UE may monitor PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG; a Type0A-PDCCH CSS set configured by searchSpaceOtherSystemInformation in PDCCH-ConfigCommon for a DCI format with CRC scrambled by a SI-RNTI on the primary cell of the MCG; a Type1-PDCCH CSS set configured by ra-SearchSpace in PDCCH-ConfigCommon for a DCI format with CRC scrambled by a RA-RNTI, a MsgB-RNTI, or a TC-RNTI on the primary cell; a Type2-PDCCH CSS set configured by pagingSearchSpace in PDCCH-ConfigCommon for a DCI format with CRC scrambled by a P-RNTI on the primary cell of the MCG; a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s); and a USS set configured by SearchSpace in PDCCH-Config with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, if a UE may be provided a zero value for searchSpaceID in PDCCH-ConfigCommon for a Type0/0A/2-PDCCH CSS set, the UE may determine monitoring occasions for PDCCH candidates of the Type0/0A/2-PDCCH CSS set, and the UE may be provided a C-RNTI, the UE may monitor PDCCH candidates at monitoring occasions associated with a SS/PBCH block, where the SS/PBCH block may be determined by the most recent of: a MAC CE activation command indicating a TCI state of the active BWP that includes a CORESET with index 0, where the TCI-state includes a CSI-RS which is quasi-co-located with the SS/PBCH block; or a random access procedure that is not initiated by a PDCCH order that triggers a contention-free random access procedure.

In an example, if a UE monitors PDCCH candidates for DCI formats with CRC scrambled by a C-RNTI and the UE is provided a non-zero value for searchSpaceID in PDCCH-ConfigCommon for a Type0/0A/2-PDCCH CSS set, the UE may determine monitoring occasions for PDCCH candidates of the Type0/0A/2-PDCCH CSS set based on the search space set associated with the value of searchSpaceID.

In an example, the UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable, if the UE is not provided a TCI state indicating quasi co-location information of the DM-RS antenna port for PDCCH reception in the CORESET. The value for the DM-RS scrambling sequence initialization may be the cell ID. A SCS may be provided by subCarrierSpacingCommon in MIB.

In an example, for a DL BWP configured to a UE in a serving cell, the UE may be provided by higher layer signalling with P≤3 CORESETs if CORESETPoolIndex is not provided, or if a value of CORESETPoolIndex is same for all CORESETs if CORESETPoolIndex is provided.

In an example, for a DL BWP configured to a UE in a serving cell, the UE may be provided by higher layer signalling with P≤5 CORESETs if CORESETPoolIndex is not provided for a first CORESET, or is provided and has a value 0 for a first CORESET, and is provided and has a value 1 for a second CORESET.

In an example, for a CORESET, the UE may be provided parameters by ControlResourceSet. The parameters may comprise a CORESET index p, by controlResourceSetId, where 0≤p<12 if CORESETPoolIndex is not provided, or if a value of CORESETPoolIndex is same for all CORESETs if CORESETPoolIndex is provided; 0<p<16 if CORESETPoolIndex is not provided for a first CORESET, or is provided and has a value 0 for a first CORESET, and is provided and has a value 1 for a second CORESET. The parameters may comprise a DM-RSscrambling sequence initialization value by pdcch-DMRS-ScramblingID. The parameters may comprise a precoder granularity for a number of REGs in the frequency domain where the UE may assume use of a same DM-RS precoder by precoderGranularity. The parameters may comprise a number of consecutive symbols provided by duration. The parameters may comprise a set of resource blocks provided by frequencyDomainResources. The parameters may comprise CCE-to-REG mapping parameters provided by cce-REG-MappingType. The parameters may comprise an antenna port quasi co-location, from a set of antenna port quasi co-locations provided by TCI-State, indicating quasi co-location information of the DM-RS antenna port for PDCCH reception in a respective CORESET. If the UE is provided by simultaneousTCI-CellList a number of lists of cells for simultaneous TCI state activation, the UE may apply the antenna port quasi co-location provided by TCI-States with same activated tci-StateID value to CORESETs with index p in all configured DL BWPs of all configured cells in a list determined from a serving cell index provided by a MAC CE command. The parameters may comprise an indication for a presence or absence of a transmission configuration indication (TCI) field for a DCI format, other than DCI format 1_0, that schedules PDSCH receptions or indicates SPS PDSCH release and is transmitted by a PDCCH in CORESET p, by tci-PresentInDCI or tci-PresentInDCI-ForDCIFormat1_2.

In an example, for a CORESET in a DL BWP of a serving cell, a respective frequencyDomainResources may provide a bitmap indicating radio resources for CORESET.

In an example, for a CORESET with index 0, the UE may assume that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

In an example, for a CORESET other than a CORESET with index 0, if a UE is provided a single TCI state for a CORESET, or if the UE receives a MAC CE activation command for one of the provided TCI states for a CORESET, the UE may assume that the DM-RS antenna port associated with PDCCH receptions in the CORESET is quasi co-located with the one or more DL RS configured by the TCI state. For a CORESET with index 0, the UE may expect that QCL-TypeD of a CSI-RS in a TCI state indicated by a MAC CE activation command for the CORESET is provided by a SS/PBCH block.

For a DL BWP configured to a UE in a serving cell, the UE may be provided by higher layers with S (e.g., S≤10)) search space sets where, for each search space set from the S search space sets, the UE may be provided the following by SearchSpace: search space set index s, 0<s<40, by searchSpaceId; an association between the search space set s and a CORESET p by controlResourceSetId; a PDCCH monitoring periodicity of $k_s$ slots and a PDCCH monitoring offset of $O_s$ slots, by monitoringSlotPeriodicityAndOffset; a PDCCH monitoring pattern within a slot, indicating first symbol(s) of the CORESET within a slot for PDCCH monitoring, by monitoringSymbolsWithinSlot; a duration of $T_s < k_s$ slots indicating a number of slots that the search space set s exists by duration; a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively; an indication that search space set s is either a CSS set or a USS set by searchSpaceType; if search space set s is a CSS set: an indication by dci-Format0-0-AndFormat1-0 to monitor PDCCH candidates for DCI format 0_0 and DCI format 1_0, an indication by dci-Format2-0 to monitor one or two PDCCH candidates for DCI format 2_0 and a corresponding CCE aggregation level, an indication by dci-Format2-1 to monitor PDCCH candidates for DCI format 2_1, an indication by dci-Format2-2 to monitor PDCCH candidates for DCI format 2_2, an indication by dci-Format2-3 to monitor PDCCH candidates for DCI format 2_3, an indication by dci-Format2-4 to monitor PDCCH candidates for DCI format 2_4, an indication by dci-Format2-6 to monitor PDCCH candidates for DCI format 2_6; if search space set s is a USS set, an indication by dci-Formats to monitor PDCCH candidates either for DCI format 0_0 and DCI format 1_0, or for DCI format 0_1 and DCI format 1_1, or an indication by dci-Formats-Rel16 to monitor PDCCH candidates for DCI format 0_0 and DCI format 1_0, or for DCI format 0_1 and DCI format 1_1, or for DCI format 0_2 and DCI format 1_2, or, if a UE indicates a corresponding capability, for DCI format 0_1, DCI format 1_1, DCI format 0_2, and DCI format 1_2, or for DCI format 3_0, or for DCI format 3_1, or for DCI format 3_0 and DCI format 3_1; a bitmap by freqMonitorLocation-r16, if provided, to indicate one or more RB sets for the search space set s, where the MSB k in the bitmap corresponds to RB set k−1 in the DL BWP. For RB set k indicated in the bitmap, the first PRB of the frequency domain monitoring location confined within the RB set is given by $N_{RB,set\ k}^{start} + N_{RB,set\ k}^{offset}$, where $N_{RB,set\ k}^{start}$ is the index of first PRB of the RB set k, and $N_{RB}^{offset}$ is provided by rb-offset or $N_{RB}^{offset}=0$ if rb-offset is not provided. The frequency domain resource allocation pattern for each monitoring location is determined based on the first $N_{RBG,set\ 0}^{size}$ bits in frequencyDomainResources provided by the associated CORESET configuration.

In an example, a UE may determine a PDCCH monitoring occasion on an active DL BWP from the PDCCH monitoring periodicity, the PDCCH monitoring offset, and the PDCCH monitoring pattern within a slot. For search space set s, the UE may determine that a PDCCH monitoring occasion(s) exists in a slot with number $n_{s,f}^\mu$ in a frame with number $n_f$ if $(n_f N_{slot}^{frame,\mu} + n_{s,f}^\mu - o_s) \bmod k_s = 0$. The UE may monitor PDCCH candidates for search space set s for $T_s$ consecutive slots, starting from slot $n_{s,f}^\mu$, and may not monitor PDCCH candidates for search space set S for the next $k_s - T_s$ consecutive slots.

In an example, a USS at CCE aggregation level L∈{1, 2, 4, 8, 16} is defined by a set of PDCCH candidates for CCE aggregation level L.

In an example, a UE may expect to monitor PDCCH candidates for up to 4 sizes of DCI formats that include up to 3 sizes of DCI formats with CRC scrambled by C-RNTI per serving cell. The UE may count a number of sizes for DCI formats per serving cell based on a number of configured PDCCH candidates in respective search space sets for the corresponding active DL BWP.

In an example, CCEs for PDCCH candidates may be non-overlapped if they correspond to different CORESET indexes, or different first symbols for the reception of the respective PDCCH candidates.

A wireless device may operate in one or more of a plurality of usage scenarios including enhanced mobile broadband (eMBB), massive machine-type communication (mMTC), and Ultra-Reliable and Low Latency communication (URLLC). In an example, a usage scenario may be time sensitive communication (TSC). The eMBB, mMTC, URLLC and TSC use cases may be supported in the same network.

In an example, a mobile communication system may enable connected industries. The mobile communication system may enable improved flexibility, enhanced productivity and efficiency, reduced maintenance cost, and improved operational safety. Devices in such environment may include, for example, pressure sensors, humidity sensors, thermometers, motion sensors, accelerometers, actuators, etc. These devices may connect to radio access and core networks.

A wireless device type may be a reduced capability (RedCap) type. Example wireless device requirements may include lower cost and complexity (for example for the case of industrial sensors) as compared to high-end eMBB and URLLC devices and/or smaller device size with compact form factor.

Example UE complexity reduction features include: reduced number of UE RX/TX antennas, reduced UE Bandwidth, Half-Duplex-FDD, relaxed UE processing time and relaxed UE processing capability. A reduced capability UE may use power saving and battery lifetime enhancements such as reduced PDCCH monitoring by smaller numbers of blind decodes and CCE limits, extended DRX for RRC Inactive and/or Idle, RRM relaxation for stationary devices, etc. The reduced capability UE may use functionality that may enable the performance degradation of such complexity reduction to be mitigated or limited, including coverage recovery to compensate for potential coverage reduction due to the device complexity reduction.

In an example, reduced capability devices may be explicitly identifiable to networks and network operators.

In an example, with a limited CORESET duration (e.g., a maximum 3 symbols for a CORESET duration) a limited number of CCEs (e.g., 24CCEs in 20 MHz) may be used to transmit PDCCH when the CORESET duration is limited. The limited number of CCEs may impact the PDCCH reliability and the flexibility of multiple UE scheduling. The PDCCH at the high aggregation level may be preferred to be transmitted in UEs with reduced capability (e.g., RedCap UEs) compensating the Rx antenna degradation, which may require to allocate more resources to PDCCH. Example embodiments may use enhanced CORESET/PDCCH design for PDCCH coverage recovery.

Figure 16:
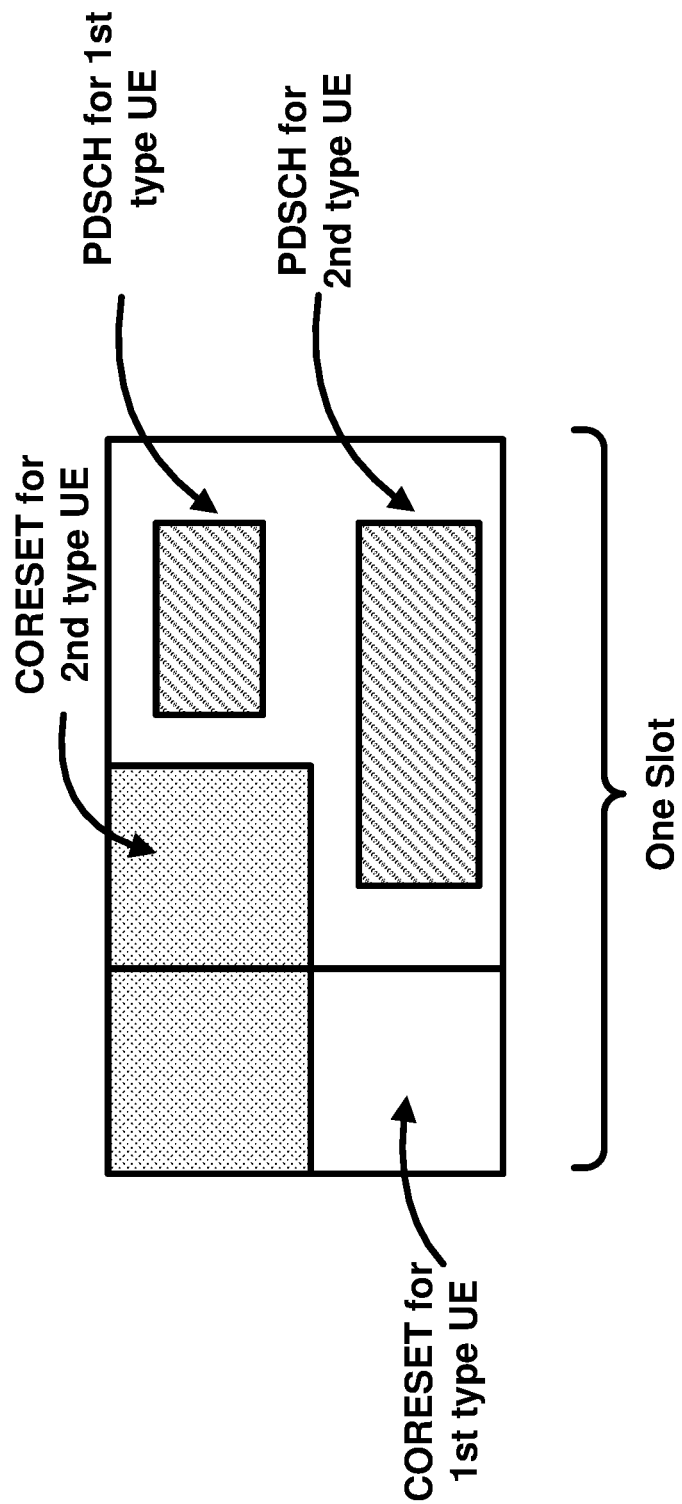
FIG. 16 shows an example process as per an aspect of an embodiment of the present disclosure.

In an example, the number of CCEs in one slot may be increased by configuring more symbols for a CORESET. An example is shown in FIG. 16. For example, a six-symbol length CORESET may be configured for one CORESET within one slot. The PDSCH and the associated DMRS may have to be transmitted at the seventh symbol of a slot or in the later slots. A new resource mapping process may be used based on using a longer CORESET duration (e.g., longer than three symbols). In an example, resource collision avoidance processes may be used to avoid resource collisions due to the different CCE mapping rules if CORESET for RedCap UEs and that for normal UEs are configured with overlapping resources.

Figure 17:
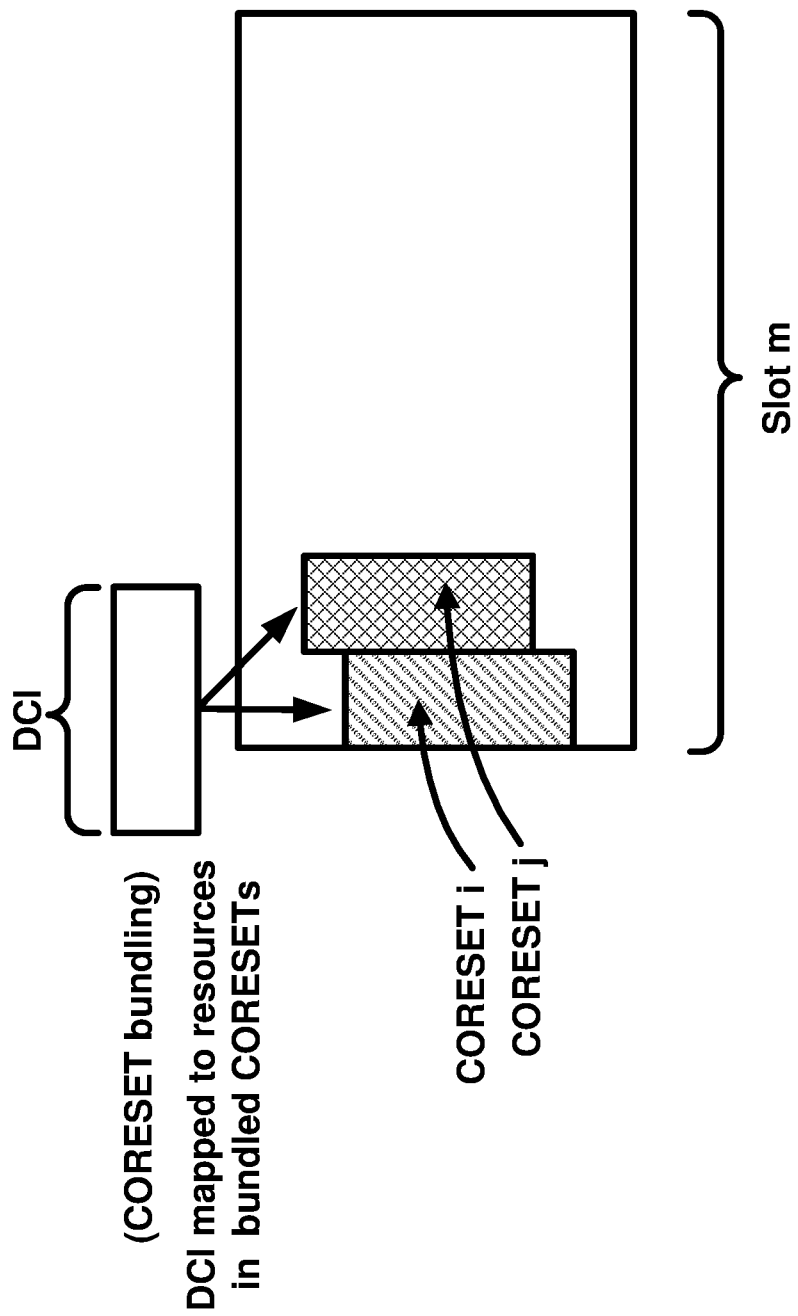
FIG. 17 shows an example process as per an aspect of an embodiment of the present disclosure.
Figure 18:
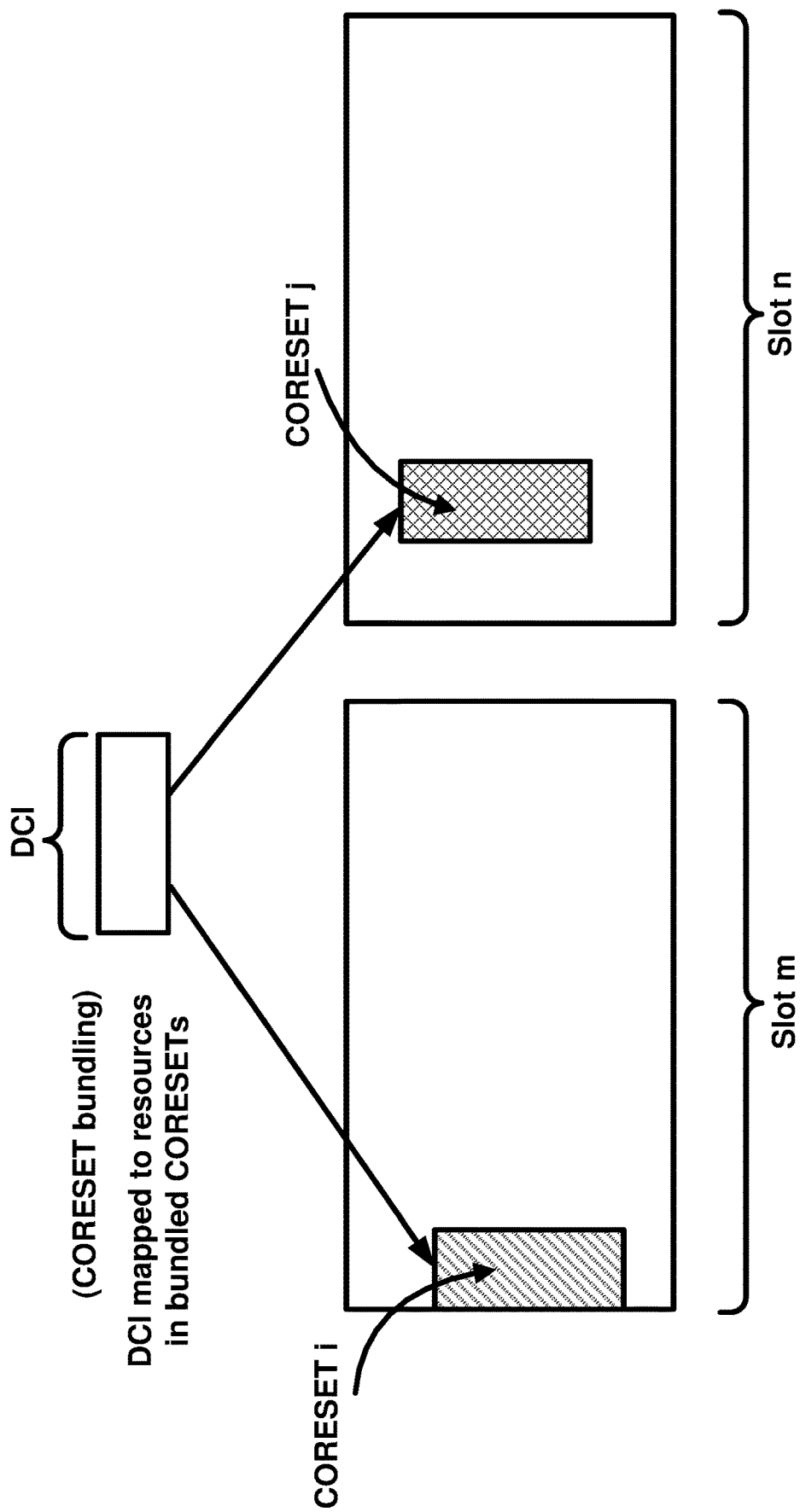
FIG. 18 shows an example process as per an aspect of an embodiment of the present disclosure.

In an example, a CORESET bundling/concatenating process may be used to increase the CCE number for PDCCH transmission. Examples are shown in FIG. 17 and FIG. 18. A plurality of CORESETs (e.g., a plurality of CORESETs at different time occasions) may be bundled to increase the CCE number. The wireless device may receive configuration parameters indicating that the plurality of CORESETs may be used for bundling and increasing the number of CCEs for transmission of PDCCH. The bundled CORESETs may be transmitted in the same slot or several different slots. An encoded DCI may be split into several parts and mapped to the bundled CORESETs. A RedCap UE may collect/aggregate the desired CCEs from the bundled CORESETs according to a predefined or a configured CCE mapping rule and decode DCI.

Figure 19:
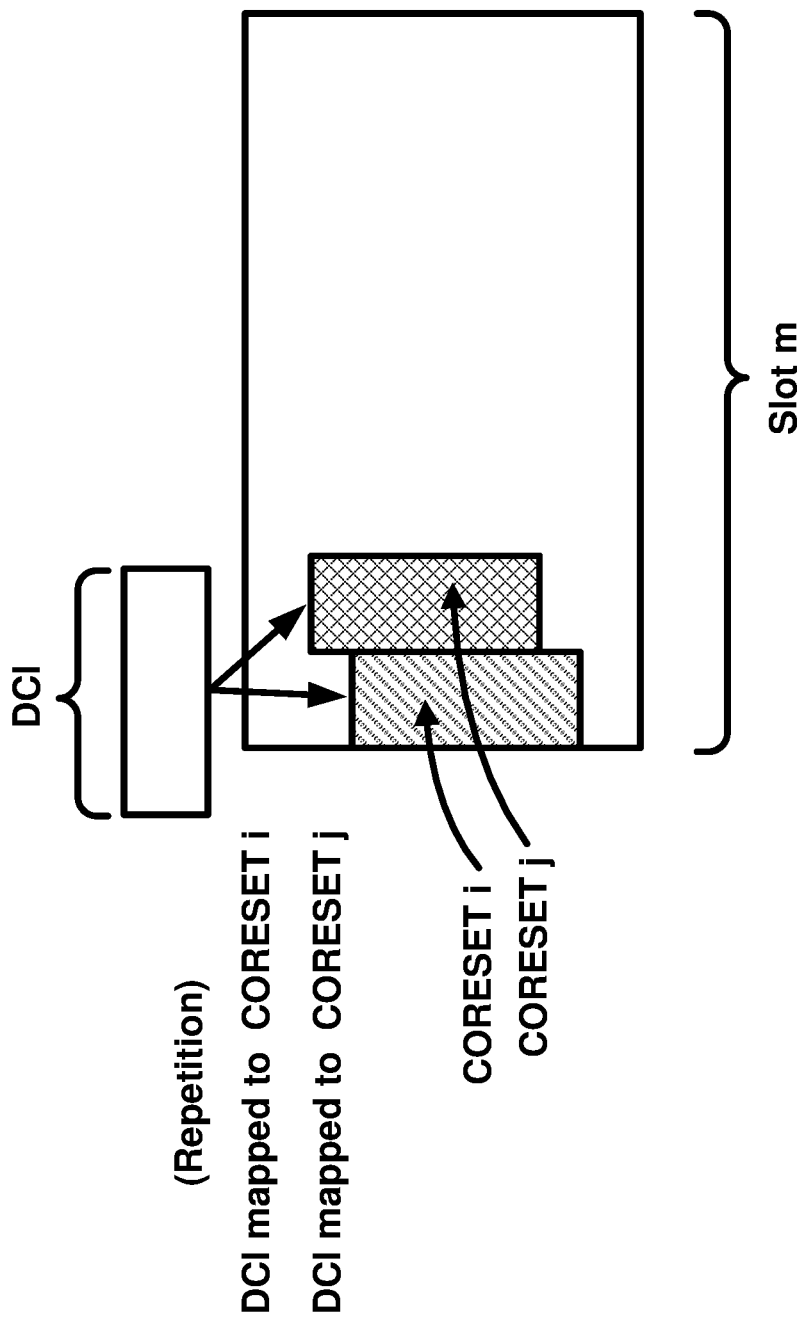
FIG. 19 shows an example process as per an aspect of an embodiment of the present disclosure.
Figure 20:
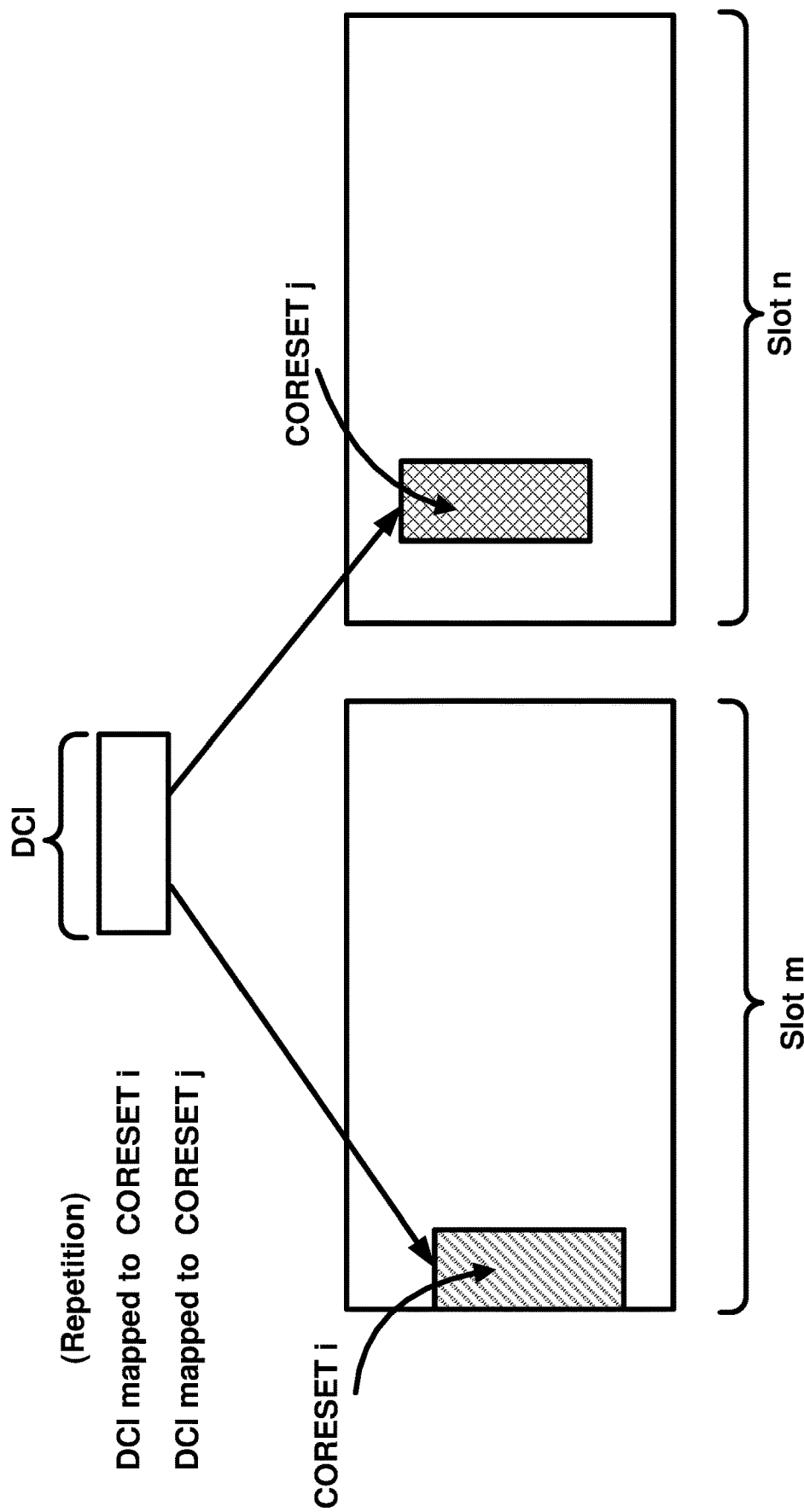
FIG. 20 shows an example process as per an aspect of an embodiment of the present disclosure.

In an example, PDCCH repetition may be used to increase PDCCH reliability. Examples are shown in FIG. 19 and FIG. 20. A PDCCH repetition may be intra-slot PDCCH repetition or inter-slot PDCCH repetition. For inter-slot PDCCH repetition, the base station may transmit a DCI repetitively in a plurality of CORESETs in a plurality of slots (e.g., the continuous slots). For intra-slot PDCCH repetition, the base station may transmit a DCI repetitively in plurality of CORESETs within a slot. A RedCap UE may combine the received signals of these CORESETs to further increase the detection reliability.

In an example, a PDCCH candidate may correspond to an aggregation level and a repetition number. One or more PDCCH candidates with the same aggregation level and same repetition number may be configured in the search space configuration. The DCI may be assumed to be repeated in the same resources (e.g., related with same aggregation level) in the repetitions.

In an example, a CORESET may be repeated in time or frequency, effectively creating an extended CORESET. In an example, the repeated PDCCH may be discontinuous in time if it occupies fewer symbols than the CORESET duration. In an example, higher aggregation levels may be used in conjunction with an extended CORESET for RedCap UEs.

In an example, an IE TCI-State may associate one or more DL reference signals with a corresponding quasi-colocation (QCL) type. The IE TCI-State may comprise a plurality of parameters. The plurality of parameters may comprise a bwp-Id indicating the DL BWP which the RS is located in. A cell parameter may indicate a UE's serving cell in which the referenceSignal is configured. If the field is absent, it may apply to the serving cell in which the TCI-State is configured. The RS can be located on a serving cell other than the serving cell in which the TCI-State is configured for one or more QCL type (e.g., if the qcl-Type is configured as typeC or typed). A parameter referenceSignal may indicate a reference signal with which quasi-collocation information is provided. A qcl-Type parameter may indicate a QCL type.

In an example, an IE TCI-StateId may be used to identify a TCI-State configuration.

In an example, a UE may be configured with a list of up to M TCI-State configurations within the higher layer parameter PDSCH-Config to decode PDSCH according to a detected PDCCH with DCI intended for the UE and the given serving cell, where M may depend on a UE capability (e.g., maxNumberConfiguredTCIstatesPerCC). A TCI-State may contain parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship may be configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs.

The quasi co-location types corresponding to a DL RS may be given by the higher layer parameter qcl-Type in QCL-Info and may take one of the following values: 'QCL- TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}.

In an example, a UE may receive an activation command (e.g., a MAC control element) used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs may be applied for DL BWPs in the indicated CCs.

In an example, when a UE supports two TCI states in a codepoint of the DCI field 'Transmission Configuration Indication' the UE may receive an activation command, the activation command may be used to map up to 8 combinations of one or two TCI states to the codepoints of the DCI field 'Transmission Configuration Indication'. The UE may not be expected to receive more than 8 TCI states in the activation command.

In an example, when the UE would transmit a PUCCH with HARQ-ACK information in slot n corresponding to the PDSCH carrying the activation command, the indicated mapping between TCI states and codepoints of the DCI field 'Transmission Configuration Indication' may be applied starting from the first slot that is after slot $n+3N_{slot}^{subframe,\mu}$ where $\mu$ is the SCS configuration for the PUCCH. If tci-PresentInDCI is set to "enabled" or tci-PresentInDCI-ForFormat1_2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

In an example, if a UE is configured with the higher layer parameter tci-PresentInDCI that is set as 'enabled' for the CORESET scheduling the PDSCH, the UE may assume that the TCI field is present in the DCI format 1_1 of the PDCCH transmitted on the CORESET. In an example, if a UE is configured with the higher layer parameter tci-PresentIn-DCI-ForFormat1_2 for the CORESET scheduling the PDSCH, the UE may assume that the TCI field with a DCI field size indicated by tci-PresentInDCI-ForFormat1_2 is present in the DCI format 1_2 of the PDCCH transmitted on the CORESET. If the PDSCH is scheduled by a DCI format not having the TCI field present, and the time offset between the reception of the DL DCI and the corresponding PDSCH is equal to or greater than a threshold timeDurationForQCL if applicable, where the threshold is based on reported UE capability, for determining PDSCH antenna port quasi co-location, the UE may assume that the TCI state or the QCL assumption for the PDSCH is identical to the TCI state or QCL assumption whichever is applied for the CORESET used for the PDCCH transmission.

In an example, if the PDSCH is scheduled by a DCI format having the TCI field present, the TCI field in DCI in the scheduling component carrier points to the activated TCI states in the scheduled component carrier or DL BWP, the UE may use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold may be based on reported UE capability. When the UE is configured with a single slot PDSCH, the indicated TCI state may be based on the activated TCI states in the slot with the scheduled PDSCH. When the UE is configured with a multi-slot PDSCH, the indicated TCI state may be based on the activated TCI states in the first slot with the scheduled PDSCH, and UE may expect the activated TCI states are the same across the slots with the scheduled PDSCH. When the UE is configured with CORESET associated with a search space set for cross-carrier scheduling and the UE is not configured with [enableDefaultBeamForCSS], the UE may expect tci-PresentInDCI is set as 'enabled' or tci-PresentIn-DCI-ForFormat1_2 is configured for the CORESET, and if one or more of the TCI states configured for the serving cell scheduled by the search space set contains 'QCL-TypeD', the UE may expect the time offset between the reception of the detected PDCCH in the search space set and the corresponding PDSCH is larger than or equal to the threshold timeDurationForQCL.

In an example, independent of the configuration of tci-PresentInDCI and tci-PresentInDCI-ForFormat1_2 in RRC connected mode, if no TCI codepoints are mapped to two different TCI states and the offset between the reception of the DL DCI and the corresponding PDSCH is less than the threshold timeDurationForQCL, the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest controlResourceSetId in the latest slot in which one or more CORESETs within the active BWP of the serving cell are monitored by the UE. In this case, if the 'QCL-TypeD' of the PDSCH DM-RS is different from that of the PDCCH DM-RS with which they overlap in at least one symbol, the UE may be expected to prioritize the reception of PDCCH associated with that CORESET. This may also apply to the intra-band CA case (when PDSCH and the CORESET are in different component carriers). If none of configured TCI states for the serving cell of scheduled PDSCH contains 'QCL-TypeD', the UE may obtain the other QCL assumptions from the indicated TCI states for its scheduled PDSCH irrespective of the time offset between the reception of the DL DCI and the corresponding PDSCH. If a UE configured by higher layer parameter PDCCH-Config that contains two different values of CORESET-PoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

In an example, the network may activate and deactivate the configured TCI states for PDSCH of a Serving Cell or a CC list by sending the TCI States Activation/Deactivation for UE-specific PDSCH MAC CE. The configured TCI states for PDSCH may be initially deactivated upon configuration and after a handover.

In an example, if the MAC entity receives a TCI States Activation/Deactivation for UE-specific PDSCH MAC CE on a Serving Cell, a MAC entity may indicate to lower layers the information regarding the TCI States Activation/Deactivation for UE-specific PDSCH MAC CE.

In an example, the network may indicate a TCI state for PDCCH reception for a CORESET of a Serving Cell or a CC list by sending the TCI State Indication for UE-specific PDCCH MAC CE.

In an example, if the MAC entity receives a TCI State Indication for UE-specific PDCCH MAC CE on a Serving Cell, the MAC entity may indicate to lower layers the information regarding the TCI State Indication for UE-specific PDCCH MAC CE.

In an example, the network may activate and deactivate the configured TCI states for the codepoint of the DCI Transmission configuration indication field for PDSCH of a Serving Cell by sending the Enhanced TCI States Activation/Deactivation for UE-specific PDSCH MAC CE. The configured TCI states for PDSCH may be initially deactivated upon configuration and after a handover.

In an example, if the MAC entity receives an Enhanced TCI States Activation/Deactivation for UE-specific PDSCH MAC CE on a Serving Cell, the MAC entity may indicate to lower layers the information regarding the Enhanced TCI States Activation/Deactivation for UE-specific PDSCH MAC CE.

Figure 21:
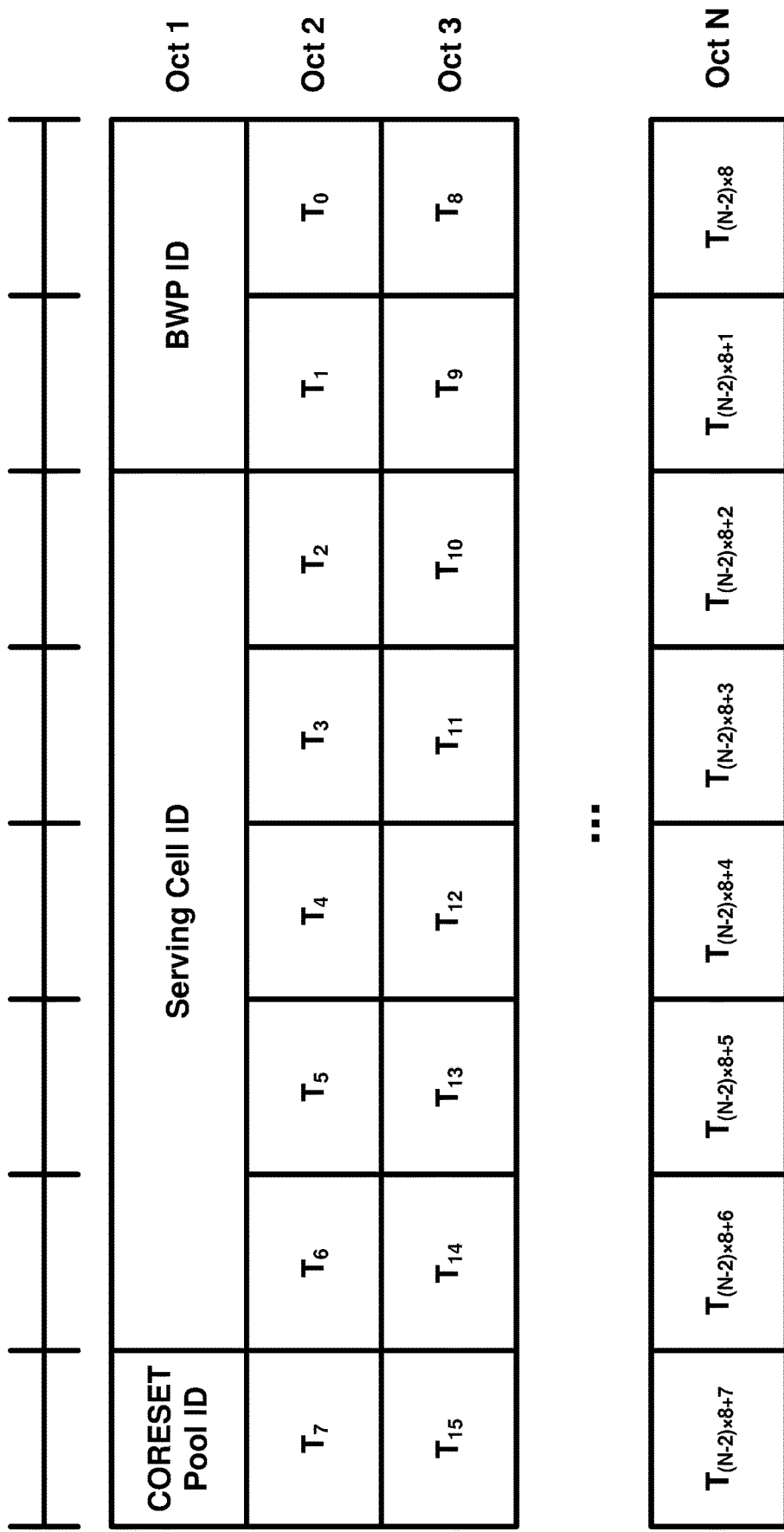
FIG. 21 shows an example MAC CE format as per an aspect of an embodiment of the present disclosure.

An example TCI States Activation/Deactivation for UE-specific PDSCH MAC CE is shown in FIG. 21. In an example, a TCI States Activation/Deactivation for UE-specific PDSCH MAC CE may be identified by a MAC subheader with a corresponding LCID. The UE-specific PDSCH MAC CE may have a variable size comprising a plurality of fields. The plurality of fields may comprise a Serving Cell ID field which may indicate the identity of the Serving Cell for which the MAC CE applies. The length of the field may be 5 bits. If the indicated Serving Cell is configured as part of a CC-list, this MAC CE may applies to the CCs in the CC list. The plurality of fields may comprise a Serving Cell ID field which may indicate the identity of the Serving Cell for which the MAC CE applies. The length of the field may be 5 bits. If the indicated Serving Cell is configured as part of a CC-list, this MAC CE may apply to the CCs in the CC list. The plurality of fields may comprise a Serving Cell ID field which may indicate the identity of the Serving Cell for which the MAC CE applies. The length of the field may be 5 bits. If the indicated Serving Cell is configured as part of a CC-list as specified, this MAC CE may apply to the CCs in the CC list. The plurality of fields may comprise a BWP ID field which may indicate a DL BWP for which the MAC CE applies as the codepoint of the DCI bandwidth part indicator field. The length of the BWP ID field may be 2 bits. This field may be ignored if the MAC CE applies to a CC list. The plurality of fields may comprise a Ti field. If there is a TCI state with TCI-StateId i, this field may indicate the activation/deactivation status of the TCI state with TCI-StateId i, otherwise MAC entity may ignore the Ti field. The Ti field may be set to 1 to indicate that the TCI state with TCI-StateId i may be activated and mapped to the codepoint of the DCI Transmission Configuration Indication field. The Ti field may be set to 0 to indicate that the TCI state with TCI-StateId i may be deactivated and may not be mapped to the codepoint of the DCI Transmission Configuration Indication field. The codepoint to which the TCI State is mapped is determined by its ordinal position among the TCI States with Ti field set to 1. The first TCI State with Ti field set to 1 may be mapped to the codepoint value 0, second TCI State with Ti field set to 1 may be mapped to the codepoint value 1 and so on. The maximum number of activated TCI states may be 8. The plurality of fields may comprise a CORESET Pool ID: This field indicates that mapping between the activated TCI states and the codepoint of the DCI Transmission Configuration Indication set by field Ti is specific to the ControlResourceSetId configured with CORESET Pool ID as specified in TS 38.331 [5]. This field may be set to 1 indicating that this MAC CE may be applied for the DL transmission scheduled by CORESET with the CORESET pool ID equal to 1, otherwise, this MAC CE may be applied for the DL transmission scheduled by CORESET pool ID equal to 0.

Figure 22:
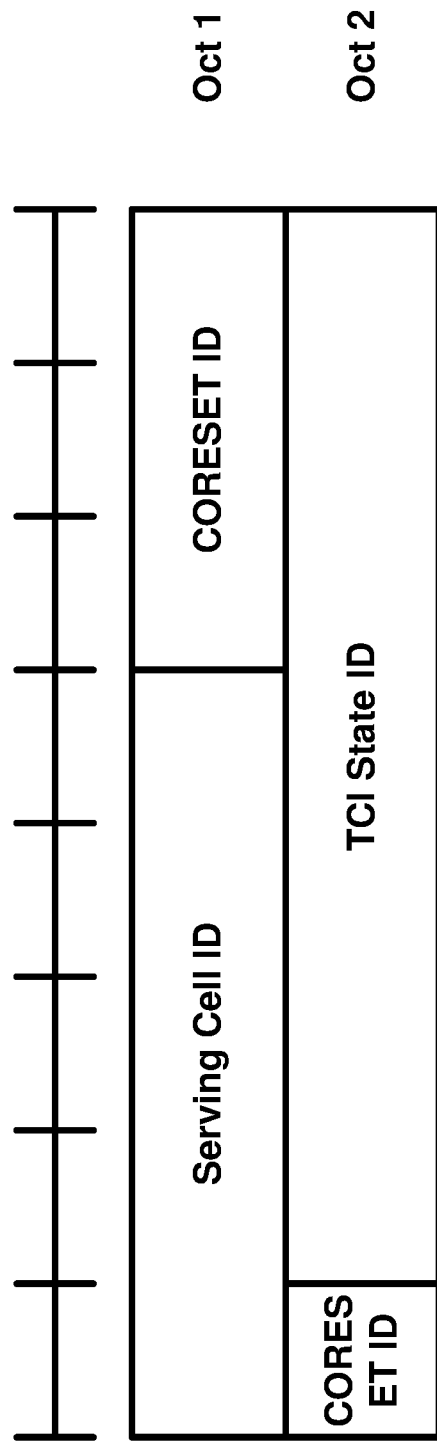
FIG. 22 shows an example MAC CE format as per an aspect of an embodiment of the present disclosure.

An example TCI State Indication for UE-specific PDCCH MAC CE is shown in FIG. 22. In an example, a TCI State Indication for UE-specific PDCCH MAC CE may be identified by a MAC subheader with a corresponding LCID. The UE-specific PDCCH MAC CE may have a fixed size of 16 bits with a plurality of fields. The plurality of fields may comprise a Serving Cell ID field indicating the identity of the Serving Cell for which the MAC CE applies. The length of the field may be 5 bits. If the indicated serving cell is configured as part of a CC-list, this MAC CE may apply to the CCs in the CC list. The plurality of fields may comprise a CORESET ID field which indicates a Control Resource Set identified with ControlResourceSetId, for which the TCI State is being indicated. In case the value of the field is 0, the field refers to the Control Resource Set configured by controlResourceSetZero. The length of the field may be 4 bits. The plurality of fields may comprise a TCI State ID field indicating the TCI state identified by TCI-StateId applicable to the Control Resource Set identified by CORESET ID field. If the field of CORESET ID is set to 0, this field may indicate a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field may indicate a TCI-StateId configured by tci-StatesPDCCH-ToAddList and tci-StatesPDCCH-ToReleaseList in the controlResourceSet identified by the indicated CORESET ID. The length of the field may be 7 bits.

Figure 23:
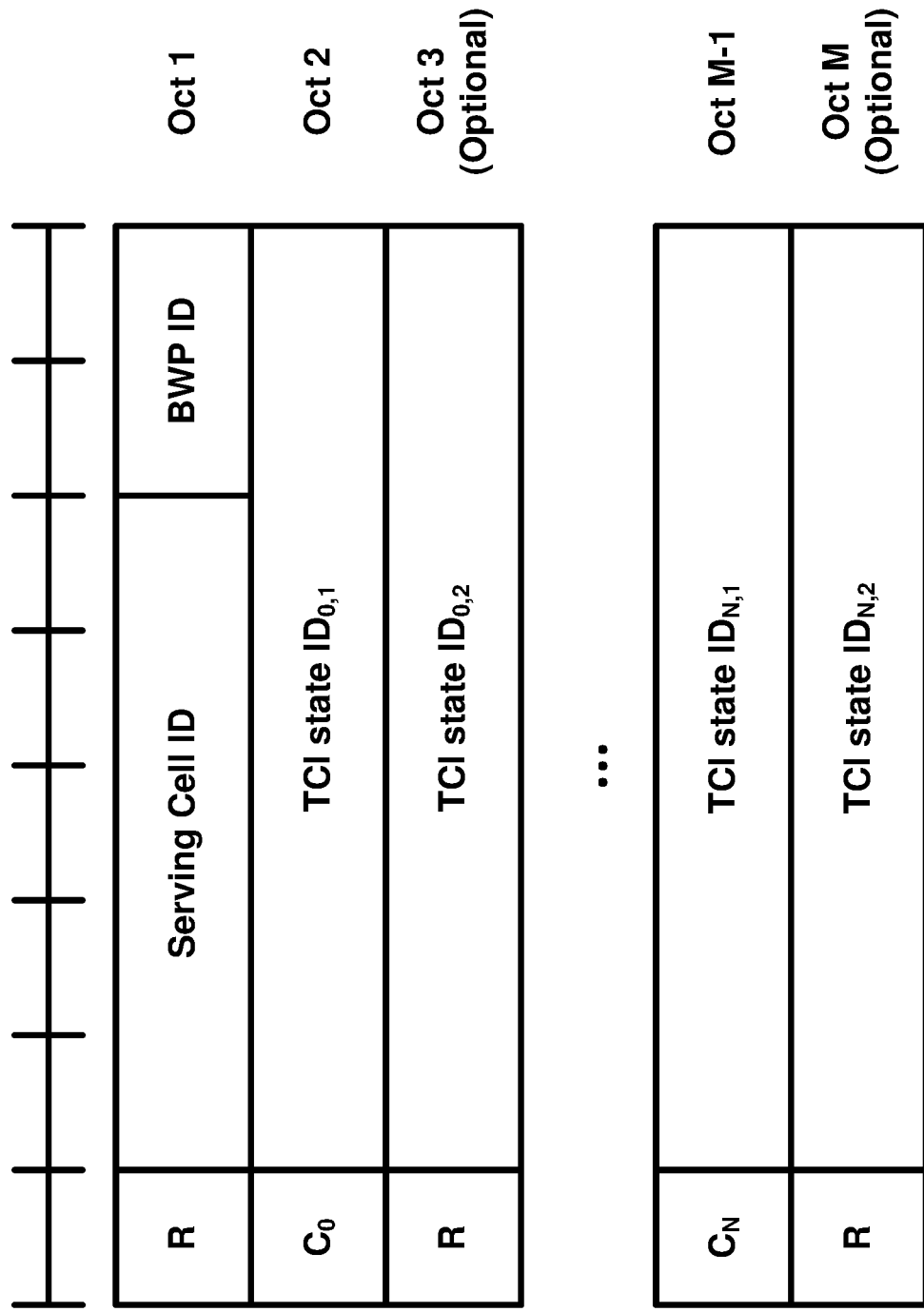
FIG. 23 shows an example MAC CE format as per an aspect of an embodiment of the present disclosure.

An example Enhanced TCI States Activation/Deactivation for UE-specific PDSCH MAC CE is shown in FIG. 23. In an example, an Enhanced TCI States Activation/Deactivation for UE-specific PDSCH MAC CE may be identified by a MAC PDU subheader with a corresponding LCID. This MAC CE may have a variable size comprising a plurality of fields. The plurality of fields may comprise a Serving Cell ID field indicating the identity of the Serving Cell for which the MAC CE applies. The length of the field may be 5 bits. The plurality of fields may comprise a BWP ID field indicating a DL BWP for which the MAC CE applies as the codepoint of the DCI bandwidth part indicator field. The length of the BWP ID field may be 2 bits. The plurality of fields may comprise Ci fields indicating whether the octet containing TCI state IDi,2 is present. If this field is set to "1", the octet containing TCI state IDi,2 may be present. If this field is set to "0", the octet containing TCI state IDi,2 may not be present. The plurality of fields may comprise TCI state IDi,j fields indicating the TCI state identified by TCI-StateId, where i may be the index of the codepoint of the DCI Transmission configuration indication field and TCI state IDi,j may denote the jth TCI state indicated for the ith codepoint in the DCI Transmission Configuration Indication field. The TCI codepoint to which the TCI States are mapped may be determined by its ordinal position among all the TCI codepoints with sets of TCI state IDi,j fields, e.g., the first TCI codepoint with TCI state ID0,1 and TCI state ID0,2 may be mapped to the codepoint value 0, the second TCI codepoint with TCI state ID1,1 and TCI state ID1,2 may be mapped to the codepoint value 1 and so on. The TCI state IDi,2 may be optional based on the indication of the Ci field. The maximum number of activated TCI codepoint may br 8 and the maximum number of TCI states mapped to a TCI codepoint may be 2. The plurality of fields may comprise a R field indicating a Reserved bit, set to "0".

In an example, a MAC entity may be configured by RRC with a DRX functionality that may control the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, and TPC-SRS-RNTI. When in RRC_CONNECTED, if DRX is configured, for the activated Serving Cells, the MAC entity may monitor the PDCCH discontinuously using the DRX operation.

RRC may control DRX operation by configuring a plurality of parameters. The plurality of parameters may comprise a drx-onDurationTimer parameter indicating the duration at the beginning of a DRX Cycle; a drx-SlotOffset parameter indicating the delay before starting the drx-onDurationTimer; a drx-InactivityTimer parameter the duration after the PDCCH occasion in which a PDCCH indicates a new UL or DL transmission for the MAC entity; a drx-RetransmissionTimerDL parameter (per DL HARQ process except for the broadcast process) may indicate the maximum duration until a DL retransmission is received; a drx-RetransmissionTimerUL (per UL HARQ process): the maximum duration until a grant for UL retransmission is received; a drx-LongCycleStartOffset parameter indicating the Long DRX cycle and drx-StartOffset which defines the subframe where the Long and Short DRX Cycle starts; a drx-ShortCycle parameter indicating a Short DRX cycle; a drx-ShortCycleTimer parameter indicating the duration the UE may follow the Short DRX cycle; a drx-HARQ-RTT-TimerDL parameter (per DL HARQ process except for the broadcast process) indicating the minimum duration before a DL assignment for HARQ retransmission is expected by the MAC entity; a drx-HARQ-RTT-TimerUL parameter (per UL HARQ process) indicating the minimum duration before a UL HARQ retransmission grant is expected by the MAC entity; a ps-Wakeup parameter indicating the configuration to start associated drx-onDurationTimer in case DCP is monitored but not detected; a ps-Periodic_CSI_Transmit parameter indicating the configuration to report periodic CSI during the time duration indicated by drx-onDurationTimer in case DCP is configured but associated drx-onDuration-Timer is not started; and a ps-TransmitPeriodicL1-RSRP parameter indicating the configuration to transmit periodic L1-RSRP report(s) during the time duration indicated by drx-onDurationTimer in case DCP is configured but associated drx-onDurationTimer is not started.

In an example, when a DRX cycle is configured, the Active Time may include the time while: drx-onDuration-Timer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment, the MAC entity may: start the drx-HARQ-RTT-TimerDL for the corresponding HARQ process in the first symbol after the end of the corresponding transmission carrying the DL HARQ feedback; and stop the drx-RetransmissionTimerDL for the corresponding HARQ process.

In an example, when DRX is configured, if a MAC PDU is transmitted in a configured uplink grant the MAC entity may: start the drx-HARQ-RTT-TimerUL for the corresponding HARQ process in the first symbol after the end of the first repetition of the corresponding PUSCH transmission; and stop the drx-RetransmissionTimerUL for the corresponding HARQ process.

In an example, when DRX is configured, if a drx-HARQ-RTT-TimerDL expires, if the data of the corresponding HARQ process was not successfully decoded, the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires, the MAC entity may start the drx-RetransmissionTimerUL for the corresponding HARQ process in the first symbol after the expiry of drx-HARQ-RTT-TimerUL.

In an example, when DRX is configured, if a DRX Command MAC CE or a Long DRX Command MAC CE is received, the MAC entity may: stop drx-onDurationTimer; and stop drx-InactivityTimer.

In an example, when DRX is configured, if drx-InactivityTimer expires or a DRX Command MAC CE is received, if the Short DRX cycle is configured, the MAC entity may: start or restart drx-ShortCycleTimer in the first symbol after the expiry of drx-InactivityTimer or in the first symbol after the end of DRX Command MAC CE reception; and use the Short DRX Cycle.

In an example, when DRX is configured, if drx-InactivityTimer expires or a DRX Command MAC CE is received, if the Short DRX cycle is not configured, the MAC entity may use the Long DRX cycle.

In an example, when DRX is configured, if drx-ShortCycleTimer expires, the MAC entity may use the Long DRX cycle.

In an example, when DRX is configured, if a Long DRX Command MAC CE is received, the MAC entity may: stop drx-ShortCycleTimer; and use the Long DRX cycle.

In an example, when DRX is configured, if the Short DRX Cycle is used, and [(SFN×10)+subframe number] modulo (drx-ShortCycle)=(drx-StartOffset) modulo (drx-ShortCycle), the MAC entity may start drx-onDurationTimer after drx-SlotOffset from the beginning of the subframe.

In an example, when DRX is configured, if the Long DRX Cycle is used, and [(SFN×10)+subframe number] modulo (drx-LongCycle)=drx-StartOffset, if DCP is configured for the active DL BWP, if DCP indication associated with the current DRX Cycle received from lower layer indicated to start drx-onDurationTimer; or if DCP occasion(s) in time domain, associated with the current DRX Cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap; or if ps-Wakeup is configured with value true and DCP indication associated with the current DRX Cycle has not been received from lower layers: the MAC entity may start drx-onDuration-Timer after drx-SlotOffset from the beginning of the subframe.

In an example, when DRX is configured, if the Long DRX Cycle is used, and [(SFN×10)+subframe number] modulo (drx-LongCycle)=drx-StartOffset, if DCP is not configured for the active DL BWP, the MAC entity may start drx-onDurationTimer after drx-SlotOffset from the beginning of the subframe.

In an example, when DRX is configured, if the MAC entity is in Active Time, the MAC entity may monitor the PDCCH. If the PDCCH indicates a DL transmission, the MAC entity may start the drx-HARQ-RTT-TimerDL for the corresponding HARQ process in the first symbol after the end of the corresponding transmission carrying the DL HARQ feedback, regardless of LBT failure indication from lower layers. The MAC entity may stop the drx-RetransmissionTimerDL for the corresponding HARQ process. If the PDSCH-to-HARQ_feedback timing indicate a non-numerical k1 value, the MAC entity may start the drx-RetransmissionTimerDL in the first symbol after the PDSCH transmission for the corresponding HARQ process.

In an example, when DRX is configured, if the MAC entity is in Active Time, the MAC entity may monitor the PDCCH. If the PDCCH indicates a UL transmission, the MAC entity may start the drx-HARQ-RTT-TimerUL for the corresponding HARQ process in the first symbol after the end of the first repetition of the corresponding PUSCH transmission, regardless of LBT failure indication from lower layers; and stop the drx-RetransmissionTimerUL for the corresponding HARQ process.

In an example, when DRX is configured, if the MAC entity is in Active Time, the MAC entity may monitor the PDCCH. If the PDCCH indicates a new transmission (e.g., DL or UL), the MAC entity may start or restart drx-InactivityTimer in the first symbol after the end of the PDCCH reception.

In an example, when DRX is configured, if DCP is configured for the active DL BWP; and if the current symbol n occurs within drx-onDurationTimer duration; and if drx-onDurationTimer associated with the current DRX cycle is not started; and if the MAC entity would not be in Active Time considering grants/assignments/DRX Command MAC CE/Long DRX Command MAC CE received and Scheduling Request sent until 4 ms prior to symbol n when evaluating all DRX Active Time conditions, the MAC entity may: not transmit periodic SRS and semi-persistent SRS; not report semi-persistent CSI configured on PUSCH; if ps-Periodic_CSI_Transmit is not configured with value true: the MAC entity may not report periodic CSI on PUCCH. Otherwise, if ps-TransmitPeriodicL1-RSRP is configured with value true, the MAC entity may not report periodic CSI on PUCCH, except L1-RSRP report(s).

In an example, regardless of whether the MAC entity is monitoring PDCCH or not, the MAC entity may transmit HARQ feedback, aperiodic CSI on PUSCH, and aperiodic SRS when such is expected.

In an example, the MAC entity may not need to monitor the PDCCH if it is not a complete PDCCH occasion (e.g. the Active Time starts or ends in the middle of a PDCCH occasion).

In an example, if the MAC entity is configured with one or more SCells, the network may activate and deactivate the configured SCells. Upon configuration of an SCell, the SCell may be deactivated unless the parameter sCellState is set to activated for the SCell within RRCReconfiguration message.

In an example, the configured SCell(s) may be activated and deactivated by: receiving the SCell Activation/Deactivation MAC CE; configuring sCellDeactivationTimer timer per configured SCell (except the SCell configured with PUCCH, if any): the associated SCell may be deactivated upon its expiry.

In an example, for each configured SCell, else if an SCell Activation/Deactivation MAC CE is received deactivating the SCell; or if the sCellDeactivationTimer associated with the activated SCell expires, the MAC entity may: deactivate the SCell according to a timing; stop the sCellDeactivationTimer associated with the SCell; stop the bwp-InactivityTimer associated with the SCell; deactivate active BWP associated with the SCell; clear any configured downlink assignment and any configured uplink grant Type 2 associated with the SCell respectively; clear any PUSCH resource for semi-persistent CSI reporting associated with the SCell; suspend any configured uplink grant Type 1 associated with the SCell; cancel the triggered BFRs for this Serving Cell; flush HARQ buffers associated with the SCell; and cancel, if any, triggered consistent LBT failure for the SCell.

In an example, for each configured SCell, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment: the MAC entity may restart the sCellDeactivationTimer associated with the SCell.

In an example, for each configured SCell, if the SCell is deactivated: the MAC entity may not transmit SRS on the SCell; may not report CSI for the SCell; may not transmit on UL-SCH on the SCell; may not transmit on RACH on the SCell; may not monitor the PDCCH on the SCell; may not monitor the PDCCH for the SCell; and may not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when SCell is deactivated, the ongoing Random Access procedure on the SCell, if any, may be aborted.

The complexity reduction (e.g., bandwidth reduction) for certain types of wireless devices (e.g., reduced capability wireless devices) may result in increased errors and inefficiency in downlink receptions, for example downlink control channel reception, of these wireless device types. For example, scheduling efficiency and reliability may be impacted as a result of this complexity reduction. Existing solutions, for example increasing the duration of CORESETs or PDCCH repetition or CORESET resource bundling, introduce new problems for control channel reception. There is a need to enhance the control information reception processes for these types of wireless devices. Example embodiments enhance the control information reception processes for these types of wireless devices.

In an example, a wireless device may receive one or more messages comprising configuration parameters. The one or more messages may comprise one or more RRC messages. The wireless device may receive the one or more messages in response to transmitting one or more capability messages comprising/indicating capability parameters of the wireless device. In an example, the capability parameters may indicate a type of the wireless device. In an example, the wireless device may indicate a type of the wireless device based on the capability parameters and/or based on a different procedure (for example, based on random access resources/occasions used for a random access process for example during an attach procedure). An example of the type of the wireless device may be a reduced capability type.

The one or more messages may comprise configuration parameters of a one or more cells. A cell of the one or more cells may have one of a plurality of types. In an example, the plurality of types ma comprise licensed cell and unlicensed cell. In an example, the unlicensed cell may be a licensed assisted access (LAA) cell. An LAA cell may be configured for carrier aggregation with at least one licensed cell. In an example, the one or more cells may be grouped into a primary cell group and a secondary cell group. The wireless device may communicate with a first base station (e.g., a master base station) via the primary cell group and may communicate with a second base station (e.g., a secondary base station) via the secondary cell group. The cells in a cell group may comprise a primary cell. The cells in a cell group may comprise one or more secondary cells.

The one or more messages may comprise configuration parameters of one or more bandwidth parts for one or more first cells in the one or more cells. The configuration parameters of the one or more bandwidth parts may comprise downlink control channel configuration parameters. The downlink control channel configuration parameters on a bandwidth part of a cell may comprise configuration parameters of one or more control resource sets. The downlink control channel configuration parameters may comprise configuration parameters of one or more search spaces. A search space may be associated with a control resource set. The configuration parameters of a search space may comprise an identifier of its associated control resource set.

In an example embodiment, a wireless device may receive configuration parameters of a first control resource set (CORESET) and a second CORESET. The first CORESET may be associated with a first CORESET ID and the second CORESET may be associated with a second CORESET ID. In an example, the configuration parameters may comprise a first ControlResourceSetId IE indicating the first CORESET ID and a second ControlResourceSetId IE indicating the second CORESET ID. A CORESET ID may indicate an identity, used to identify a control resource set within a serving cell. The ID space may be used across the BWPs of a Serving Cell. The CORESET configuration parameters may comprise a Duration parameter indicating Contiguous time duration of the CORESET in number of symbols. The CORESET configuration parameters may further indicate frequency domain resources of the CORESET. The CORESET configuration parameters may further comprise a CORESET pool/group index/identifier indicating an index of the CORESET pool/group for the CORESET. The wireless device may receive configuration parameters of a plurality of CORESETs grouped into a plurality of CORESET groups/pools and a CORESET pool/group index/identifier may indicate the CORESET pool/group to which a CORESET belongs to.

In an example embodiment, the configuration parameters of a CORESET may indicate one or more transmission configuration indicator (TCI) states associated with the CORESET. The configuration parameters of the CORESET may indicate identifiers of the one or more TCI states associated with the CORESET. A number of TCI states associated with the CORESET may be less than or equal to a maximum number of TCI states, for example configured using a maxNrofTCI-StatesPDCCH parameter.

The configuration parameters of a TCI state may indicate one or two DL reference signals with a corresponding quasi-colocation (QCL) type. The configuration parameters of the TCI state may comprise a TCI state identifier associated with the TCI state. The configuration parameters of the TCI state may comprise a QCL type IE indicating a serving cell identifier, a BWP identifier, a reference signal (e.g., a choice between CSI-RS and SSB), and may indicate what is a type of the QCL for the TCI state (e.g., type A, type B, type C, type D QCL type).

In an example embodiment, a wireless device may receive a downlink control information via a plurality of CORESETs. The wireless device may receive the downlink control information via first radio resources of the first CORESET and second radio resources of the second CORESET. In an example, the first CORESET may be in a first slot (e.g., in one or more first symbols of the first slot) and the second CORESET may be in a second slot (e.g., in one or more second symbols of the second slot). In an example, the first CORESET and the second CORESET may be in the same slot. In an example, the wireless device may receive the downlink control information by receiving repetitions of the downlink control information via the first CORESET and the second CORESET. In an example, first radio resources of the first CORESET and the second radio resources of the second CORESET may be bundled for transmission of the downlink control information. The downlink control information may be mapped to the bundled resources (e.g., the first radio resources and the second radio resources).

In an example embodiment, a wireless device may receive a downlink control information via a plurality of search spaces. The wireless device may receive the downlink control information via first radio resources of a first search space (e.g., first radio resources of a first CORESET associated with the first search space) and second radio resources of a second search space (e.g., second radio resources of a second CORESET associated with the second search space). In an example, the first CORESET may be in a first slot (e.g., in one or more first symbols of the first slot) and the second CORESET may be in a second slot (e.g., in one or more second symbols of the second slot). In an example, the first CORESET and the second CORESET may be in the same slot. In an example, the wireless device may receive the downlink control information by receiving repetitions of the downlink control information via the first search space and the second search space. In an example, first radio resources of the first search space (e.g., first radio resources of a first CORESET associated with the first search space) and the second radio resources of the second search space (e.g., second radio resources of a second CORESET associated with the second search space) may be bundled for transmission of the downlink control information. The downlink control information may be mapped to the bundled resources (e.g., the first radio resources and the second radio resources).

Figure 24:
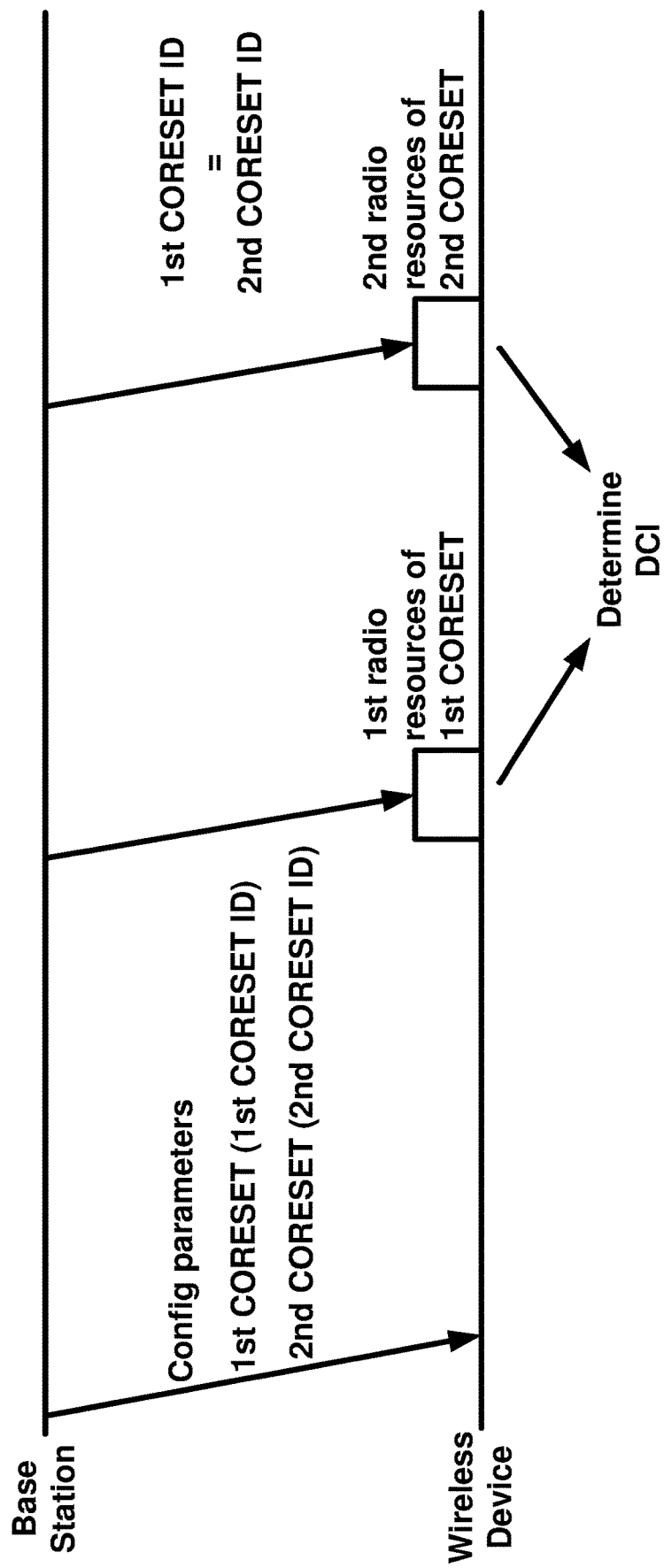
FIG. 24 shows an example process as per an aspect of an embodiment of the present disclosure.

In an example embodiment as shown in FIG. 24, the wireless device may receive, from one or more base stations, the downlink control information via first radio resources of the first CORESET and second radio resources of the second CORESET, wherein the first control resource set identifier and the second control resource set identifier have the same value. The wireless device may receive the downlink control information via first radio resources of the first CORESET and second radio resources of the second CORESET based on the first control resource set identifier and the second control resource set identifier having the same value. The wireless device may receive the downlink control information via first radio resources of the first CORESET and second radio resources of the second CORESET wherein the wireless device expects that the first CORESET identifier and the second CORESET identifier have the same value.

In an example embodiment, the wireless device may receive, from one or more base stations, the downlink control information via first radio resources of the first search space (e.g., first radio resources of a first CORESET associated with the first search space) and second radio resources of the second search space (e.g., second radio resources of a second CORESET associated with the second search space), wherein a first search space identifier of the first search space and a second search space identifier of the second search space have the same value. The wireless device may receive the downlink control information via first radio resources of the first search space and second radio resources of the second search space based on the first search space identifier and the second search space identifier having the same value. The wireless device may receive the downlink control information via first radio resources of the first search space and second radio resources of the second search space wherein the wireless device expects that the first search space identifier and the second search space identifier have the same value.

Figure 25:
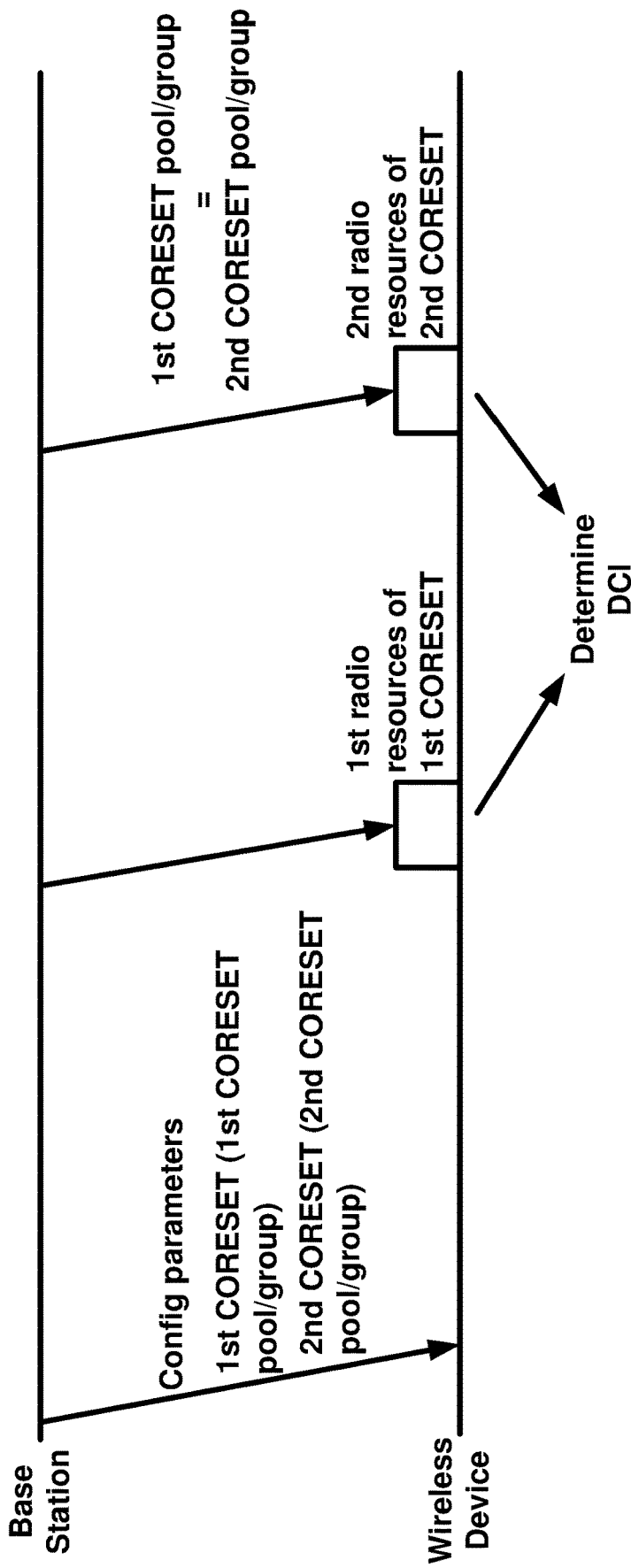
FIG. 25 shows an example process as per an aspect of an embodiment of the present disclosure.

In an example embodiment as shown in FIG. 25, the wireless device may receive, from one or more base stations, the downlink control information via first radio resources of the first CORESET and second radio resources of the second CORESET, wherein a first control resource set pool/group identifier associated with the first CORESET and a second control resource set pool/group identifier associated with the second CORESET have the same value. The wireless device may receive the downlink control information via first radio resources of the first CORESET and second radio resources of the second CORESET based on the first control resource set pool/group identifier associated with the first CORESET and the second control resource set pool/group identifier associated with the second CORESET having the same value. The wireless device may receive the downlink control information via first radio resources of the first CORESET and second radio resources of the second CORESET wherein the wireless device expects that the first control resource set pool/group identifier associated with the first CORESET and the second control resource set pool/group identifier associated with the second CORESET have the same value.

In an example embodiment, the wireless device may receive, from one or more base stations, the downlink control information via first radio resources of the first search space (e.g., first radio resources of a first CORESET associated with the first search space) and second radio resources of the second search space (e.g., second radio resources of a second CORESET associated with the second search space), wherein a first search space group/pool identifier associated with the first search space and a second search space group/pool identifier associated with the second search space have the same value. The wireless device may receive the downlink control information via first radio resources of the first search space and second radio resources of the second search space based on a first search space group/pool identifier associated with the first search space and a second search space group/pool identifier associated with the second search space having the same value. The wireless device may receive the downlink control information via first radio resources of the first search space and second radio resources of the second search space wherein the wireless device expects that a first search space group/pool identifier associated with the first search space and a second search space group/pool identifier associated with the second search space have the same value.

Figure 26:
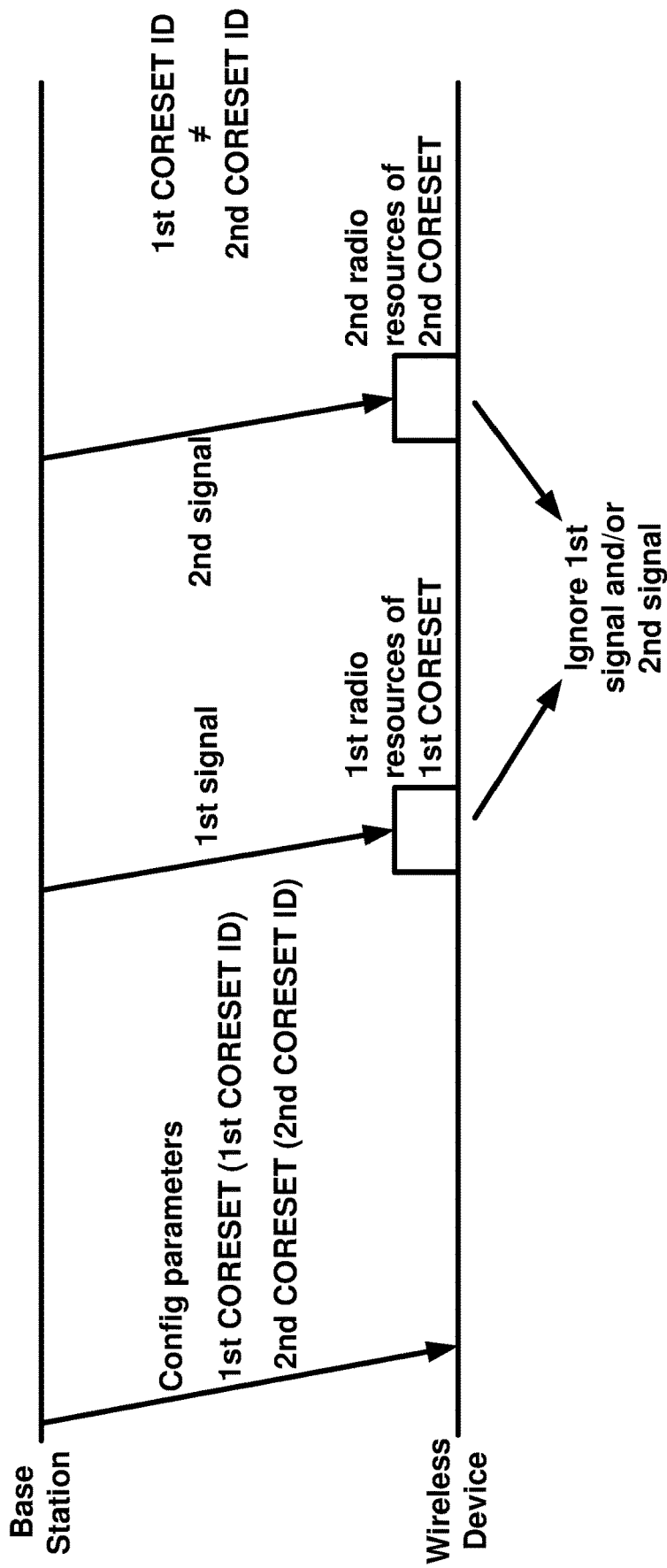
FIG. 26 shows an example process as per an aspect of an embodiment of the present disclosure.

In an example embodiment as shown in FIG. 26, a wireless device may receive, from one or more base stations, a first signal via first radio resources of the first control resource set and a second signal via second radio resources of the second control resource set. The first signal and the second signal may be associated with a downlink control information. In an example, the first signal and the second signal may be repetitions of the downlink control information in the first control resource set and the second control resource set. The first signal and the second signal may be received via repetitions of a downlink control channel carrying the downlink control information in the first control resource set and the second control resource set. The downlink control information may be mapped to the first radio resources and the downlink control information may be mapped to the second radio resources. In an example, the first radio resources of the first control resource set and the second radio resources of the second control resource set may be bundled for reception of the downlink control information. The downlink control information may be mapped to a plurality of resources (e.g., bundled resources) comprising the first radio resources and the second radio resources. A first CORESET ID of the first CORESET and a second CORESET ID of the second CORESET may have different values. Based on the first CORESET ID and the second CORESET ID having different value, the wireless device may ignore the first signal and/or the second signal. In an example, based on the CORESET ID and the second CORESET ID having different value, the wireless device may ignore both the first signal and the second signal. In an example, based on the first CORESET ID and the second CORESET ID having different value, the wireless device may ignore one of the first signal and the signal and determine/decode the downlink control information based on the other signal. For example, the wireless device may ignore the second signal and determine/decode the downlink control information based on the first signal. For example, the wireless device may ignore the first signal and determine/decode the downlink control information based on the second signal.

In an example embodiment, a wireless device may receive, from one or more base stations, a first signal via first radio resources of the first search space (e.g., first radio resources of a first CORESET associated with the first search space) and a second signal via second radio resources of the second search space (e.g., second radio resources of a second CORESET associated with the second search space). The first signal and the second signal may be associated with a downlink control information. In an example, the first signal and the second signal may be repetitions of the downlink control information in the first search space and the second search space. The first signal and the second signal may be received via repetitions of a downlink control channel carrying the downlink control information in the first search space and the second search space. The downlink control information may be mapped to the first radio resources and the downlink control information may be mapped to the second radio resources. In an example, the first radio resources of the first search space and the second radio resources of the second search space may be bundled for reception of the downlink control information. The downlink control information may be mapped to a plurality of resources (e.g., bundled resources) comprising the first radio resources and the second radio resources. A first search space ID of the first search space and a second search space ID of the second search space may have different values. Based on the first search space ID and the second search space ID having different value, the wireless device may ignore the first signal and/or the second signal. In an example, based on the first search space ID and the second search space ID having different value, the wireless device may ignore both the first signal and the second signal. In an example, based on the first search space ID and the second search space ID having different value, the wireless device may ignore one of the first signal and the second signal and determine/decode the downlink control information based on the other signal. For example, the wireless device may ignore the second signal and determine/decode the downlink control information based on the first signal. For example, the wireless device may ignore the first signal and determine/decode the downlink control information based on the second signal.

Figure 27:
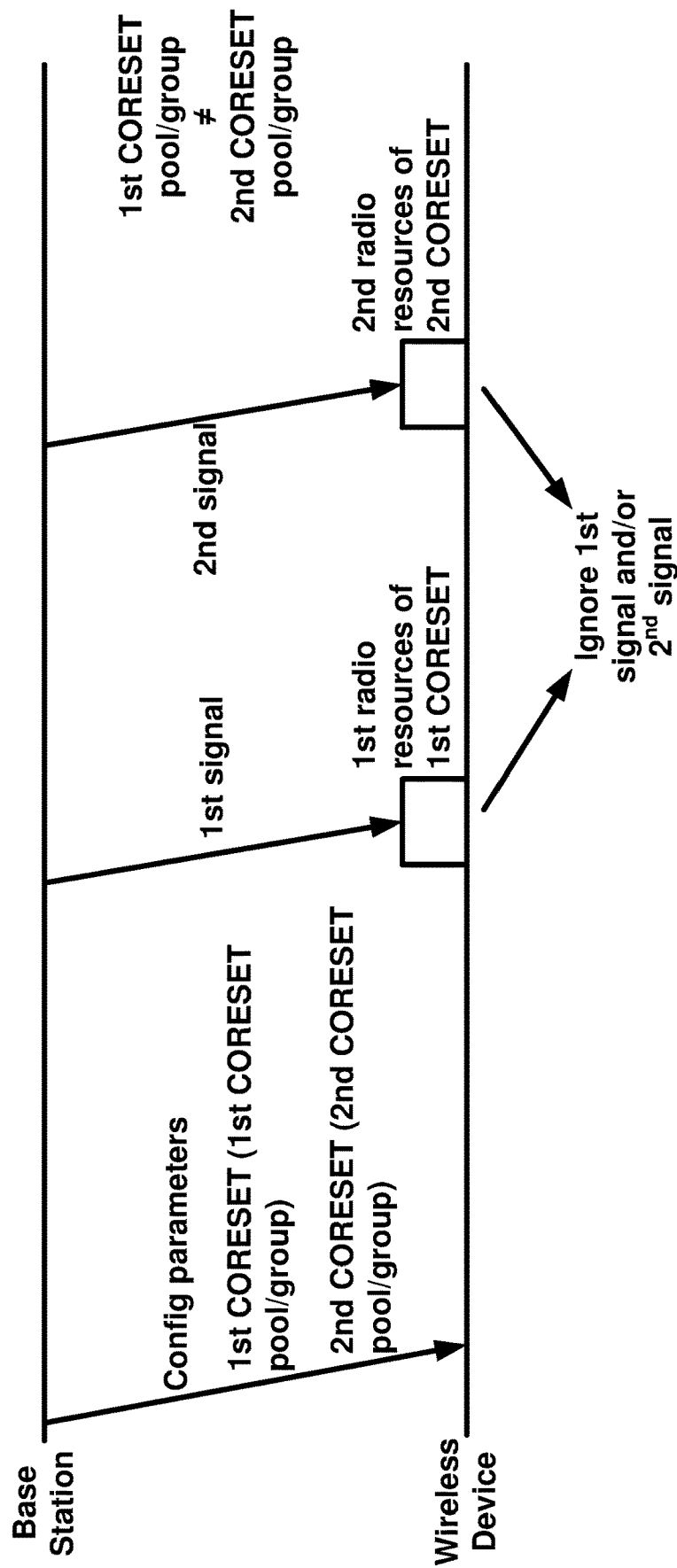
FIG. 27 shows an example process as per an aspect of an embodiment of the present disclosure.

In an example embodiment as shown in FIG. 27, a wireless device may receive, from one or more base stations, a first signal via first radio resources of the first control resource set and a second signal via second radio resources of the second control resource set. The first signal and the second signal may be associated with a downlink control information. In an example, the first signal and the second signal may be repetitions of the downlink control information in the first control resource set and the second control resource set. The first signal and the second signal may be received via repetitions of a downlink control channel carrying the downlink control information in the first control resource set and the second control resource set. The downlink control information may be mapped to the first radio resources and the downlink control information may be mapped to the second radio resources. In an example, the first radio resources of the first control resource set and the second radio resources of the second control resource set may be bundled for reception of the downlink control information. The downlink control information may be mapped to a plurality of resources (e.g., bundled resources) comprising the first radio resources and the second radio resources. A first CORESET pool/group ID associated with the first CORESET and a second CORESET pool/group ID associated with the second CORESET may have different values. Based on the first CORESET pool/group ID and the second CORESET pool/group ID having different values, the wireless device may ignore the first signal and/or the second signal. In an example, based on the first CORESET pool/group ID and the second CORESET pool/group ID having different values, the wireless device may ignore both the first signal and the second signal. In an example, based on the first CORESET pool/group ID and the second CORESET pool/group ID having different values, the wireless device may ignore one of the first signal and the signal and determine/decode the downlink control information based on the other signal. For example, the wireless device may ignore the second signal and determine/decode the downlink control information based on the first signal. For example, the wireless device may ignore the first signal and determine/decode the downlink control information based on the second signal.

In an example embodiment, a wireless device may receive, from one or more base stations, a first signal via first radio resources of the first search space (e.g., first radio resources of a first CORESET associated with the first search space) and a second signal via second radio resources of the second search space (e.g., second radio resources of a second CORESET associated with the second search space). The first signal and the second signal may be associated with a downlink control information. In an example, the first signal and the second signal may be repetitions of the downlink control information in the first search space and the second search space. The first signal and the second signal may be received via repetitions of a downlink control channel carrying the downlink control information in the first search space and the second search space. The downlink control information may be mapped to the first radio resources and the downlink control information may be mapped to the second radio resources. In an example, the first radio resources of the first search space and the second radio resources of the second search space may be bundled for reception of the downlink control information. The downlink control information may be mapped to a plurality of resources (e.g., bundled resources) comprising the first radio resources and the second radio resources. A first search space pool/group ID associated with the first search space and a second search space pool/group ID associated with the second search space may have different values. Based on the first search space pool/group ID and the second search space pool/group ID having different values, the wireless device may ignore the first signal and/or the second signal. In an example, based on the first search space pool/group ID and the second search space pool/group ID having different values, the wireless device may ignore both the first signal and the second signal. In an example, based on the first search space pool/group ID and the second search space pool/group ID having different values, the wireless device may ignore one of the first signal and the signal and determine/decode the downlink control information based on the other signal. For example, the wireless device may ignore the second signal and determine/ decode the downlink control information based on the first signal. For example, the wireless device may ignore the first signal and determine/decode the downlink control information based on the second signal.

In an example embodiment, a wireless device may receive, from a base station, configuration parameters of a first CORESET and a second CORESET. The first CORESET may be associated with a first TCI state and the second CORESET may be associated with a second TCI state. For example, the wireless device may receive one or more commands (e.g., one or more MAC CEs) indicating that the first CORESET is associated with the first TCI state and the second CORESET is associated with the second TCI state. For example, the wireless device may determine that the first CORESET is associated with the first TCI state and the second CORESET is associated with the second TCI state based on the configuration parameters of the first CORESET and the configuration parameters of the second CORESET and based on one or more commands (e.g., one or more MAC CEs).

Figure 28:
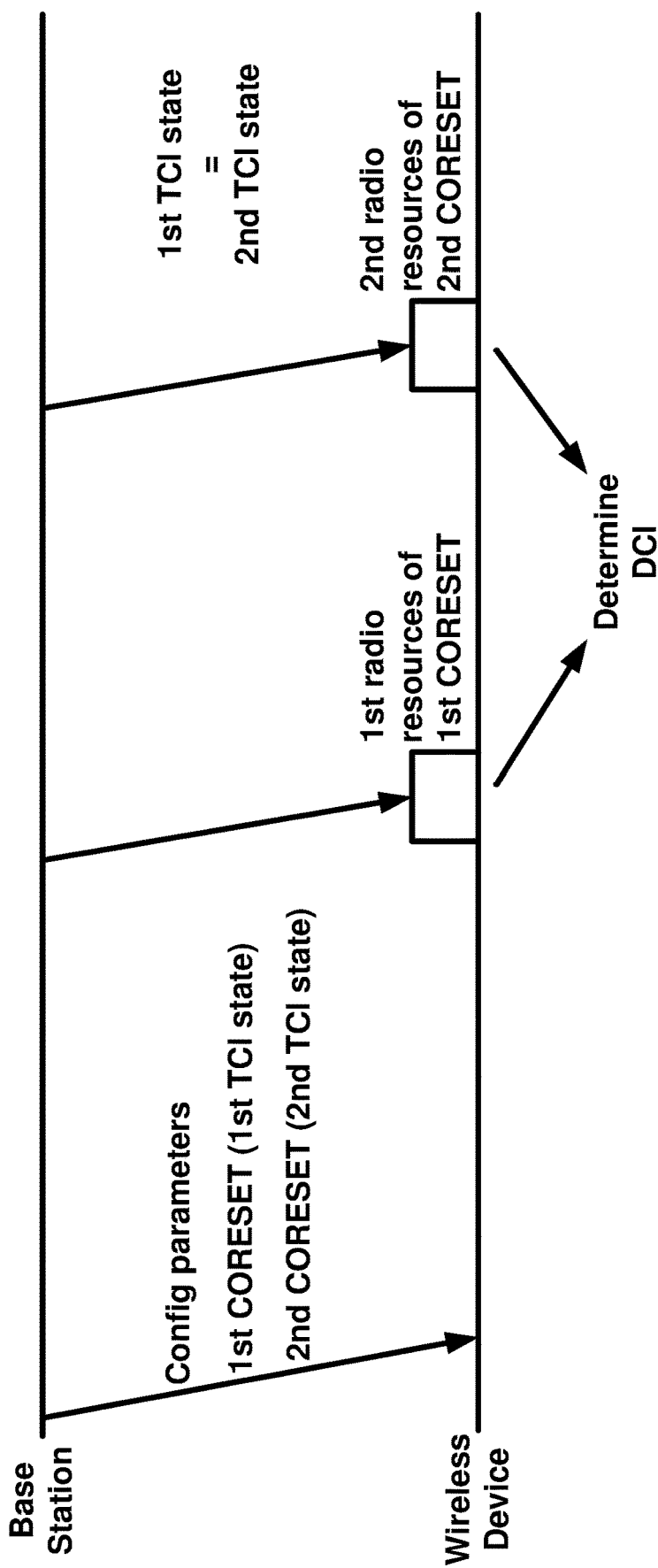
FIG. 28 shows an example process as per an aspect of an embodiment of the present disclosure.

In an example embodiment as shown in FIG. 28, the wireless device may receive, from one or more base stations, the downlink control information via first radio resources of the first CORESET and second radio resources of the second CORESET, wherein the first TCI state and the second TCI state are the same (e.g., the first TCI state identifier and the second TCI state identifier have the same value). The wireless device may receive the downlink control information via first radio resources of the first CORESET and second radio resources of the second CORESET based on the first TCI state and the second TCI state being the same (e.g., the first TCI state identifier and the second TCI state identifier having the same value). The wireless device may receive the downlink control information via first radio resources of the first CORESET and second radio resources of the second CORESET wherein the wireless device expects that the first TCI state and the second TCI state to be the same (e.g., the first TCI state identifier and the second TCI state identifier having the same value).

Figure 29:
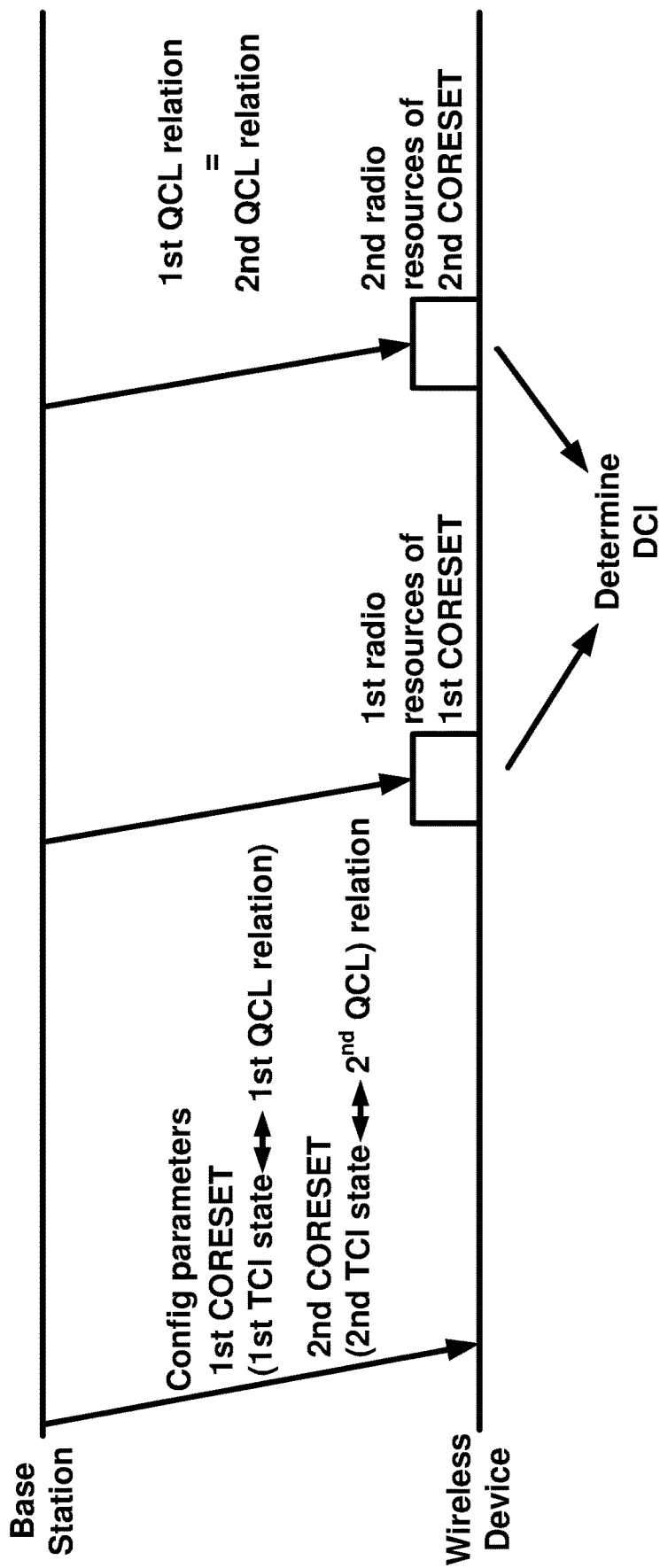
FIG. 29 shows an example process as per an aspect of an embodiment of the present disclosure.

In an example embodiment as shown in FIG. 29, the wireless device may receive, from one or more base stations, the downlink control information via first radio resources of the first CORESET and second radio resources of the second CORESET, wherein the first TCI state and the second TCI state indicate the same quasi-colocation relation (e.g., the first TCI state and the second TCI state indicate the same reference signal and/or QCL type). The wireless device may receive the downlink control information via first radio resources of the first CORESET and second radio resources of the second CORESET based on the first TCI state and the second TCI state being the same (e.g., the first TCI state and the second TCI state indicating the same reference signal and/or QCL type). The wireless device may receive the downlink control information via first radio resources of the first CORESET and second radio resources of the second CORESET wherein the wireless device expects that the first TCI state and the second TCI state to be the same (e.g., the first TCI state and the second TCI state to indicate the same reference signal and/or QCL type).

In an example embodiment, to receive a downlink control information, the wireless device may receive a first signal via first radio resources of a first CORESET and a second signal via second radio resources of a second CORESET. The first signal and the second signal may be associated with the downlink control information. In an example, the first signal and the second signal may be repetitions of the downlink control information or a downlink control channel carrying the downlink control information. In an example, the downlink control information may be mapped to the first radio resource of the first CORESET and the second radio resource of the second CORESET (e.g., the first radio resources and the second radio resources may be bundled). The first TCI state and the second TCI state may be different. For example, one or more parameters of first TCI state and the second TCI state may be different. For example, a first TCI state identifier associated with the first TCI state and a second TCI state identifier associated with the second TCI state may have different values. For example, the one or more parameters may comprise one or more of a QCL type, a reference signal associated with the TCI state, a TCI state ID, etc.

In an example embodiment, based on the first TCI state being different from the second TCI state and/or based on the first TCI state identifier and the second TCI state identifier having different values and/or based on the one or more parameters of the first TCI state and the second TCI state being different, the wireless device may determine/decode the downlink control information based on one of the first TCI state and the second TCI state.

Figure 30:
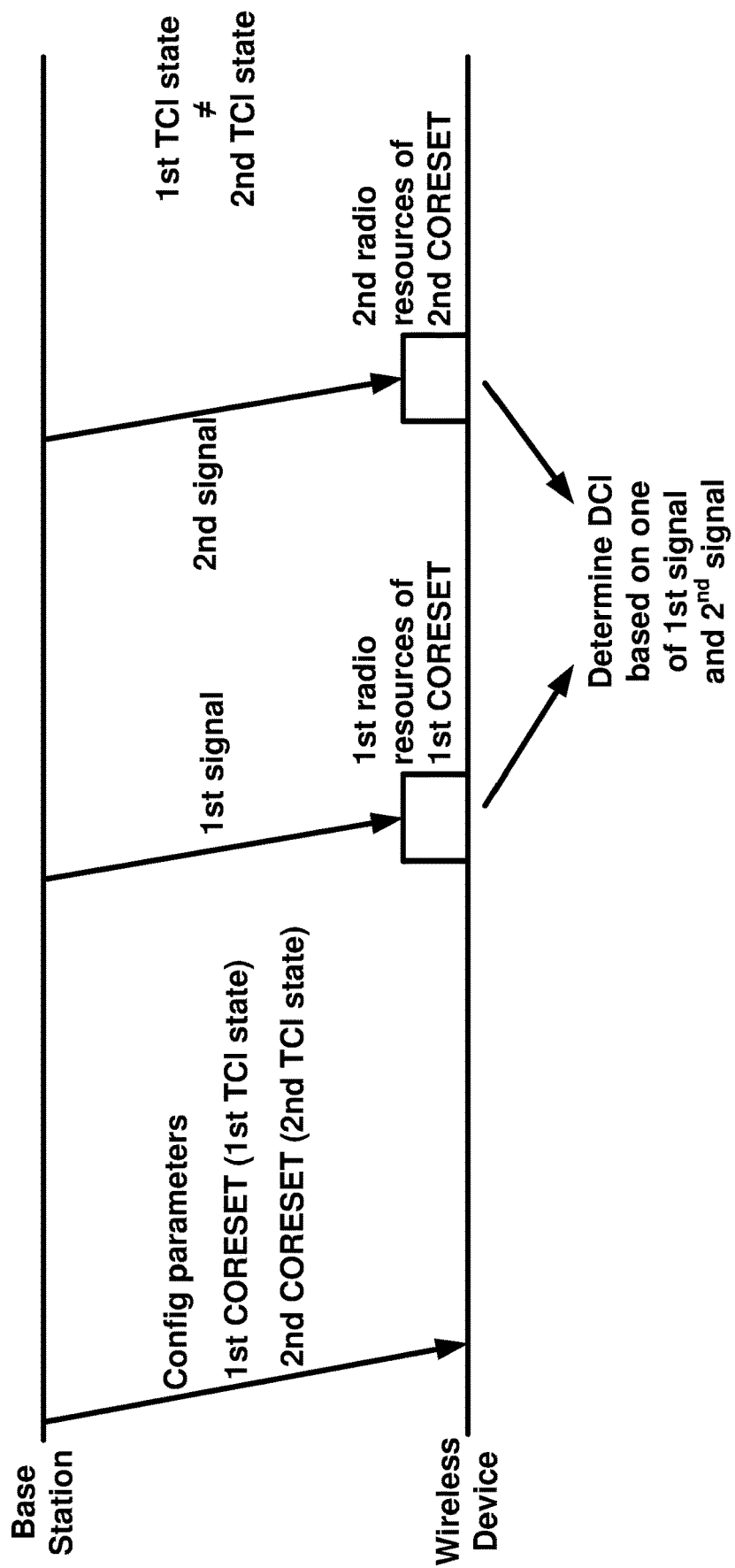
FIG. 30 shows an example process as per an aspect of an embodiment of the present disclosure.

In an example embodiment as shown in FIG. 30, based on the first TCI state being different from the second TCI state and/or based on the first TCI state identifier and the second TCI state identifier having different values and/or based on the one or more parameters of the first TCI state and the second TCI state being different, the wireless device may determine/decode the downlink control information based on one of the first signal and the second signal. For example, the wireless device may determine/decode the downlink control channel based on the first signal and/or the wireless device may ignore the second signal. For example, the wireless device may determine/decode the downlink control channel based on the second signal and/or the wireless device may ignore the first signal.

Figure 31:
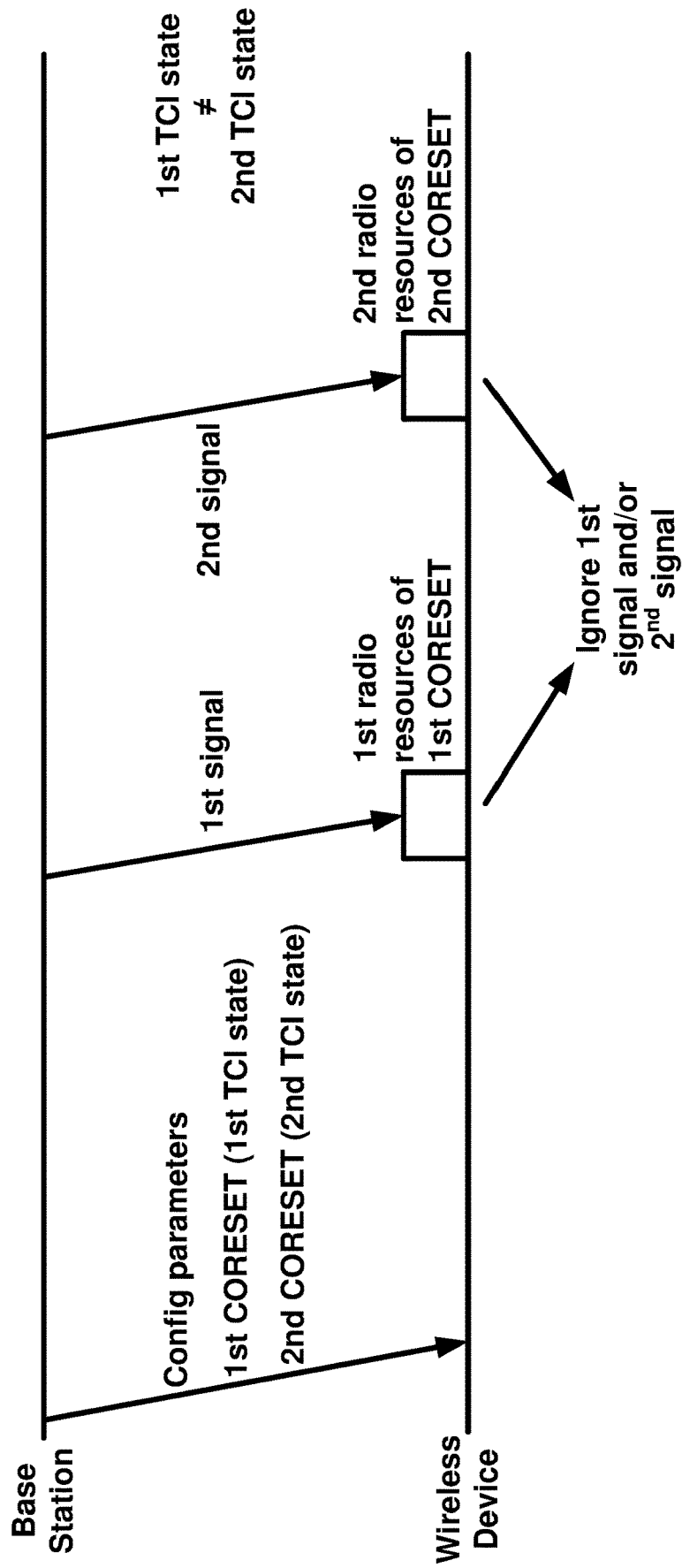
FIG. 31 shows an example process as per an aspect of an embodiment of the present disclosure.

In an example embodiment as shown in FIG. 31, based on the first TCI state being different from the second TCI state and/or based on the first TCI state identifier and the second TCI state identifier having different values and/or based on the one or more parameters of the first TCI state and the second TCI state being different, the wireless device may ignore the first signal and/or the second signal. In an example, the wireless device may ignore both the first signal and the second signal.

Figure 32:
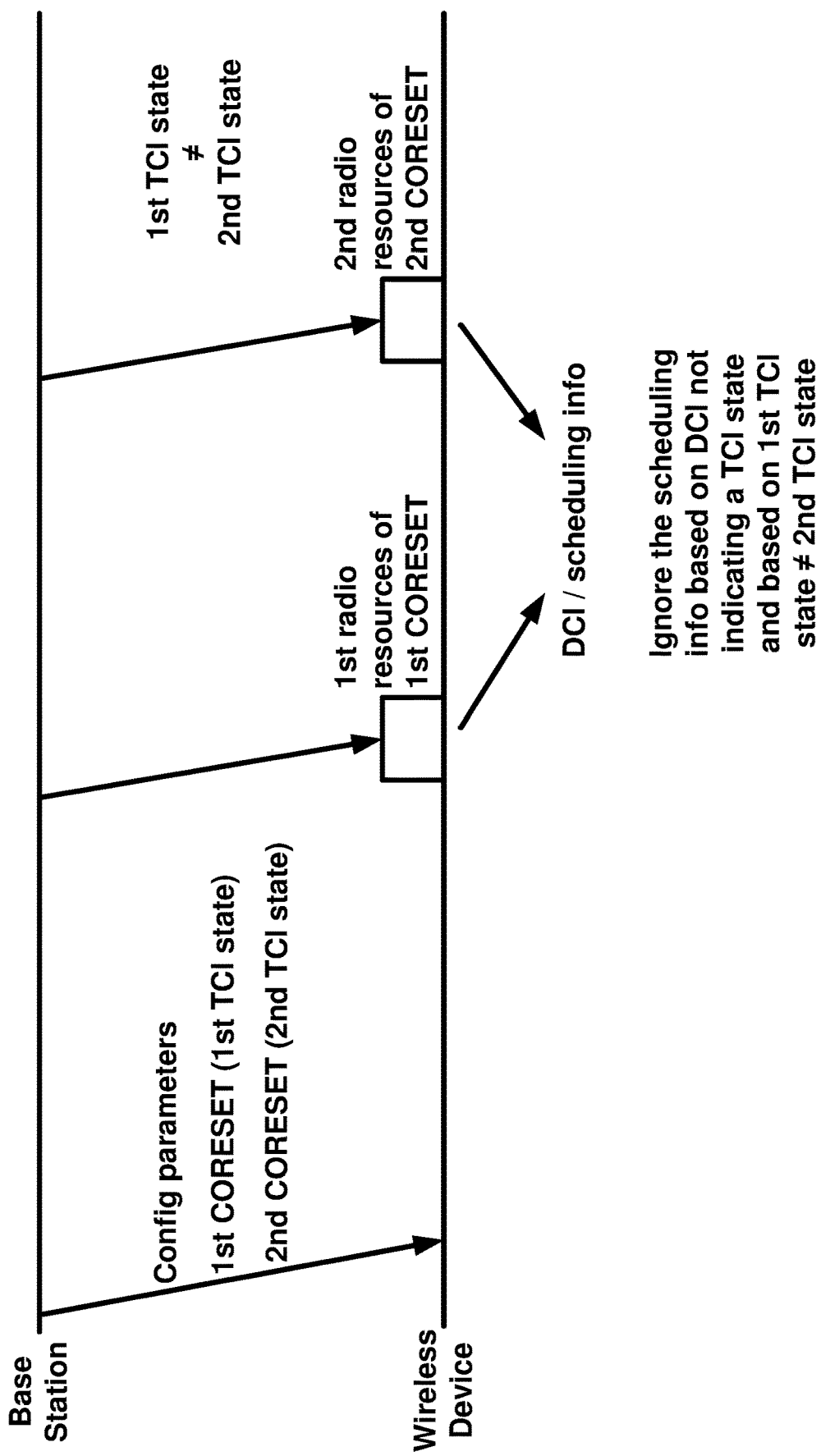
FIG. 32 shows an example process as per an aspect of an embodiment of the present disclosure.

In an example embodiment as shown in FIG. 32, the wireless device may determine the wireless device may determine/decode the downlink control information. The downlink control information may comprise scheduling information, for example an uplink transmission or downlink reception of a transport block. In an example, the DCI may not comprise a TCI state ID. Based on the first TCI state being different from the second TCI state and/or based on the first TCI state identifier and the second TCI state identifier having different values and/or based on the one or more parameters of the first TCI state and the second TCI state being different and/or based on the DCI not indicating a TCI state ID, the wireless device may ignore scheduling information.

Figure 33:
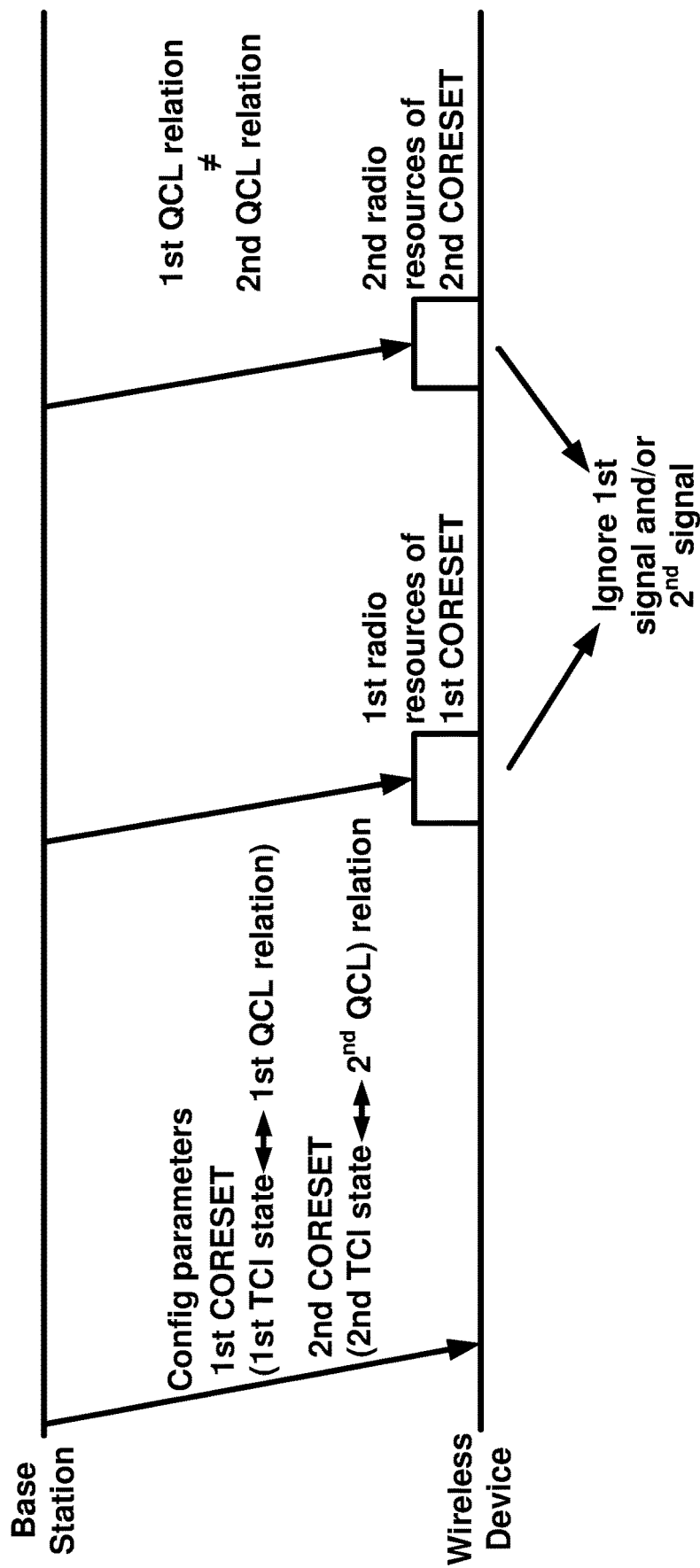
FIG. 33 shows an example process as per an aspect of an embodiment of the present disclosure.

In an example embodiment as shown in FIG. 33, based on a first QCL type/information/relation indicated by the first TCI state being different from a second QCL type/information/relation indicated by the second TCI state, the wireless device may ignore the first signal and/or the second signal. For example, based on a first reference signal indicated by the first QCL type/information/relation and a second reference signal indicated by the second QCL type/information/relation, the wireless device may ignore the first signal and/or the second signal. For example, based on a first QCL type (e.g., type A, type B, type C or type D) indicated by the first QCL type/information/relation and a second QCL type (e.g., type A, type B, type C or type D) indicated by the second QCL type/information/relation, the wireless device may ignore the first signal and/or the second signal. In an example, the wireless device may ignore both the first signal and the second signal.

In an example, a wireless device may receive one or more commands/control elements (e.g., one or more MAC CEs) indicating a first TCI state (e.g., a first TCI state identifier) for reception of control information (e.g., downlink control information) via a first CORESET and a second TCI state (e.g., a second TCI state identifier) for reception of control information (e.g., downlink control information) via a second CORESET. The first TCI state may be different from the second TCI state. For example, the first TCI state identifier may be different from the second TCI state identifier. The first CORESET and the second CORESET may be for reception of a downlink control information (e.g., may be configured to receive a downlink control information). In an example, the first CORESET and the second CORESET may be for repetition of a downlink control information (e.g., may be configured to receive repetitions of a downlink control information). In an example, first radio resources of the first CORESET and second radio resources of the second CORESET may be bundled (e.g., may be configured for bundling radio resources) and the downlink control information may be mapped to the bundled resources.

In an example embodiment, the wireless device may ignore the one or more commands/control elements based on the first CORESET and the second CORESET being for reception of a downlink control information (e.g., being configured to receive a downlink control information based on DCI repetition or resource bundling) and based on the first TCI state being different from the second TCI state.

In an example, the wireless device may receive a first signal via first radio resources of the first CORESET and a second signal via second radio resources of the second CORESET. In an example, the first signal and the second signal may be for transmission of repetitions of a downlink control information. In an example, the downlink control information may be mapped to the first radio resources of the first signal and the second radio resources of the second signal wherein the downlink control information is mapped to the first radio resources and the second radio resources (e.g., bundled resources).

Figure 34:
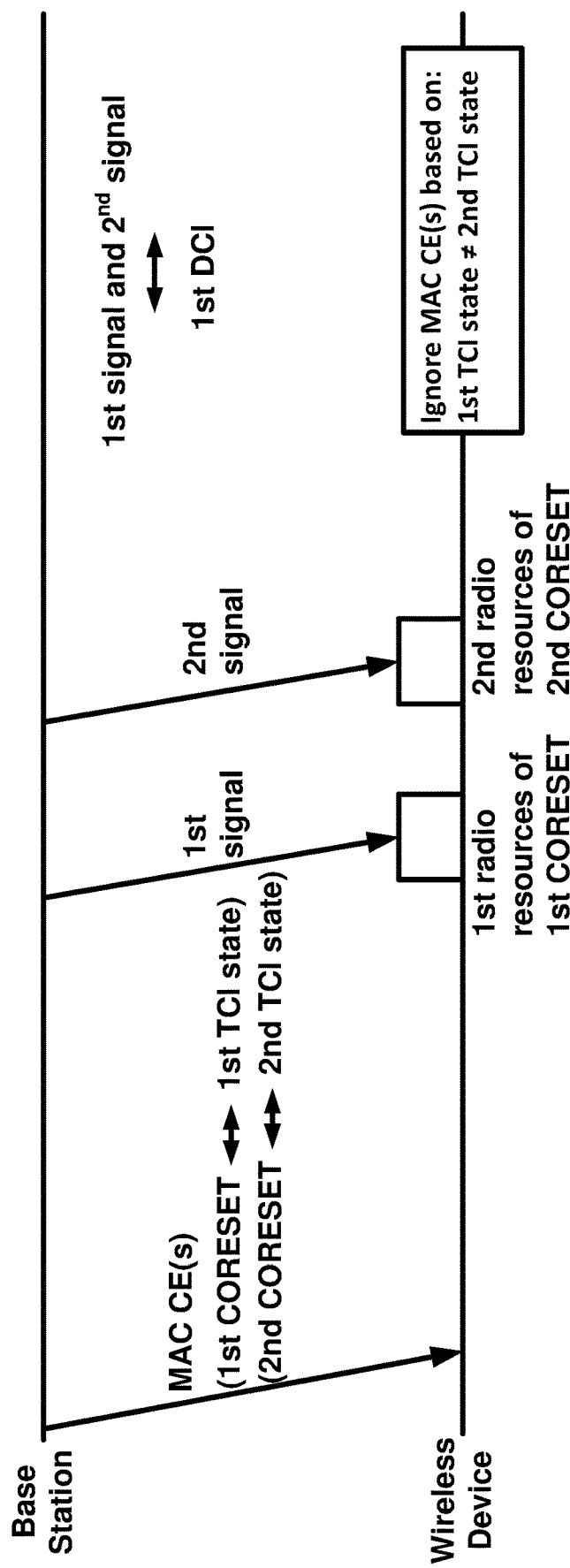
FIG. 34 shows an example process as per an aspect of an embodiment of the present disclosure.

In an example embodiment as shown in FIG. 34, the wireless device may ignore the one or more commands/control elements based on the first CORESET and the second CORESET being for reception of a downlink control information (e.g., being configured to receive a downlink control information based on DCI repetition or resource bundling) and based on the first TCI state being different from the second TCI state.

Figure 35:
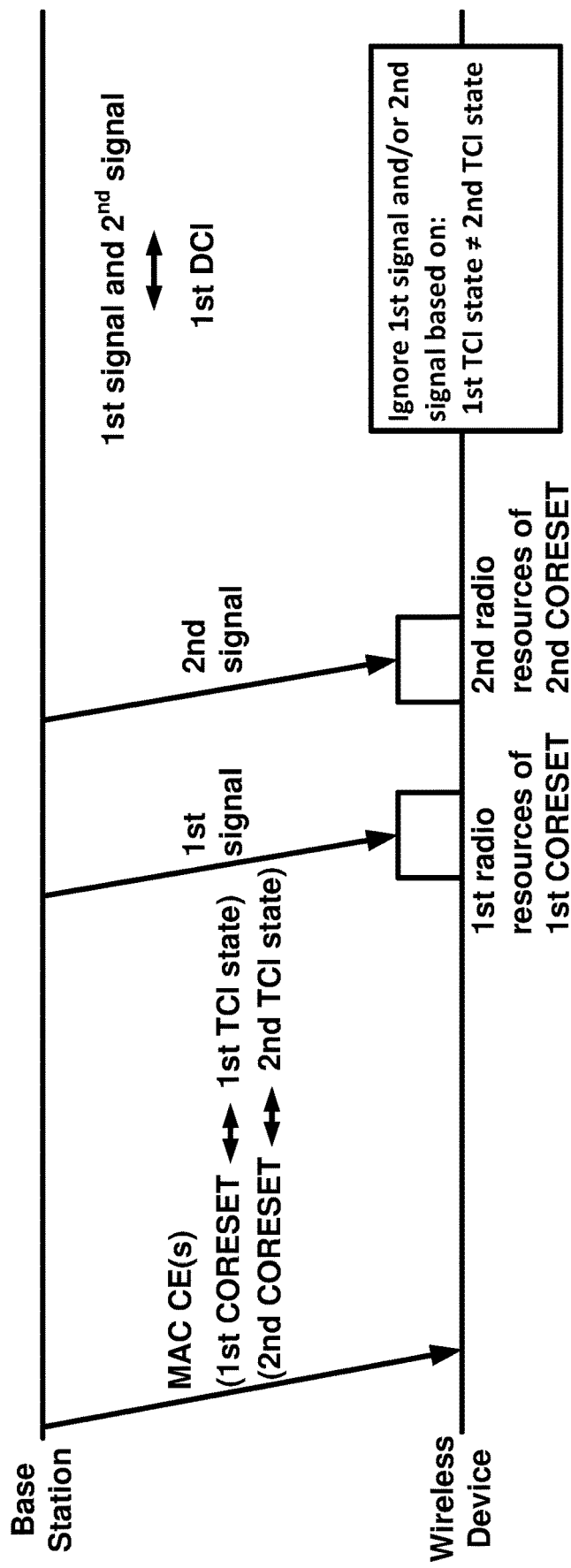
FIG. 35 shows an example process as per an aspect of an embodiment of the present disclosure.

In an example embodiment as shown in FIG. 35, the wireless device may ignore the first signal and/or the second signal based on the first CORESET and the second CORESET being for reception of a downlink control information (e.g., being configured to receive a downlink control information based on DCI repetition or resource bundling) and based on the first TCI state being different from the second TCI state. For example, the wireless device may ignore the second signal and/or may determine the downlink control information based on the first signal. For example, the wireless device may ignore both of the first signal and the second signal.

In an example embodiment, a wireless device may receive first configuration parameters of a first CORESET and second configuration parameters of a second CORESET. The first configuration parameters may comprise a first CORESET ID and the second configuration parameters may comprise a second CORESET ID. The wireless device may receive, from a base station, semi-static signaling (e.g., one or more RRC configuration parameters) and/or dynamic signaling (e.g., a MAC CE or a DCI), indicating that the first CORESET and the second CORESET are used for reception of a downlink control information. For example, the semi-static signaling (e.g., the one or more RRC configuration parameters) and/or the dynamic signaling (e.g., MAC CE/DCI) may indicate that the first CORESET and the second CORESET are associated for reception of a downlink control information. In an example, the semi-static signaling (e.g., the one or more RRC configuration parameters) and/or the dynamic signaling (e.g., MAC CE/DCI) may indicate that the first CORESET and the second CORESET are for reception of repetitions of the downlink control information. In an example, the semi-static signaling (e.g., the one or more RRC configuration parameters) and/or the dynamic signaling (e.g., MAC CE/DCI) may indicate that first radio resources of the first CORESET and second radio resources of the second CORESET are associated and are for bundling resources and mapping the downlink control information to the bundled resources. The wireless device may receive a first signal based on first radio resources of the first CORESET and the wireless device may receive a second signal based on second radio resources of the second CORESET. The wireless device may determine/decode the downlink control information based on the first signal and the second signal.

In an example embodiment, a wireless device may receive a first signal based on a first TCI state. For example, the wireless device may receive the first signal based on first radio resources of a CORESET (e.g., a first CORESET) wherein the CORESET is associated with the first TCI state. The wireless device may determine a second TCI state based on the first TCI state. For example, the first TCI state may be associated with a first TCI state identifier and the second TCI state may be associated with a second TCI state identifier and the wireless device may determine the second TCI state identifier based on the first TCI state identifier. The wireless device may receive a second signal based on the second TCI state. For example, the wireless device may receive the second signal based on second radio resources of a CORESET (e.g., a second CORESET) associated with the second TCI state.

In an example embodiment, a wireless device may receive a first signal based on a first CORESET. For example, the wireless device may receive the first signal via first radio resources of a first CORESET. The wireless device may determine a second CORESET based on the first CORESET. For example, the first CORESET may be associated with a first CORESET identifier and the second CORESET may be associated with a second CORESET identifier and the wireless device may determine the second CORESET identifier based on the first CORESET identifier. The wireless device may receive a second signal based on the second CORESET. For example, the wireless device may receive the second signal via second radio resources of a second CORESET.

The wireless device may determine a downlink control information based on the first signal and the second signal. In an example, the first signal and the second signal may be associated with repetitions of the downlink control information. In an example, the downlink control information may be mapped to the first radio resources and the second radio resources (e.g., bundled resources). The downlink control information may comprise scheduling information for transmission or reception of a transport block. The wireless device may transmit or receive a transport block based on the scheduling information.

In an example embodiment, a wireless device may receive configuration parameters of a plurality of bandwidth parts comprising a first BWP and a second BWP. The first BWP and the second BWP may be for the same cell. In an example, the first BWP may be for a first cell and the second BWP may be for a second cell. In an example, the configuration parameters of the first BWP may comprise first downlink control information configuration parameters comprising first CORESET configuration parameters. The configuration parameters of the second BWP may comprise second downlink control information configuration parameters comprising second CORESET configuration parameters. In an example, the configuration parameters of the first BWP may comprise first downlink control information configuration parameters comprising first search configuration parameters. The configuration parameters of the second BWP may comprise second downlink control information configuration parameters comprising second search space configuration parameters.

The wireless device may receive a first signal based on the first CORESET (e.g., via first radio resources of the first CORESET). The wireless device may receive a second signal based on the second CORESET (e.g., via second radio resources of the second CORESET). In an example, the wireless device may receive the first signal based on the first search space (e.g., via first radio resources of the first CORESET associated with the first search space). The wireless device may receive a second signal based on the second search space (e.g., via second radio resources of the second CORESET associated with the second search space). The first signal and the second may be associated with a downlink control information. In an example, the first signal and the second signal may be for repetitions of the downlink control information. In an example, the downlink control information may be mapped to first radio resources of the first signal and second radio resources of the second signal (e.g. bundled resources). The wireless device may determine/decode a downlink control information based on the first signal and the second signal.

In an example, a wireless device may receive configuration parameters of a first CORESET associated with a first TCI state and a second CORESET associated with a second TCI state. For example, the wireless device may receive one or more commands (e.g., one or more MAC CEs) indicating association between the first TCI state and the first CORESET and the association between the second CORESET and the second TCI state. The wireless device may determine that the first CORESET is associated with the first TCI state and that the second CORESET is associated with the second TCI state based on the one or more commands and/or the configuration parameters. The first TCI state may be different from the second TCI state. The wireless device may receive a downlink control information via the first radio resources of the first CORESET and second radio resources of the second CORESET. For example, the wireless device may receive repetitions of the downlink control information via the first radio resources and the second radio resources. For example, the first radio resources and the second radio resources may be bundled for mapping the downlink control information to the bundled resources. The downlink control information may comprise scheduling information for reception of a transport block. The downlink control information may not indicate a TCI state for reception of a downlink transport block. For example, the downlink control information may not comprise a field indicating the TCI state.

Figure 36:
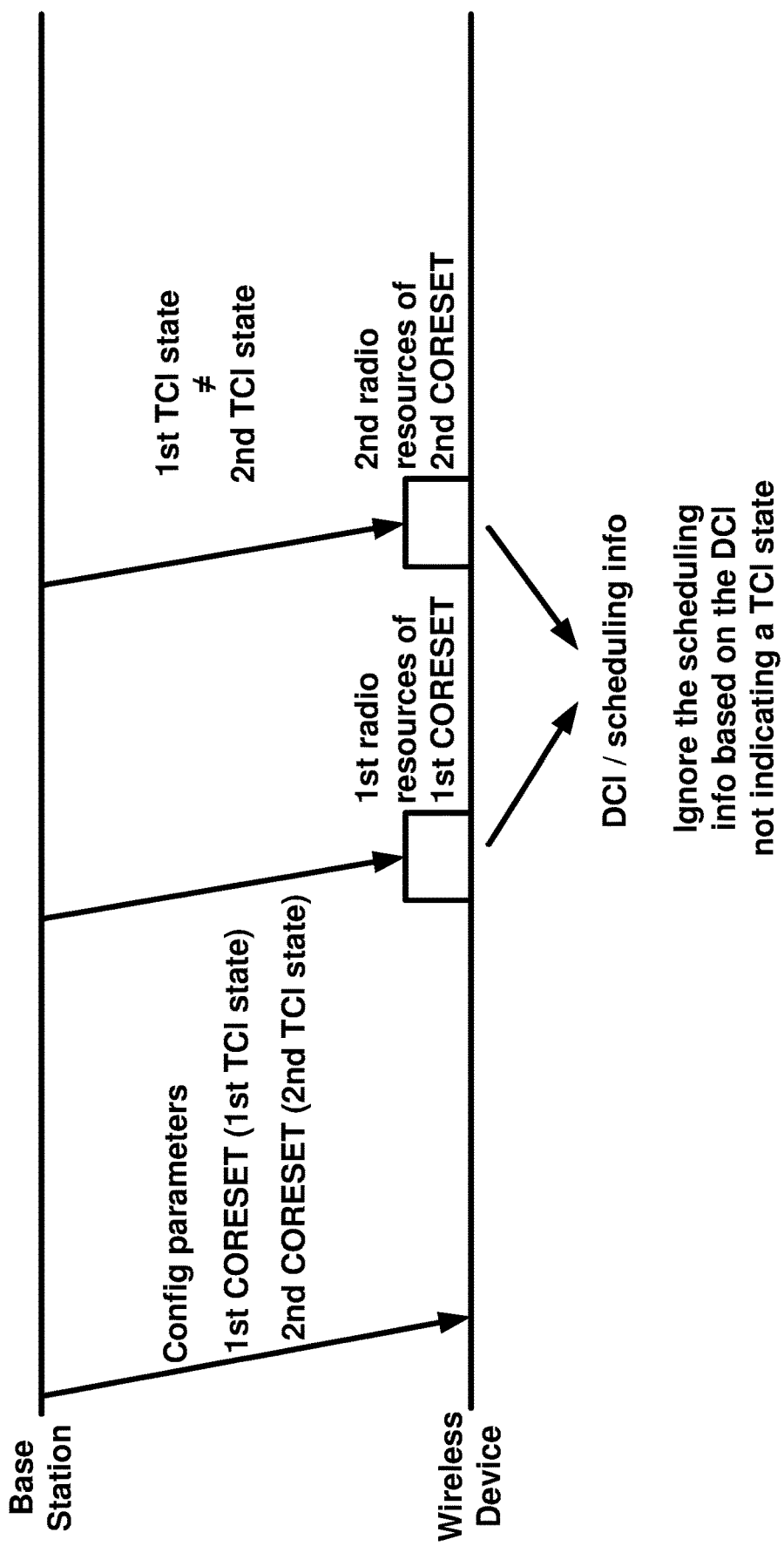
FIG. 36 shows an example process as per an aspect of an embodiment of the present disclosure.

In an example embodiment as shown in FIG. 36, the wireless device may ignore the downlink control information and/or the scheduling information based on the downlink control information not indicating a TCI state and based on the first TCI state being different from the second TCI state. The ignoring the downlink control information and/or the scheduling information may further be based on a time offset between reception of the downlink control information and the downlink transport block. For example, the wireless device may ignore the downlink control information and/or the scheduling information based on the time offset being larger than or equal to the threshold. The threshold may be based on a wireless device capability. For example, the first radio resources may comprise/span one or more first symbols and the second radio resources may comprise/span one or more second symbols. A time of reception of the downlink control information may be based on the one or more second symbols.

Figure 37:
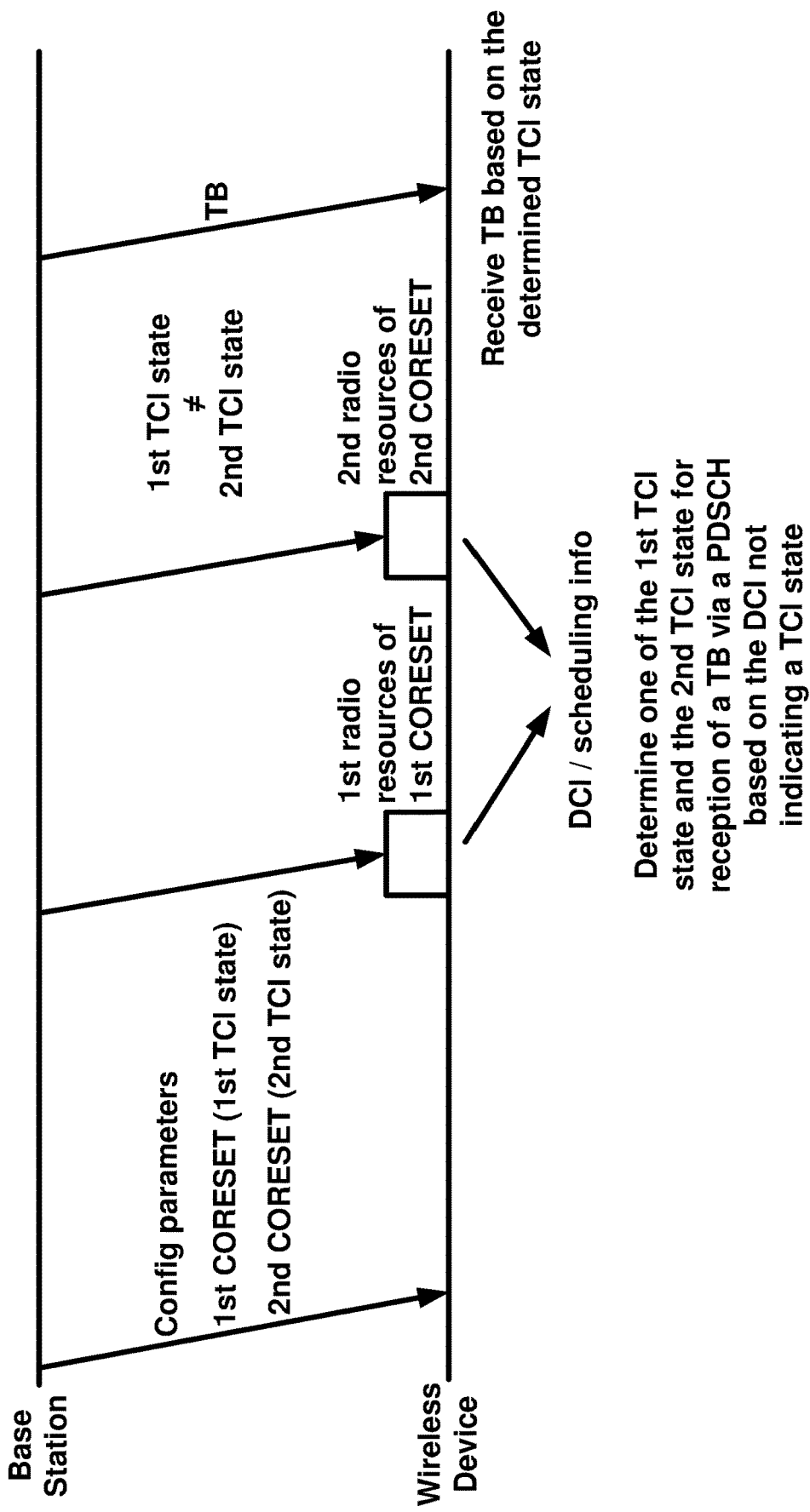
FIG. 37 shows an example process as per an aspect of an embodiment of the present disclosure.

In an example embodiment as shown in FIG. 37, based on the downlink control information not indicating a TCI state, the wireless device may determine one of the first TCI state and the second TCI state as a determined TCI state. The wireless may receive the downlink transport block based on the determined TCI state and based on the scheduling information of the downlink control information. The determining one of the first TCI state and the second TCI state may further be based on a time offset between reception of the downlink control information and the downlink transport block. For example, the wireless device may determine one of the first TCI state and the second TCI state based on the time offset being larger than or equal to the threshold. The threshold may be based on a wireless device capability. For example, the first radio resources may comprise/span one or more first symbols and the second radio resources may comprise/span one or more second symbols. A time of reception of the downlink control information may be based on the one or more second symbols.

In an example embodiment, a wireless device may receive configuration parameters of first CORESET and a second CORESET. The wireless device may receive configuration parameters of a first search space and a second search space. The wireless device may determine a downlink control information based on a first signal and a second signal. In an example, the first signal and the second signal may be repetitions of the DCI. In an example, the DCI may be mapped to first resources of the first signal and second resources of the second signal (e.g., resource bundling).

Figure 38:
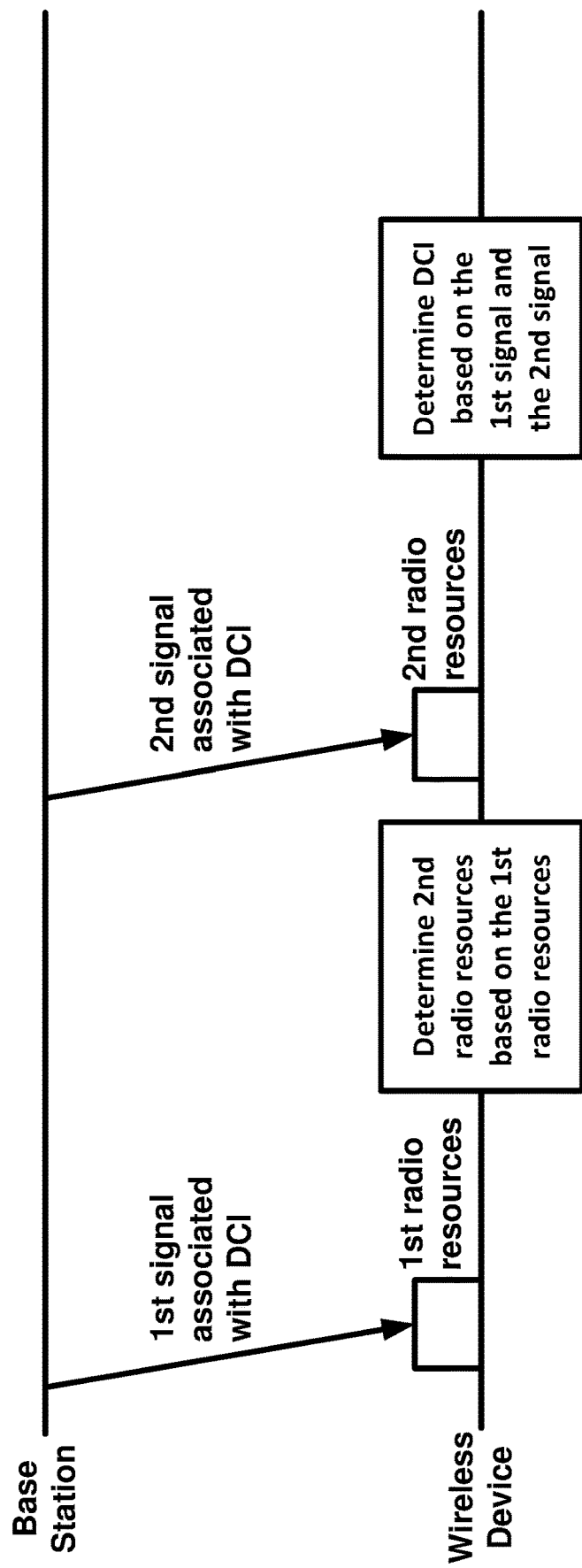
FIG. 38 shows an example process as per an aspect of an embodiment of the present disclosure.

In an example embodiment as shown in FIG. 38, the wireless device may receive the first signal via the first radio resources. The wireless device may determine second radio resources of the second signal based on the first radio resources. The wireless device may receive one or more configuration parameters wherein determining the second radio resources may be based on the one or more configuration parameters. The wireless device may receive the second signal based on the second radio resources. In an example, the first resources and the second resources may be associated with the same CORESET (e.g., CORESET ID). In an example, the first resources and the second resources may be associated with different CORESETs (e.g., different CORESET IDs). The wireless device may determine/decode the downlink control information based on the first signal and the second signal. For example, the first signal may be received via the first radio resources of a first CORESET. The first search space may be associated with the first CORESET. The wireless device may determine a second CORESET (e.g., a second CORESET ID) based on the first CORESET (e.g., first CORESET ID). For example, the second CORESET ID may be the same as the first CORESET ID. For example, the second radio resources of the second CORESET may be the same as the first radio resources of the first CORESET. The second search space may be associated with the second CORESET. In an example, the wireless device may determine the second radio resources based on determining that the second signal may be received and/or is required for determining/decoding the downlink control information.

In an example, the configuration parameters may comprise a parameter indicating an association between the first CORESET and the second CORESET. The configuration parameters may comprise a parameter indicating an association between the first search space and the second search space. The wireless device may determine the second radio resources based on the parameter.

Figure 39:
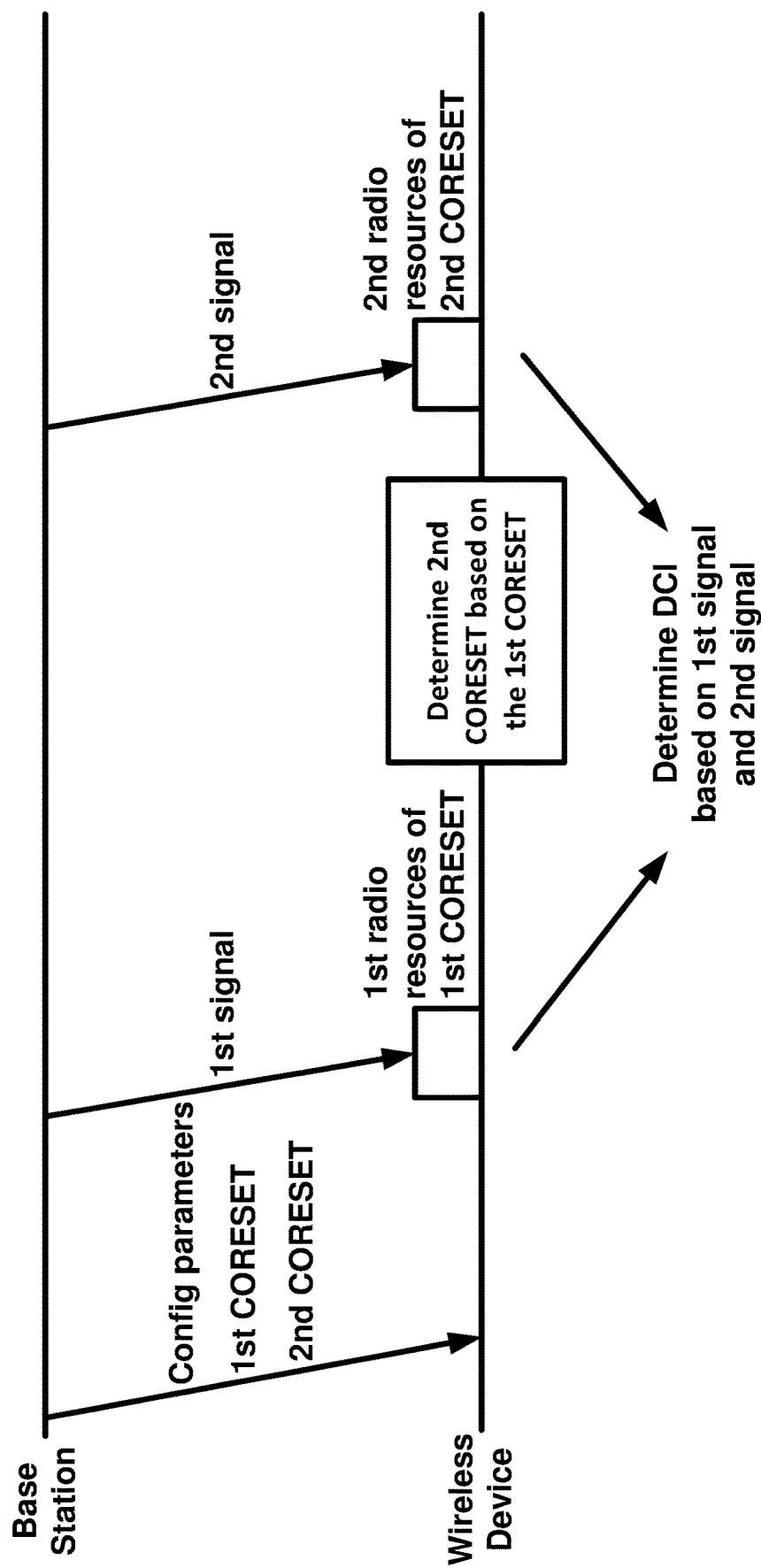
FIG. 39 shows an example process as per an aspect of an embodiment of the present disclosure.

In an example embodiment as shown in FIG. 39, the wireless device may receive, from a base station, configuration parameters of a plurality of control resource sets. The plurality of control resource sets may comprise a first CORESET and a second CORESET. The first CORESET and the second CORESET may be for reception of control information. For example, the first CORESET and the second CORESET may be configured for a BWP of a cell. The wireless device may receive configuration parameters of one or more cells comprising the cell. The wireless device may receive a first signal via the first CORESET (e.g., via radio resources of the first CORESET). In an example, the wireless device may determine (e.g., based on a first ID of the first CORESET and/or based on one or more configuration parameters) that a second signal is required for determining/decoding the downlink control information. The wireless device may determine the second CORESET based on the first CORESET. For example, the wireless device may determine a second ID of the second CORESET based on a first ID of the first CORESET. For example, the wireless device may determine the second CORESET based on the first CORESET and one or more configuration parameters. The wireless receive may receive the second signal via the second CORESET. The wireless device may determine/decode the downlink control information based on the first signal and the second signal.

In an example embodiment, the wireless device may receive, from a base station, configuration parameters of a plurality of search spaces. The plurality of search spaces may comprise a first search space and a second search space. The first search space and the second search space may be for reception of control information. For example, the first search space and the second search space may be configured for a BWP of a cell. The wireless device may receive configuration parameters of one or more cells comprising the cell. The wireless device may receive a first signal based on the first search space (e.g., via radio resources of a first CORESET associated with the first search space). In an example, the wireless device may determine (e.g., based on a first ID of the first search space and/or based on one or more configuration parameters) that a second signal is required for determining/decoding the downlink control information. The wireless device may determine the second search space based on the first search space. For example, the wireless device may determine a second ID of the second search space based on a first ID of the first search space. For example, the wireless device may determine the second search space based on the first search space and one or more configuration parameters. The wireless device may receive the second signal based on the second search space (e.g., via radio resources of a second CORESET associated with the second search space). The wireless device may determine/decode the downlink control information based on the first signal and the second signal.

Figure 40:
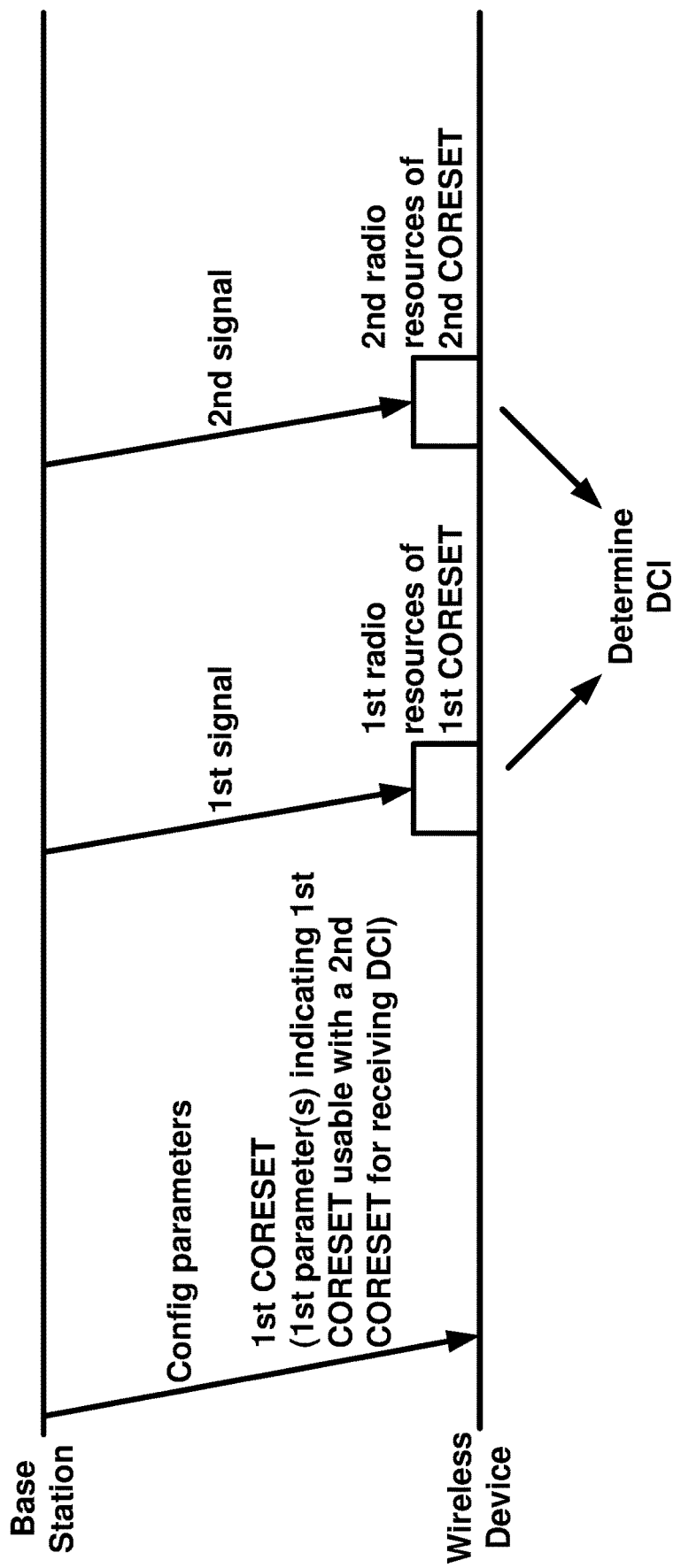
FIG. 40 shows an example process as per an aspect of an embodiment of the present disclosure.

In an example embodiment as shown in FIG. 40, a wireless device may receive configuration parameters of a CORESET. The configuration parameters of the CORESET may comprise one or more first parameters indicating that the first CORESET is usable with at least a second CORESET for reception of control information. The wireless device may receive a first signal via first radio resources of the first CORESET. In an example, based on the first CORESET being usable with at least one second CORESET for reception of control information, the wireless expect at least one second signal from the at least one second CORESET for reception of the downlink control information. The wireless device may receive a second signal via second radio resources of the second CORESET. The wireless device may determine/decode a downlink control information based on the first signal and the second signal.

In an example, a wireless device may receive configuration parameters of a search space. The configuration parameters of the search space may comprise one or more first parameters indicating that the first search space is usable with at least a second search space for reception of control information. The wireless device may receive a first signal based on the first search space (e.g., via first radio resources of a first CORESET associated with the first search space). In an example, based on the first search space being usable with at least one second search space for reception of control information, the wireless expect at least one second signal from the at least one second search space for reception of the downlink control information. The wireless device may receive a second signal based on the second search space (e.g., via second radio resources of the second CORESET associated with the second search space). The wireless device may determine/decode a downlink control information based on the first signal and the second signal.

Figure 41:
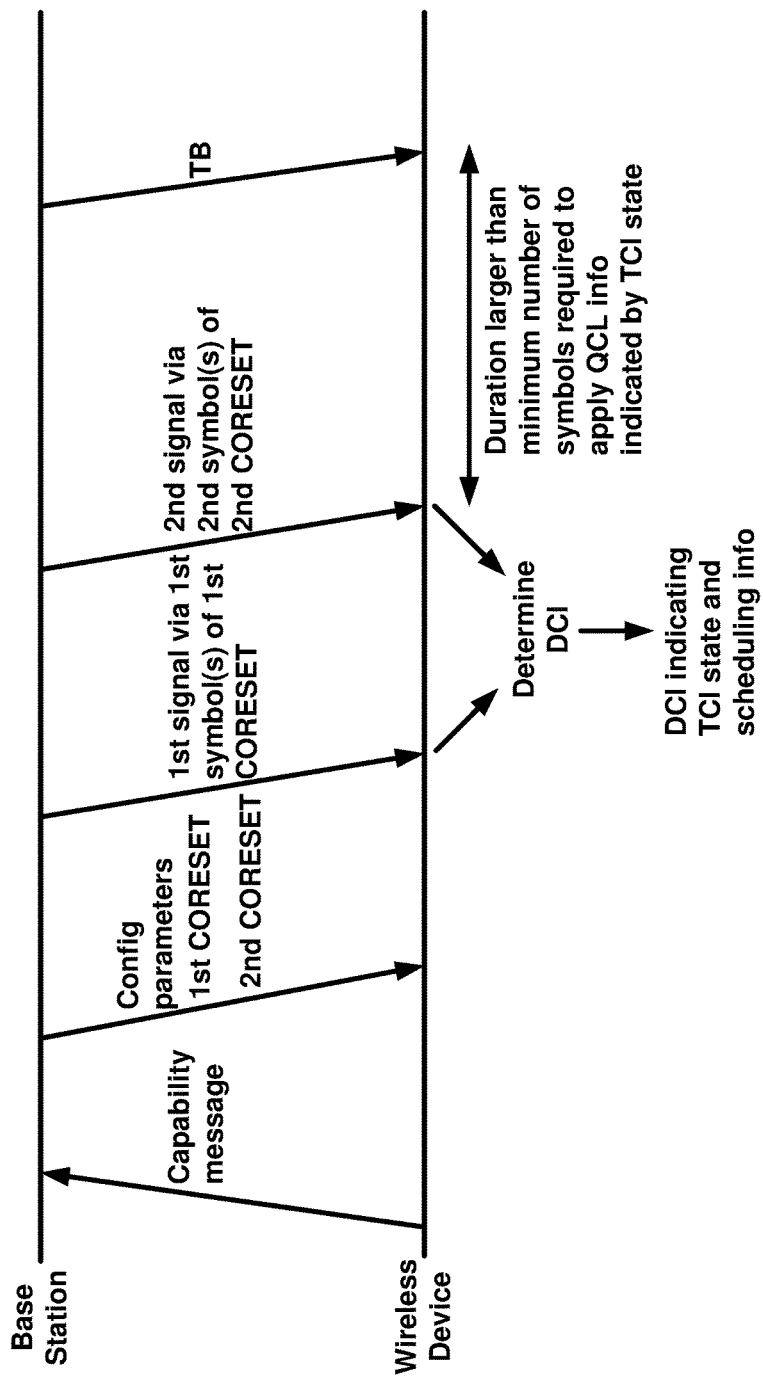
FIG. 41 shows an example process as per an aspect of an embodiment of the present disclosure.

In an example embodiment as shown in FIG. 41, a wireless device may transmit, to a base station, a capability message. The capability message may comprise one or more parameters that indicate a minimum number of symbols required by the wireless device to perform the downlink control information (e.g., to receive/decode downlink control information) and apply spatial QCL information, received in the downlink control information, for processing a downlink data channel (e.g., PDSCH). The wireless device configuration parameters of a first CORESET and a second CORESET for receiving control information. The configuration parameters of the first CORESET may indicate one or more first symbols for the first CORESET (e.g., symbol numbers of the first CORESET in a slot) and the configuration parameters of the second CORESET may indicate one or more second symbols for the second CORESET (e.g., symbol numbers of the second CORESET in a slot). The one or more second symbols may be after the one or more first symbol. For example, the one or more first symbols of the first CORESET may be in a first slot and the one or more second symbols of the second CORESET may be in a second slot after the first slot. In an example, the second slot may be adjacent to the first slot. For example, the one or more first symbols of the first CORESET and the one or more second symbols of the second CORESET may be in a slot wherein the one or more second symbols are after the one or more first symbols. The wireless device may receive a first signal via the one or more first symbols of the first CORESET. The wireless device may receive a second signal via the one or more second symbols of the second CORESET. For example, the first signal and the second signal may be repetitions of the downlink control or the downlink control information may be mapped to bundled resources of the first radio resources of the first signal and second radio resources of the second signal. The wireless device may determine the downlink control information based on the first signal and the second signal. The downlink control information may comprise scheduling information for reception of a transport block via a downlink shared channel.

The downlink control information may indicate a TCI state for reception of the transport block and the TCI state may indicate a spatial QCL information. The wireless device may receive the transport block based on the TCI state and/or the spatial QCL information and the scheduling information wherein a duration between a last symbol of the one or more second symbols and the transport block/downlink shared channel is larger than the minimum number of symbols indicated by the one or more parameters of the capability message. The wireless device may receive the transport block based on the TCI state and/or the spatial QCL information and the scheduling information based on a duration between a last symbol of the one or more second symbols and the transport block/downlink shared channel being larger than the minimum number of symbols indicated by the one or more parameters of the capability message.

Figure 42:
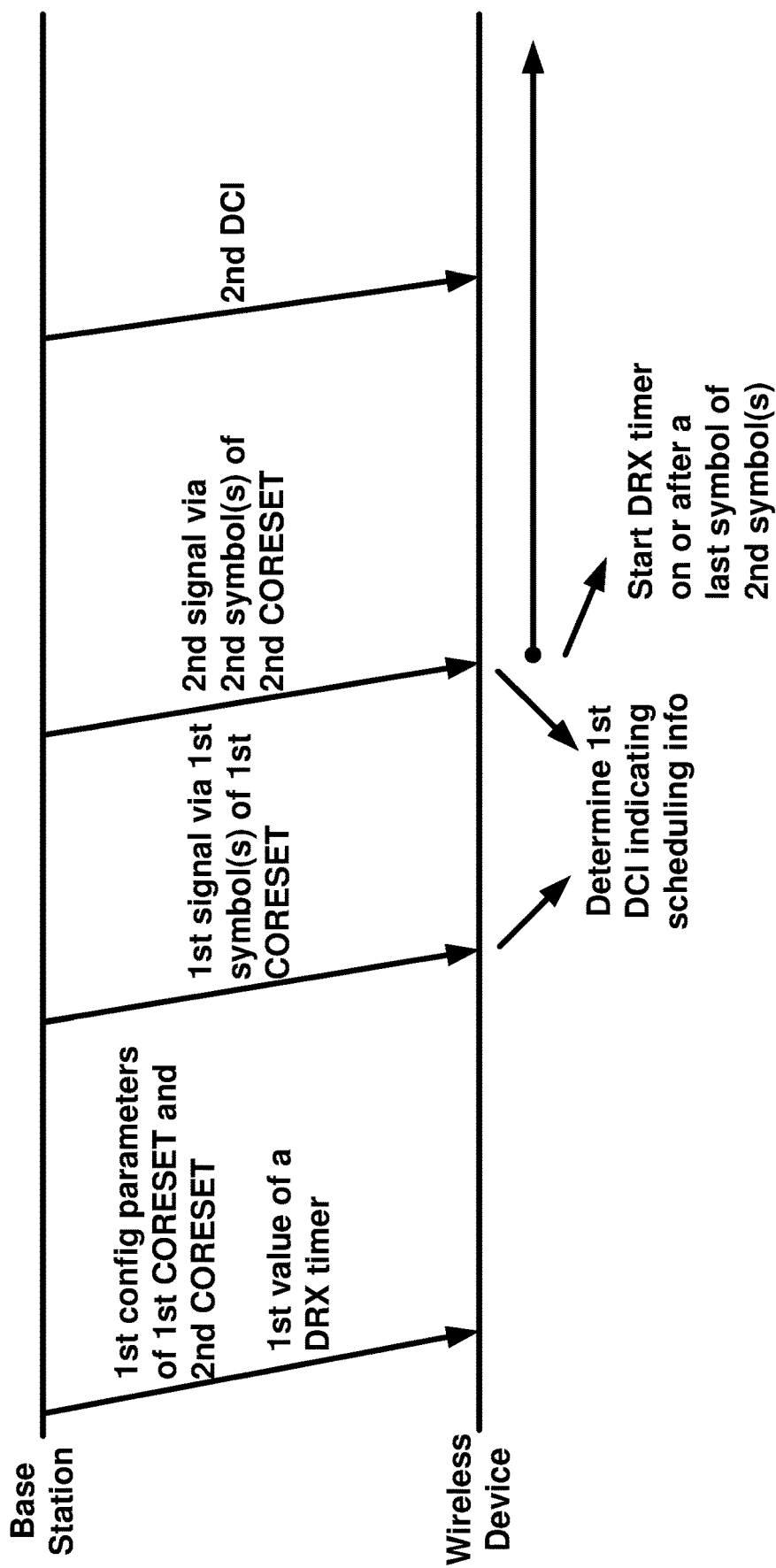
FIG. 42 shows an example process as per an aspect of an embodiment of the present disclosure.

In an example embodiment as shown in FIG. 42, a wireless device may receive one or more messages comprising configuration parameters. The configuration parameters may comprise first configuration parameters of a plurality of CORESETs for receiving downlink control information. The plurality of CORESETs may comprise a first CORESET and a second CORESET wherein the configuration parameters may indicate one or more first symbols for the first CORESET and one or more second symbols for the second CORESET. In an example, the first CORESET and the second CORESET may be configured in the same slot. In an example, the first CORESET may be configured in a first slot and the second CORESET may be configured in a second slot. The second slot may be later than the second slot. In an example, the second slot may be adjacent to the first slot. In an example, the one or more second symbols may be after the one or more first symbols. The configuration parameters may comprise a first value of a DRX timer. In an example, the DRX timer may be a DRX Inactivity timer. The wireless device may receive a first signal via first radio resources of the first CORESET and in the one or more first symbols. The wireless device may receive a second signal via second radio resources of the second CORESET and in the one or more second symbols. The first signal and the second signal may be associated with a first downlink control information. For example, the first signal and the second signal may be repetitions of the first downlink control information. For example, the first downlink control information may be mapped to the first radio resources of the first signal and the second radio resources of the second signal (e.g., to the bundled resources). The wireless device may determine/decode the first downlink control information based on the first signal and the second signal. The first downlink control information may comprise scheduling information for transmission or reception of a transport block (e.g., via an uplink data channel, downlink data channel or sidelink data channel). The wireless device may start the DRX timer, with the first value, at a first timing based on the downlink control information. The first timing may be after the one or more second symbols used for reception of the second signal. For example, the first timing may be a third symbol after the one or more second symbols. The third symbol may be the earliest symbol after the one or more second symbols. The third symbol may be adjacent to the last symbol of the one or more second symbols. The wireless device may be in a DRX Active time based on the DRX timer running. The wireless device may monitor the downlink control channel based on being in the DRX Active time and the DRX timer running. The wireless device may receive a second downlink control information based on monitoring the downlink control information. The second downlink control channel may comprise scheduling information. The wireless device may receive or transmit a transport block based on the scheduling information.

Figure 43:
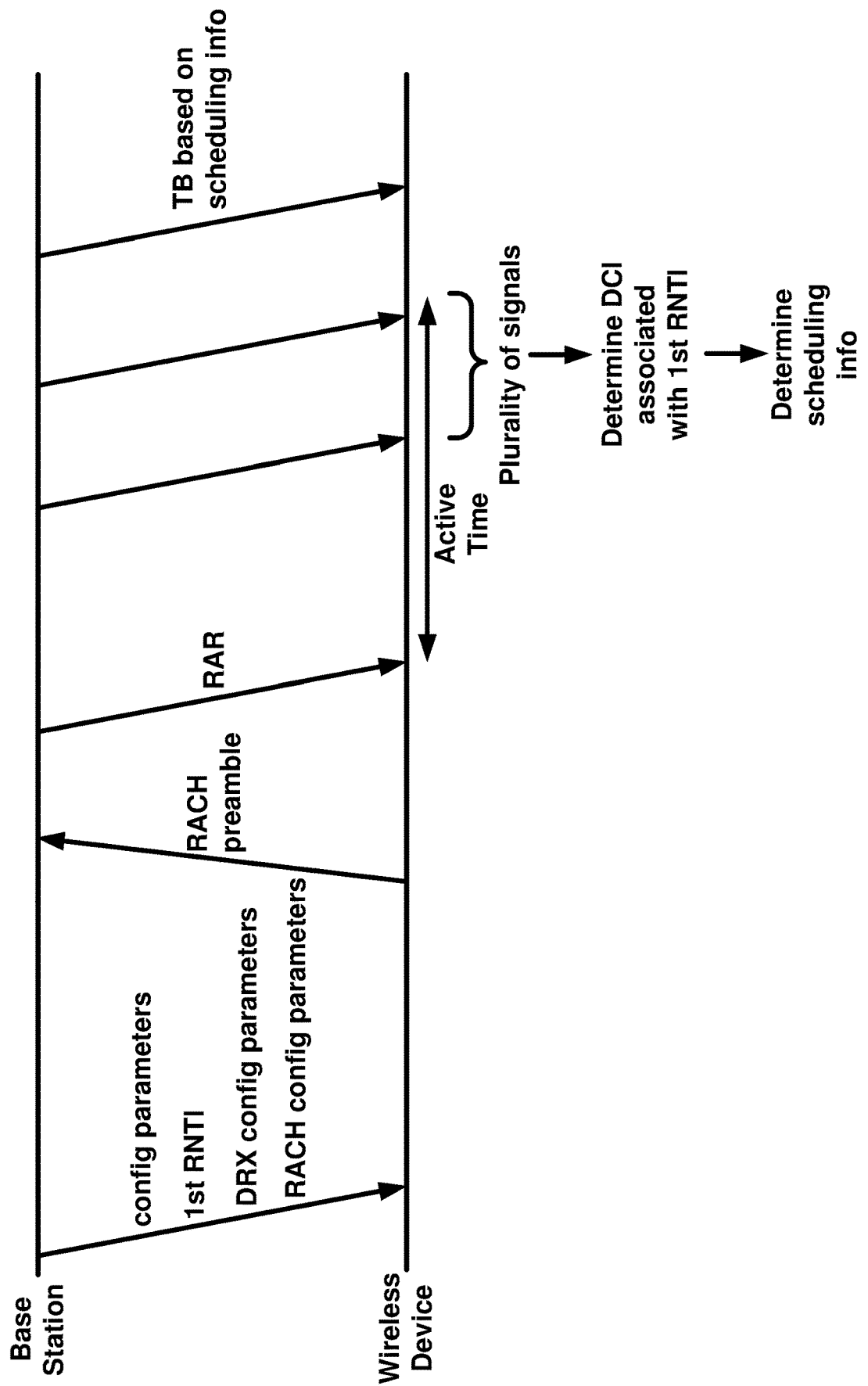
FIG. 43 shows an example process as per an aspect of an embodiment of the present disclosure.

In an example embodiment as shown in FIG. 43, a wireless device may receive configuration parameters comprising a first RNTI. The first RNTI may be a C-RNTI. The configuration parameters may further comprise DRX configuration parameters and random access configuration parameters. The DRX configuration parameters may be used by the wireless device for a DRX procedure that controls control channel monitoring by the wireless device. The wireless device may use the random access configuration parameters for a random access process. The wireless device may transmit a random access preamble in response to starting a random access process. The random access process may be a four-step random access process or a two-step random access process. The wireless device may receive a random access response based on the transmission of the random access preamble. The wireless device may determine that the wireless device is in Active time from a time of the reception of the random access response and until a plurality of signals associated with a downlink control information is received. The downlink control information may be associated with the first RNTI. In an example, the plurality of signals may be repetitions of the downlink control information. In an example, the downlink control information may be mapped to radio resources of the plurality of signals (e.g., bundled resources). A signal in the plurality of signals may be received via radio resources of a CORESET. In an example, the plurality of signals may comprise a first signal and a second signal wherein the first signal is received via first radio resources of a first CORESET and a second signal may be received via second radio resources of a second CORESET. The wireless device may determine scheduling information for transmission or reception of a transport block based on the receiving the plurality of signals and determining/decoding the downlink control information. The wireless device may transmit or receive a transport block based on the scheduling information.

Figure 44:
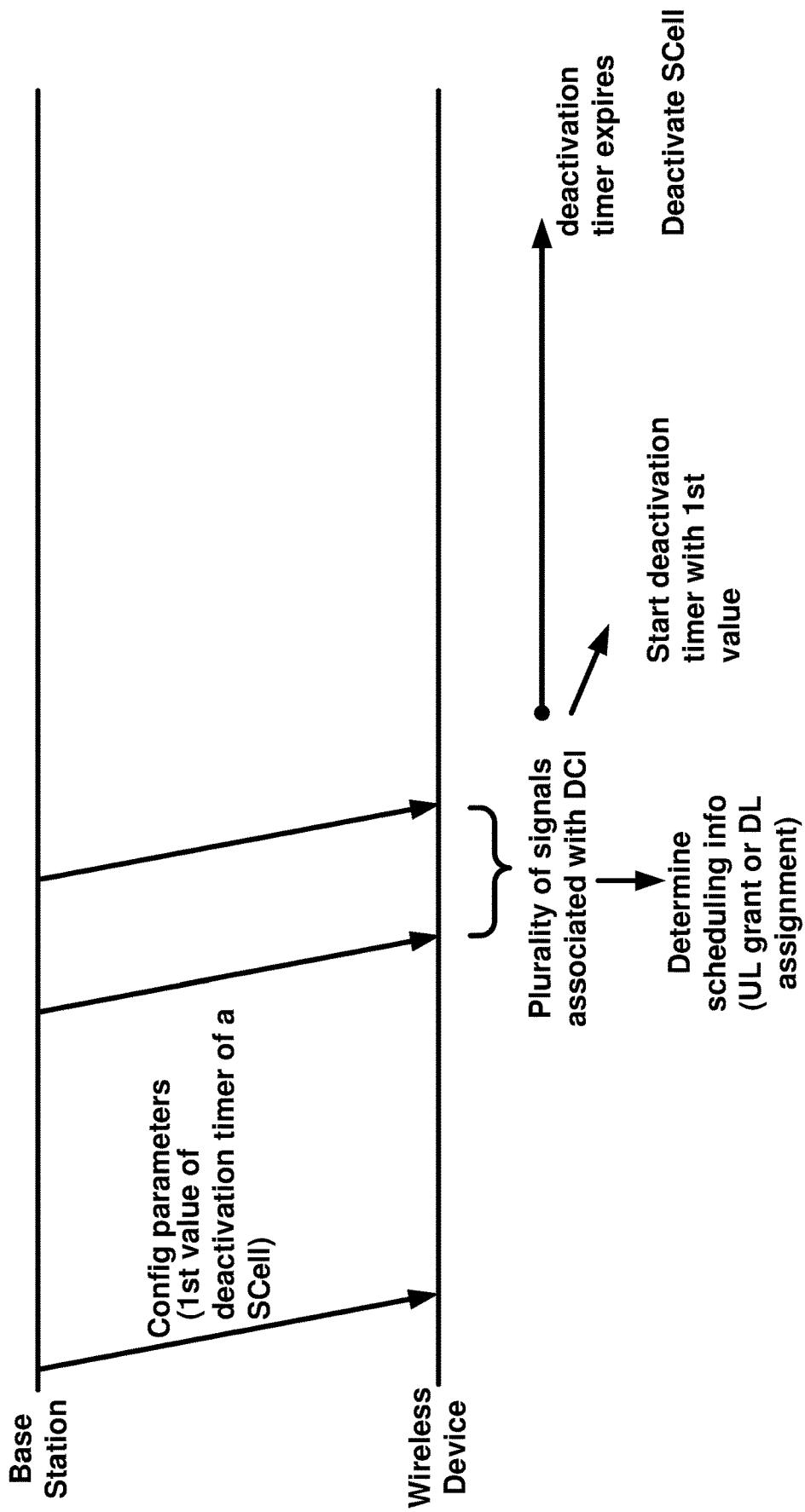
FIG. 44 shows an example process as per an aspect of an embodiment of the present disclosure.

In an example embodiment as shown in FIG. 44, a wireless device may receive configuration parameters of one or more secondary cells. The configuration parameters may indicate a first value of a deactivation timer of a first cell of the one or more secondary cells. The wireless device may receive a plurality of signals associated with a downlink control information. In an example, the plurality of signals may be repetitions of the downlink control information. In an example, the downlink control information may be mapped to the radio resources of the plurality of signals (e.g., mapped to the bundled resources). The wireless device may determine/decode the downlink control information based on the plurality of signals. The downlink control information may comprise/indicate scheduling information. The wireless device may determine the scheduling information. The scheduling information may indicate an uplink grant or a downlink assignment on the first cell or for the first cell (e.g., in case of carrier aggregation and in case the downlink control information is received on a second cell different from the first cell). The wireless device may start the deactivation timer with the first value after a first number of symbols from the last signal in the plurality of signals. For example, the first plurality of signals may comprise a first signal and a second signal, wherein the first radio resources of the first signal may span one or more first symbols and the second radio resources of the second signal may span one or more second symbols. The wireless device may start the deactivation timer after the first number of symbols from the last/latest symbol of the one or more second symbols.

In an example embodiment, a wireless device may receive configuration parameters of receiving downlink control information. The wireless device may determine downlink control channel monitoring occasions/timings based on the configuration parameters. The configuration parameters may comprise a monitoring periodicity and offset parameter or a duration parameter and the wireless device may determine a monitoring occasion/timing based on the monitoring periodicity and offset parameter or the duration parameter. The wireless device may determine that a plurality of signals is needed for determining/decoding a downlink control information. The wireless device may receive, in a first monitoring occasion/timing a first signal in the plurality of signals associated with the downlink control information. The wireless may determine a second monitoring occasion/timing based on the first monitoring occasion/timing and/or based on determining that the plurality of signals is associated with the downlink control information. The wireless device may receive, in the second monitoring occasion/timing a second signal in the plurality of signals. The wireless device may determine the downlink control information based on the first signal and the second signal. The wireless device may transmit or receive a transport block based on the downlink control information.

In an example, a wireless device may receive one or more commands (e.g., one or more MAC CEs) indicating that one or more CORESETs, comprising a first CORESET, may be used for reception of a downlink control information via repetition of the downlink control information. For example, the downlink control information may be received based on the first CORESET and a second CORESET. The one or more CORESETs may comprise the first CPRESET and the second COREET. The command may comprise a field, a value of the field indicating an identifier of that the first CORESET. An LCID associated with the command/MAC CE may indicate that the command/MAC is for indicating one or more CORESETs for receiving repetitions of the downlink control information. The wireless device may determine that the command/MAC CE is for indicating one or more CORESETs for receiving repetitions of the downlink control information based on the LCID.

In an example, a wireless device may receive one or more commands (e.g., one or more MAC CEs) indicating that one or more CORESETs, comprising a first CORESET, may be used for reception of a downlink control information by mapping the downlink control information to radio resources of the one or more CORESETs (e.g., bundling radio resources of the one or more CORESETs). For example, the downlink control information may be received based on the first CORESET and a second CORESET. The one or more CORESETs may comprise the first CPRESET and the second COREET. The command may comprise a field, a value of the field indicating an identifier of that the first CORESET. An LCID associated with the command/MAC CE may indicate that the command/MAC is for indicating one or more CORESETs associated with the downlink control information. The wireless device may determine that the command/MAC CE is for indicating one or more CORESETs associated with the downlink control information based on the LCID.

In an example, a value of a field of the command/MAC CE may indicate whether a CORESET is used for reception of downlink control information by repetition or by resource bundling.

In an example embodiment, a wireless device may receive configuration parameters of a first control resource set, associated with a first control resource set identifier, and a second control resource set associated with a second control resource set identifier. The wireless device may receive a downlink control information via first radio resources of the first control resource set and second radio resources of the second control resource set wherein the first control resource set identifier and the second control resource set identifier have the same value. The wireless device may receive a downlink control information via first radio resources of the first control resource set and second radio resources of the second control resource set based on the first control resource set identifier and the second control resource set identifier having the same value. The wireless device may receive a downlink control information via first radio resources of the first control resource set and second radio resources of the second control resource set wherein the wireless device expects that the first control resource set identifier and the second control resource set identifier have the same value.

In an example embodiment, a wireless device may receive configuration parameters of a first search space, associated with a first search space identifier, and a second search space associated with a second search space identifier. The wireless device may receive a downlink control information via first radio resources of the first search space and second radio resources of the second search space wherein the first search space identifier and the second search space identifier have the same value. The wireless device may receive a downlink control information via first radio resources of the first search space and second radio resources of the second search space based on the first search space identifier and the second search space identifier having the same value. The wireless device may receive a downlink control information via first radio resources of the first search space and second radio resources of the second search space wherein the wireless device expects that the first search space identifier and the second search space identifier have the same value.

In an example embodiment, a wireless device may receive configuration parameters of a first control resource set, associated with a first control resource set pool/group, and a second control resource set associated with a second control resource set pool/group. The wireless device may receive a downlink control information via first radio resources of the first control resource set and second radio resources of the second control resource set wherein the first control resource set pool/group and the second control resource set pool/group are the same. The wireless device may receive a downlink control information via first radio resources of the first control resource set and second radio resources of the second control resource set based on the first control resource set pool/group and the second control resource set pool/group being the same. The wireless device may receive a downlink control information via first radio resources of the first control resource set and second radio resources of the second control resource set wherein the wireless device expects the first control resource set pool/group and the second control resource set pool/group to be the same.

In an example, the first control resource set pool/group may be associated with the a first control resource set pool/group identifier. The second control resource set may be associated with a second control resource set pool/group identifier. The first control resource set pool/group may be the same as the second control resource set pool/group based on the first control resource set pool/group identifier being equal to the second control resource set pool/group identifier.

In an example embodiment, a wireless device may receive configuration parameters of a first search space, associated with a first search space pool/group, and a second search space associated with a second search space pool/group. The wireless device may receive a downlink control information via first radio resources of the first search space and second radio resources of the second search space wherein the first search space pool/group and the second search space pool/group are the same. The wireless device may receive a downlink control information via first radio resources of the first search space and second radio resources of the second search space based on the first search space pool/group and the second search space pool/group being the same. The wireless device may receive a downlink control information via first radio resources of the first search space and second radio resources of the second search space wherein the wireless device expects the first search space pool/group and the second search space pool/group to be the same.

In an example, the first search space pool/group may be associated with the a first search space pool/group identifier. The second search space may be associated with a second search space pool/group identifier. The first search space pool/group may be the same as the second search space pool/group based on the first search space pool/group identifier being equal to the second search space pool/group identifier.

In an example, the receiving the downlink control information may comprise receiving repetitions of a downlink control channel (e.g., a downlink control channel carrying the downlink control information) in the first control resource set and the second control resource set. The receiving the downlink control information may comprise receiving repetitions of the downlink control information via the first control resource set and the second control resource set. In an example, the receiving the downlink control information may comprise receiving repetitions of a downlink control channel (e.g., a downlink control channel carrying the downlink control information) in the first search space and the second search space. The receiving the downlink control information may comprise receiving repetitions of the downlink control information via the first search and the second search space.

In an example, the downlink control information may be mapped to the first radio resources. The downlink control information is mapped to the second radio resources.

In an example, the receiving the downlink control information may comprise bundling the first radio resources of the first control resource set and the second radio resources of the second control resource set. In an example, the receiving the downlink control information comprises bundling the first radio resources of the first search space and the second radio resources of the second search space. In an example, the downlink control information may be mapped to a plurality of radio resources comprising the first radio resources and the second radio resources.

In an example embodiment, a base station may transmit configuration parameters of a first control resource set, associated with a first control resource set identifier, and a second control resource set associated with a second control resource set identifier. In an example, a base station may transmit configuration parameters of a first search space, associated with a first search space identifier, and a second search space associated with a second search space identifier. The base station may transmit a downlink control information via first radio resources of the first control resource set and second radio resources of the second control resource set wherein the first control resource set identifier and the second control resource set identifier have the same value. The base station may transmit a downlink control information via first radio resources of the first control resource set and second radio resources of the second control resource set based on the first control resource set identifier and the second control resource set identifier having the same value. In an example, the base station may transmit a downlink control information via first radio resources of the first search space and second radio resources of the second search space wherein the first search space identifier and the second search space identifier have the same value. The base station may transmit a downlink control information via first radio resources of the first search space and second radio resources of the second search space based on the first search space identifier and the second search space identifier having the same value.

In an example embodiment, a base station may transmit configuration parameters of a first control resource set, associated with a first control resource set pool/group, and a second control resource set associated with a second control resource set pool/group. In an example, the base station may transmit configuration parameters of a first search space, associated with a first search space pool/group, and a second search space associated with a second search space pool/group. The base station may transmit a downlink control information via first radio resources of the first control resource set and second radio resources of the second control resource set wherein the first control resource set pool/group and the second control resource set pool/group are the same. The base station may transmit a downlink control information via first radio resources of the first control resource set and second radio resources of the second control resource set based on the first control resource set pool/group and the second control resource set pool/group being the same. In an example, the base station may transmit a downlink control information via first radio resources of the first search space and second radio resources of the second search space wherein the first search space pool/group and the second search space pool/group are the same. The base station may transmit a downlink control information via first radio resources of the first search space and second radio resources of the second search space based on the first search space pool/group and the second search space pool/group being the same.

In an example, the first control resource set pool may be associated with a first control resource set pool/group identifier. The second control resource set may be associated with a second control resource set pool/group identifier. The first control resource set pool/group may be the same as the second control resource set pool/group based on the first control resource set pool/group identifier being equal to the second control resource set pool/group identifier.

In an example, the first search space pool may be associated with a first search space pool/group identifier. The second search space may be associated with a second search space pool/group identifier. The first search space pool/group may be the same as the second search space pool/group based on the first search space pool/group identifier being equal to the second search space pool/group identifier.

In an example, the transmitting the downlink control information may comprise transmitting repetitions of a downlink control channel (e.g., a downlink control channel carrying the downlink control information) in the first control resource set and the second control resource set. In an example, the transmitting the downlink control information may comprise transmitting repetitions of the downlink control information in the first control resource set and the second control resource set.

In an example, the transmitting the downlink control information may comprise transmitting repetitions of a downlink control channel (e.g., a downlink control channel carrying the downlink control information) in the first search space and the second search space. In an example, the transmitting the downlink control information may comprise transmitting repetitions the downlink control information in the first search space and the second search space.

In an example, the base station may map the downlink control information to the first radio resources. The base station may map the downlink control information to the second radio resources.

In an example, the transmitting the downlink control information may comprise bundling the first radio resources of the first control resource set and the second radio resources of the second control resource set. In an example, the transmitting the downlink control information comprises bundling the first radio resources of the first search space and the second radio resources of the second search space. In an example, the base station may map the downlink control information to a plurality of radio resources comprising the first radio resources and the second radio resources.

In an example embodiment, a wireless device may receive configuration parameters of a first control resource set, associated with a first control resource set identifier, and a second control resource set associated with a second control resource set identifier. In an example, the wireless device may receive configuration parameters of a first search space, associated with a first search space identifier, and a second search space associated with a second search space identifier. The wireless device may receive a first signal via first radio resources of the first control resource set and a second signal via second radio resources of the second control resource set, wherein the first signal and the second signal are for reception of (e.g., associated with) a downlink control information. In an example, the wireless device may receive a first signal via first radio resources of the search space and a second signal via second radio resources of the second search space, wherein the first signal and the second signal are for reception of (e.g., associated with) a downlink control information. The wireless device may ignore the first signal and/or the second signal based on the first control resource set identifier having a different value from the second control resource set identifier. In an example, the wireless device may ignore the first signal and/or the second signal based on the first search space identifier having a different value from the second search space identifier.

In an example embodiment, a wireless device may receive configuration parameters of a first control resource set, associated with a first control resource set pool/group (e.g., a first control resource set pool/group identifier) and a second control resource set associated with a second control resource set pool/group (e.g., a second control resource set pool/group identifier). In an example, the wireless device may receive configuration parameters of a first search space associated with a first search space pool/group (e.g., a first search space pool/group identifier), and a second search space pool/group (e.g., a second search space pool/group identifier). The wireless device may receive a first signal via first radio resources of the first control resource set and a second signal via second radio resources of the second control resource set, wherein the first signal and the second signal are for reception of (e.g., associated with) a downlink control information. In an example, the wireless device may receive a first signal via first radio resources of the first search space and a second signal via second radio resources of the second search space, wherein the first signal and the second signal are for reception of (e.g., associated with) a downlink control information. The wireless device may ignore the first signal and/or the second signal based on the first control resource set pool/group (the first control resource set pool/group identifier) being different (having a different value) from the second control resource set pool/group (control resource set pool/group identifier). In an example, the wireless device may ignore the first signal and/or the second signal based on the first search space pool/group (search space pool/group identifier) being different (having a different value) from the second search space pool/group (search space pool/group identifier).

In an example, the wireless device may determine/decode the downlink control information based on one of the first signal and the second signal. The wireless device may decode/determine the downlink control information based on the first signal or based on the second signal.

In an example, the first signal and the second signal may be repetitions of the downlink control information in the first control resource set and the second control resource set. In an example, the first signal and the second signal may be repetitions of a downlink control channel carrying the downlink control information in the first control resource set and the second control resource set. In an example, the first signal and the second signal may be repetitions of the downlink control information in the first search space and the second search space. In an example, the first signal and the second signal may be repetitions of a downlink control channel carrying the downlink control information in the first search space and the second search space. The downlink control information is mapped to the first radio resources. The downlink control information is mapped to the second radio resources. The downlink control information is mapped to the first radio resources and the downlink control information is mapped to the second radio resources.

In an example, the wireless device may bundle the first radio resources of the first control resource set and the second radio resources of the second control resource set for reception of the downlink control information. In an example, the wireless device may bundle the first radio resources of the first search space and the second radio resources of the second search space for reception of the downlink control information. The downlink control information may be mapped to a plurality of radio resources comprising the first radio resources and the second radio resources.

In an example, the first control resource set may be in a first slot and the second control resource set may be in a second slot. In an example, the first search space may be in a first slot and the second search space may be in a second slot.

In an example, the first control resource set and the second control resource set may be in the same slot. In an example, the first search space and the second search space are in the same slot.

In an example, the configuration parameters may comprise first configuration parameters, of the first control resource set, indicating the first control resource set identifier and the first radio resources; and second configuration parameters, of the second control resource set, indicating the second control resource set identifier and the second radio resources. In an example, the configuration parameters may comprise first configuration parameters, of the first search space, indicating the first search space identifier and the first radio resources; and second configuration parameters, of the second search space, indicating the second search space identifier and the second radio resources.

In an example embodiment, a wireless device may receive configuration parameters of a first control resource set, associated with a first transmission configuration indicator (TCI) state, and a second control resource set associated with a second TCI state. The wireless device may receive a downlink control information via first radio resources of the first control resource set and second radio resources of the second control resource set wherein the first TCI state and the second TCI state are the same. The wireless device may receive a downlink control information via first radio resources of the first control resource set and second radio resources of the second control resource set based on the first TCI state and the second TCI state being the same. The wireless device may receive a downlink control information via first radio resources of the first control resource set and second radio resources of the second control resource set wherein the wireless device expects that the first TCI state and the second TCI state to be the same.

In an example, the wireless device may receive one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example, the first control resource set is associated with a first TCI state identifier. The second control resource set is associated with a second TCI state identifier. The receiving the downlink control information may be based on the first TCI state identifier and the second TCI state identifier having the same value. The first TCI state identifier and the second TCI state identifier may have the same values. The wireless device may expect that the first TCI state identifier and the second TCI state identifier have the same value. In an example, the configuration parameters may comprise first configuration parameters of the first TCI state comprising the first TCI state identifier. The configuration parameters may comprise second configuration parameters of the second TCI state comprising the second TCI state identifier.

In an example embodiment, a wireless device may receive configuration parameters of a first control resource set, associated with a first transmission configuration indicator (TCI) state, and a second control resource set associated with a second TCI state. The wireless device may receive a downlink control information via first radio resources of the first control resource set and second radio resources of the second control resource set wherein the first TCI state and the second TCI state indicate the same spatial quasi-colocation relation. In an example, the wireless device may receive a downlink control information via first radio resources of the first control resource set and second radio resources of the second control resource set based on the first TCI state and the second TCI state indicating the same spatial quasi-colocation relation. In an example, the wireless device may receive a downlink control information via first radio resources of the first control resource set and second radio resources of the second control resource set wherein the wireless device may expect that the first TCI state and the second TCI state indicate the same spatial quasi-colocation relation.

In an example, the first TCI state and the second TCI state indicate the same spatial quasi-colocation relation based on the first TCI state and the second TCI state being associated with the same reference signal.

In an example embodiment, a wireless device may receive configuration parameters of a first control resource set, associated with a first transmission configuration indicator (TCI) state, and a second control resource set associated with a second TCI state. The wireless device may receive a first signal via first radio resources of the first control resource set and a second signal via second radio resources of the second control resource set, wherein the first signal and the second signal are for reception of (e.g., associated with) a downlink control information. The wireless device may decode/determine the downlink control information based on one of the first TCI state or the second TCI state based on the first TCI state and the second TCI state (e.g., the first TCI state identifier and the second TCI state identifier) being different. In an example, the wireless device may decode/determine the downlink control information based on one of the first signal or the second signal based on the first TCI state and the second TCI state (e.g., the first TCI state identifier and the second TCI state identifier) being different.

In an example, the wireless device may receive one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example embodiment, a wireless device may receive configuration parameters of a first control resource set, associated with a first transmission configuration indicator (TCI) state, and a second control resource set associated with a second TCI state. The wireless device may receive a first signal via first radio resources of the first control resource set and a second signal via second radio resources of the second control resource set, wherein the first signal and the second signal are for reception of (e.g., associated with) a downlink control information. The wireless device may ignore the first signal and/or the second signal based on the first TCI state and the second TCI state (e.g., the first TCI state identifier and the second TCI state identifier) being different. In an example, the first control resource set may be associated with a first TCI state identifier. The second control resource set may be associated with a second TCI state identifier. The ignoring the first signal and/or the second signal is based on the first TCI state identifier and the second TCI state identifier having different values.

In an example, the wireless device may receive one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example embodiment, a wireless device may receive configuration parameters of a first control resource set, associated with a first transmission configuration indicator (TCI) state, and a second control resource set associated with a second TCI state. The wireless device may receive a first signal via first radio resources of the first control resource set and a second signal via second radio resources of the second control resource set, wherein the first signal and the second signal are for reception of e.g., (associated with) a downlink control information. The wireless device may ignore the first signal and/or the second signal based on the first TCI state and the second TCI state indicate different spatial quasi-colocation relations. In an example, the first TCI state and the second TCI state may indicate different spatial quasi-colocation relations based on the first TCI state being associated with the a first reference signal and the second TCI state being associated with a second reference signal.

In an example, the receiving the downlink control information may comprise receiving repetitions of a downlink control channel in the first control resource set and the second control resource set. The receiving the downlink control information may comprise receiving repetitions of the downlink control information via the first control resource set and the second control resource set. In an example, the downlink control information may be mapped to the first radio resources. The downlink control information may be mapped to the second radio resources.

In an example, the receiving the downlink control information may comprise bundling the first radio resources of the first control resource set and the second radio resources of the second control resource set. The downlink control information may be mapped to a plurality of radio resources comprising the first radio resources and the second radio resources.

In an example embodiment, a base station may transmit configuration parameters of a first control resource set, associated with a first transmission configuration indicator (TCI) state, and a second control resource set associated with a second TCI state. The base station may transmit a downlink control information via first radio resources of the first control resource set and second radio resources of the second control resource set wherein the first TCI state and the second TCI state are the same. The base station may transmit a downlink control information via first radio resources of the first control resource set and second radio resources of the second control resource set based on the first TCI state and the second TCI state being the same. In an example, the first control resource set may be associated with a first TCI state identifier. The second control resource set may be associated with a second TCI state identifier, wherein the first TCI state identifier and the second TCI state identifier may have the same values. The transmitting the downlink control information may be based on the first TCI state identifier and the second TCI state identifier having the same value.

In an example, the base station may transmit one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example, the transmitting the downlink control information may comprise transmitting repetitions of a downlink control channel in the first control resource set and the second control resource set. In an example, the transmitting the downlink control information may comprise transmitting repetitions of the downlink control information via the first control resource set and the second control resource set. The base station may map the downlink control information to the first radio resources; and the base station may map the downlink control information to the second radio resources.

In an example, the transmitting the downlink control information may comprise bundling the first radio resources of the first control resource set and the second radio resources of the second control resource set. The base station may map the downlink control information to a plurality of radio resources comprising the first radio resources and the second radio resources.

In an example, the first control resource set is in a first slot and the second control resource set is in a second slot.

In an example, the first control resource set and the second control resource set are in the same slot.

In an example, the configuration parameters comprise: first configuration parameters, of the first control resource set, indicating the first TCI state (e.g., the first TCI state identifier) and the first radio resources; and second configuration parameters, of the second control resource set, indicating the second TCI state (e.g., the second TCI state identifier) and the second radio resources.

In an example embodiment, a wireless device may receive one or more commands/control elements/MAC control elements indicating: a first TCI state for reception of control information/downlink control channel via a first control resource set; and a second TCI state for reception of control information/downlink control channel via a second control resource set. The wireless device may ignore the one or more commands/control elements/MAC control elements based on: the first control resource set and the second control resource set being for reception of (e.g., being configured to receive) a first downlink control information; and the first TCI state being different from the second TCI state.

In an example embodiment, a wireless device may receive one or more commands/control elements/MAC control elements indicating: a first TCI state for reception of control information/downlink control channel via a first control resource set; and a second TCI state for reception of control information/downlink control channel via a second control resource set. The wireless device may receive a first signal, via the first radio resources of the first control resource set, and a second signal via the second radio resources of the second control resource set, wherein the first signal and the second signal are for receiving a first downlink control information. The wireless device may ignore the one or more commands/control elements/MAC control elements based on the first TCI state being different from the second TCI state.

In an example embodiment, a wireless device may receive one or more commands/control elements/MAC control elements indicating: a first TCI state for reception of control information/downlink control channel via a first control resource set; and a second TCI state for reception of control information/downlink control channel via a second control resource set. The wireless device may a first signal, via the first radio resources of the first control resource set, and a second signal via the second radio resources of the second control resource set, wherein the first signal and the second signal are for receiving a first downlink control information. The wireless device may ignore the first signal and/or the second signal based on the first TCI state being different from the second TCI state.

In an example, the reception of the first downlink control information may comprise receiving repetitions of a downlink control channel (e.g., a downlink control channel carrying the first downlink control information) in the first control resource set and the second control resource set. In an example, the reception of the first downlink control information may comprise repetitions of the first downlink control information via the first control resource set and the second control resource set. In an example, the first downlink control information may be mapped to the first radio resources; and the first downlink control information may be mapped to the second radio resources.

In an example, the receiving the first downlink control information may comprise bundling the first radio resources of the first control resource set and the second radio resources of the second control resource set. In an example, the first downlink control information may be mapped to a plurality of radio resources comprising the first radio resources and the second radio resources.

In an example embodiment, a wireless device may receive first configuration parameters of a first control resource set comprising a first control resource set identifier; and second configuration parameters of a second control resource set comprising a second control resource set identifier. In an example, the wireless device may receive third configuration parameters indicating that the first control resource set and the second control resource set are for reception of a downlink control information. The third configuration parameters may indicate an association between the first control resource set and the second control resource set for reception of downlink control information. In an example, the wireless device may receive dynamic signaling, such as a control element, indicating that the first control resource set and the second control resource set are for reception of a downlink control information. The dynamic signaling may indicate an association between the first control resource set and the second control resource set for reception of downlink control information. The wireless device may receive a first signal via first radio resources of the first control resource set. The wireless device may receive a second signal via second radio resources of the second control resource set. The wireless device may decode/determine a downlink control information based on the first signal and the second signal.

In an example embodiment, a wireless device may receive a first signal based on a first transmission configuration indicator. The wireless device may determine a second transmission configuration based on the first transmission configuration indicator. The wireless device may receive a second signal based on the second transmission configuration indicator. The wireless device may determine a downlink control information based on the first signal and the second signal. The wireless device may receive or transmit a transport block based on the downlink control information.

In an example embodiment, a wireless device may receive, by a wireless device, a first signal based on a first control resource set. The wireless device may determine a second control resource set based on the first control resource set. The wireless device may receive a second signal based on the second control resource set. The wireless device may determine a downlink control information based on the first signal and the second signal. The wireless device may receive or transmit a transport block based on the downlink control information. In an example, the first control resource set may be associated with a first control resource set identifier. The determine the second control resource set may comprise determining a second control resource set identifier based on the first control resource set identifier.

In an example embodiment, a wireless device may receive configuration parameters of a first control resource set and/or a first search space for a first bandwidth part and/or a first cell and a second control resource set and/or search space for a second bandwidth part and/or a second cell. The wireless device may receive a first signal based on (e.g., via) the first control resource set and/or the first search space. The wireless device may receive a second signal based on (e.g., via) the second control resource set and/or the second search space. The wireless device may determine a downlink control information based on the first signal and the second signal. The wireless device may receive or transmit a transport block based on the downlink control information.

In an example, the first signal and the second signal may be repetitions of a downlink control channel (e.g., a downlink control channel carrying the downlink control information) in the first control resource set or the first search space and the second control resource set or the second search space. In an example, the first signal and the second signal may be repetitions of the downlink control information via the first control resource set or the first search space and the second control resource set or the second search space. The downlink control information may be mapped to first radio resources used for transmission of the first signal; and the downlink control information may be mapped to second radio resources used for transmission of the first signal.

In an example, the receiving the first downlink control information may comprise bundling the first radio resources of the first control resource set and the second radio resources of the second control resource set. The first downlink control information may be mapped to a plurality of radio resources comprising the first radio resources and the second radio resources.

In an example embodiment, a wireless device may receive configuration parameters of a first control resource set, associated with a first transmission configuration indicator (TCI) state, and a second control resource set associated with a second TCI state. The second TCI state may be different from the first TCI state. The wireless device may receive a downlink control information via first radio resources of the first control resource set and second radio resources of the second control resource set, the downlink control information comprising scheduling information for reception of a downlink transport block. Based on the downlink control information not indicating a TCI state for reception of the downlink transport block (e.g., not comprising a TCI field) and the first TCI state being different from the second TCI state, the wireless device may ignore the scheduling information.

In an example, the wireless device may receive one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example embodiment, a wireless device may receive configuration parameters of a first control resource set, associated with a first transmission configuration indicator (TCI) state, and a second control resource set associated with a second TCI state. The second TCI state may be different from the first TCI state. The wireless device may receive a downlink control information via first radio resources of the first control resource set and second radio resources of the second control resource set, the downlink control information comprising scheduling information for reception of a downlink transport block. Based on the downlink control information not indicating a TCI state for reception of the downlink transport block (e.g., not comprising a TCI field), the wireless device may determine one of the first TCI state and the second TCI state as a determined TCI state for reception of a downlink transport block.

The wireless device may receive the downlink transport block based on the determined TCI state and based on the downlink control information.

In an example, the wireless device may receive one or more (commands) (control elements) (MAC control elements) indicating an association between the first control resource set and the first TCI state and an association between a second control resource set and the second TCI state. The one or more (commands) (control elements) (MAC control elements) may comprise one or more TCI State Indication for UE-specific PDCCH MAC CEs.

In an example, the first control resource set may be associated with a first TCI state identifier. The second control resource set is associated with a second TCI state identifier.

In an example, the determining the one of the first TCI state and the second TCI state and/or the ignoring the scheduling information of the downlink control information may be further based on a time offset between the reception of the downlink control information and the downlink transport block being equal to or greater than a threshold. For example, the first radio resources comprise/span one or more first symbols. The second radio resources comprise/span one or more second symbols. A time of reception of the downlink control information may be based on the one or more second symbols. In an example, the threshold may be based on a capability of the wireless device.

In an example, the receiving the downlink control information may comprise receiving repetitions of a downlink control channel (e.g., a downlink control channel carrying the downlink control information) in the first control resource set and the second control resource set. In an example, the receiving the downlink control information may comprise receiving repetitions of the downlink control information via the first control resource set and the second control resource set. In an example, the downlink control information may be mapped to the first radio resources. The downlink control information may be mapped to the second radio resources.

In an example, the receiving the downlink control information may comprise bundling the first radio resources of the first control resource set and the second radio resources of the second control resource set. The downlink control information may be mapped to a plurality of radio resources comprising the first radio resources and the second radio resources.

In an example embodiment, the wireless device may receive, via first radio resources, a first signal associated with (e.g., for reception of) a downlink control information. The wireless device may determine second radio resources based on the first radio resources. The wireless device may receive a second signal based on/via the second radio resources, wherein the second signal may be associated with (e.g., may be for reception of) the downlink control information. The wireless device may decode/determine the downlink control information based on the first signal and the second signal.

In an example, the wireless device may receive configuration parameters of a first control resource set and a second control resource set, wherein the first radio resources may be for the first control resource set and the second radio resources may be for the second control resource set. In an example, the wireless device may receive configuration parameters of a first search space and a second search space, wherein the first radio resources may be associated with the first search space and the second radio resources may be associated with the second search space. In an example, the configuration parameters may comprise a parameter indicating an association between the first control resource set and the second control resource set. In an example, the configuration parameters may comprise a parameter indicating an association between the first search space and the second search space. The determining the second radio resources may be based on the parameter.

In an example, the wireless device may receive configuration parameters of a control resource set, wherein the first radio resources and the second radio resources are for the control resource set.

In an example, the wireless device may receive a configuration parameter, wherein the determining the second radio resources is based on the configuration parameter.

In an example, the determining/decoding the downlink control information may comprise receiving repetitions of a downlink control channel (e.g., a downlink control channel carrying the downlink control information) in a first control resource set and a second control resource set. In an example, the determining/decoding the downlink control information may comprise receiving repetitions of the downlink control information via a first control resource set and a second control resource set. In an example, the determining/decoding the downlink control information may comprise receiving repetitions of the downlink control information via a first search space and a second search space. In an example, the first radio resources may be for the first control resource set and the second radio resources are for the second control resource set. In an example, the first radio resources may be for the first search space and the second radio resources may be for the second search space. The downlink control information may be mapped to the first radio resources; and the downlink control information may be mapped to the second radio resources.

In an example, the determining/decoding the downlink control information may comprise bundling the first radio resources and the second radio resources. The first radio resources may be for a first control resource set and the second radio resources may be for a second control resource set. The first radio resources may be for a first search space and the second radio resources may be for a second search space. In an example, the downlink control information may be mapped to a plurality of radio resources comprising the first radio resources and the second radio resources.

In an example embodiment, a wireless device may receive configuration parameters of a plurality of control resource sets, comprising a first control resource set and a second control resource set, for reception of control information. The first control resource set and the second control resource set may be for a bandwidth part. In an example, the wireless device may receive configuration parameters of a plurality of search spaces, comprising a first search space and a second search space, for reception of control information. The wireless device may receive a first signal via the first control resource set. The wireless device may receive the first signal via the first search space. The wireless device may determine the second control resource set based on the first control resource set. In an example, the wireless device may determine the second search space based on the first search space. The wireless device may receive a second signal based on (e.g., via) the second control resource set. In an example, the wireless device may receive a second signal based on (e.g., via) the second search space. The wireless device may decode/determine a downlink control information based on the first signal and the second signal.

In an example, the configuration parameters comprise one or more first configuration parameters. The determining the second control resource set may be based on the one or more first configuration parameters. The one or more first configuration parameters may be for the first control resource set. In an example, the determining the second search space may be based on the one or more first configuration parameters. The one or more first configuration parameters may be for the first search space. In an example the one or more first configuration parameters may indicate an association between the first control resource set and the second control resource set. In an example, the one or more first configuration parameters may indicate an association between the first search space and the second search space.

In an example embodiment, a wireless device may receive configuration parameters of a first control resource set comprising one or more first parameters indicating that the first control resource set is usable with at least a second control resource set for reception of control information. The wireless device may receive configuration parameters of a first search space comprising one or more first parameters indicating that the first search space is usable with at least a second search space for reception of control information. The wireless device may a first signal (via first radio resources of the first control resource set. In an example, the wireless device may receive a first signal associated with the first search space. The wireless device may receive a second signal via second radio resources of the second control resource set. In an example, the wireless device may receive a second signal associated with a second search space. The wireless device may determine/decode a downlink control information based on the first signal and the second signal.

In an example, the receiving the first signal and receiving the second signal may comprise receiving repetitions of a downlink control channel (e.g., a control channel carrying the downlink control information) in the first control resource set and the second control resource set. In an example, the receiving the first signal and receiving the second signal may comprise receiving repetitions of the downlink control information via the first control resource set and the second control resource set. In an example, the receiving the first signal and receiving the second signal may comprise receiving repetitions of the downlink control information based on the first search space and the second search space.

In an example, the receiving the downlink control information may comprise receiving repetitions of a downlink control channel (e.g., a control channel carrying the downlink control information) in the first control resource set and the second control resource set. In an example, the receiving the downlink control information may comprise receiving repetitions of the downlink control information via the first control resource set and the second control resource set. In an example, the receiving the downlink control information may comprise receiving repetitions of the downlink control information based on the first search space and the second search space. The downlink control information may be mapped to the first radio resources and the downlink control information may be mapped to the second radio resources.

In an example, the receiving the first signal and receiving the second signal comprise bundling the first radio resources of the first control resource set and the second radio resources of the second control resource set. In an example, the receiving the downlink control information may comprises bundling the first radio resources of the first control resource set and the second radio resources of the second control resource set. The downlink control information may be mapped to a plurality of radio resources comprising the first radio resources and the second radio resources.

In an example, the one or more first parameters, indicating that the first control resource set/search space is usable with at least a second control resource set/search space for reception of control information, may indicate a choice between repetition of a downlink control information or bundling radio resources for reception of a downlink control information. The one or more first parameters may indicate one of repetition and the bundling.

In an example, a wireless device may receive a downlink control information comprising a field, a value of the field indicating that the downlink control information is repeated. The wireless device may receive a repeated downlink control information. The wireless device may determine scheduling information based on the downlink control information and the repeated downlink control information. The wireless device may receive or transmit a transport block based on the scheduling information and based on the scheduling information being for reception of a transport block or for transmission of a transport block.

In an example embodiment, a wireless device may receive, via a first control resource set, a downlink control information comprising a field, a value of the field indicating that the downlink control information is repeated in a second control resource set. The wireless device may receive a repeated downlink control information via the second control resource set. The wireless device may determine scheduling information based on the downlink control information and the repeated downlink control information. The wireless device may receive or transmit a transport block based on the scheduling information and based on the scheduling information being for reception of a transport block or for transmission of a transport block.

In an example embodiment, a wireless device may transmit to a base station, a capability message comprising one or more parameters indicating a minimum number of symbols required by the wireless device to perform a downlink control channel reception and applying spatial quasi-colocation (QCL) information received in a downlink control information for processing a downlink data channel. The wireless device may receive, for receiving control information, configuration parameters of a first control resource set and a second control resource set, the configuration parameters indicating one or more first symbols for the first control resource set and one or more second symbols for the second control resource set. The wireless device may receive a first signal via the one or more first symbols of the first control resource set. The wireless device may receive a second signal via the one or more second symbols of the second control resource set. The wireless device may determine/decode a downlink control information based on the first signal and the second signal, the downlink control information indicating: scheduling information for reception of a transport block; and a transmission configuration indicator (TCI) state indicating a spatial QCL. The wireless device may receive the transport block via the downlink data channel based on the TCI state and the scheduling information wherein a duration between a last symbol of the one or more second symbols and the transport block (e.g., the downlink data channel carrying the transport block is larger than the minimum number of symbols. The wireless device may receive the transport block via the downlink data channel based on the TCI state and the scheduling information based on a duration between a last symbol of the one or more second symbols and the transport block (e.g., the downlink data channel carrying the transport block being larger than the minimum number of symbols.

In an example, the one or more second symbols may be after the one or more first symbols.

In an example, the one or more first symbols are in a first slot and the one or more second symbols are in a second slot. the second slot may be after the first slot. In an example, the second slot may be immediately after (e.g., adjacent to) the first slot.

In an example, the receiving the first signal and receiving the second signal may comprise receiving repetitions of a downlink control channel (e.g., a downlink control channel carrying the downlink control information) in the first control resource set and the second control resource set. In an example, the wireless device may receive the downlink control information via the first control resource set and the second control resource set. In an example, the determining/decoding the downlink control information may comprise receiving repetitions of a downlink control channel (e.g., a downlink control channel carrying the downlink control information) in the first control resource set and the second control resource set. The downlink control information may be mapped to the first radio resources; and the downlink control information may be mapped to the second radio resources.

In an example, the receiving the first signal and receiving the second signal may comprise bundling the first radio resources of the first control resource set and the second radio resources of the second control resource set. In an example, the receiving the downlink control information may comprise bundling the first radio resources of the first control resource set and the second radio resources of the second control resource set. In an example, the downlink control information may be mapped to a plurality of radio resources comprising the first radio resources and the second radio resources.

In an example embodiment, a wireless device may receive: first configuration parameters, of a first control resource set and a second control resource set, indicating one or more first symbols for the first control resource set and one or more second symbols for the second control resource set; and a first value of a discontinuous reception timer. The wireless device may receive a first signal via the one or more first symbols of the first control resource set. The wireless device may receive a second signal via the one or more second symbols of the second control resource set. The wireless device may determine/decode a first downlink control information based on the first signal and the second signal, the downlink control information indicating scheduling information for reception of transport block via a downlink transmission channel or transmission of a transport block via an uplink transmission channel. The wireless device may start the discontinuous reception timer, with the first value, after a last symbol of the one or more second symbols. In an example, the wireless device may start the discontinuous reception timer, with the first value, at an earliest symbol after a last symbol of the one or more second symbols. The wireless device may start the discontinuous reception timer at a symbol adjacent to a last symbol of the one or more second symbols. The wireless device may receive a second downlink control information while the discontinuous reception timer is running.

In an example, the one or more second symbols are after the one or more first symbols.

In an example, the one or more first symbols are in a first slot and the one or more second symbols are in a second slot. The second slot is after the first slot. In an example, the second slot may be immediately after (e.g., adjacent to) the first slot.

In an example, the receiving the first signal and receiving the second signal may comprise receiving repetitions of a downlink control channel (e.g., a downlink control channel carrying the downlink control information) in the first control resource set and the second control resource set. In an example, the determining/decoding the downlink control information may comprise receiving repetitions of a downlink control channel (e.g., a downlink control channel carrying the downlink control information) in the first control resource set and the second control resource set. The wireless device may receive the downlink control information via the first control resource set and the second control resource set. The downlink control information may be mapped to the first radio resources; and the downlink control information may be mapped to the second radio resources.

In an example, the receiving the first signal and receiving the second signal may comprise bundling the first radio resources of the first control resource set and the second radio resources of the second control resource set. The receiving the downlink control information may comprise bundling the first radio resources of the first control resource set and the second radio resources of the second control resource set. The downlink control information is mapped to a plurality of radio resources comprising the first radio resources and the second radio resources.

In an example embodiment, a wireless device may receive configuration parameters comprising: a first radio network temporary identifier (RNTI); discontinuous reception configuration parameters; and random access configuration parameters. The wireless device may transmit a random access preamble, in response to starting a random access process and based on the random access configuration parameters. The wireless device may receive a random access response based on the transmitting the random access preamble. The wireless device may determine that the wireless device is in an Active time after the receiving the random access response and until a plurality of signals associated with a downlink control information is received, wherein the downlink control information may be associated with the first RNTI. The wireless device may determine scheduling information based on receiving the plurality of signals. The wireless device may receive a transport block based on the scheduling information.

In an example, the receiving the plurality of signals may comprise receiving repetitions of a downlink control channel (e.g., a downlink control channel carrying the downlink control information) in a first control resource set and a second control resource set. In an example, the receiving the plurality of signals may comprise receiving repetitions of the downlink control information via a first control resource set and a second control resource set. The downlink control information is mapped to first radio resources associated with a first signal of the plurality of signals; and the downlink control information is mapped to second radio resources associated with a second signal of the plurality of signals. In an example, receiving the plurality of signals may comprise bundling first radio resources of a first control resource set and second radio resources of a second control resource set, wherein: a first signal, of the plurality of signals, is received via the first radio resources; and a second signal, of the plurality of signals, is received via the second radio resources. The downlink control information is mapped to a plurality of radio resources comprising: first radio resources associated with a first signal of the plurality of signals; and second radio resources associated with a second signal of the plurality of signals.

In an example embodiment, a wireless device may receive discontinuous reception configuration parameters comprising a first value of a first timer. The wireless device may receive a plurality of signals associated with a first downlink control information. The wireless device may determine, based on the plurality of signals, the first downlink control information comprising scheduling information. Based on the scheduling information indicating a new transmission (e.g., a new uplink or downlink or sidelink transmission), the wireless device may start the first timer with the first value. The wireless device may determine a second downlink control information while on the first timer running.

In an example, the wireless device may start the first timer is in a first symbol after the last signal in the plurality of signals.

In an example, first radio resources, associated with a first signal in the plurality of signals, may span/comprise one or more first symbols. Second radio resources, associated with a second signal in the plurality of signals, may span/comprise one or more second symbols. The wireless device may start the first timer is in a first symbol immediately after a last/latest symbol in the one or more second symbols.

In an example, receiving the plurality of signals may comprise receiving repetitions of a downlink control channel (e.g., a downlink control channel carrying the first downlink control information) in a first control resource set and a second control resource set. In an example, receiving the plurality of signals may comprise receiving repetitions of the first downlink control information via a first control resource set and a second control resource set. The first downlink control information may be mapped to first radio resources associated with a first signal of the plurality of signals. The first downlink control information may be mapped to second radio resources associated with a second signal of the plurality of signals.

In an example, the receiving the plurality of signals may comprise bundling first radio resources of a first control resource set and second radio resources of a second control resource set, wherein: a first signal, of the plurality of signals, is received via the first radio resources; and a second signal, of the plurality of signals, is received via second radio resources. The first downlink control information may be mapped to a plurality of radio resources comprising: first radio resources associated with a first signal of the plurality of signals; and second radio resources associated with a second signal of the plurality of signals.

In an example embodiment, a wireless device may receive configuration parameters comprising a first value of a deactivation timer of a secondary cell. The wireless device may receive a plurality of signals, associated with a downlink control information. The wireless device may determine, based on the plurality of signals, the downlink control information comprising scheduling information. Based on the scheduling information indicating an uplink grant or downlink assignment on the secondary cell or for the secondary cell, the wireless device may start the deactivation timer with the first value. The wireless device may deactivate the secondary cell based on the deactivation timer expiring.

In an example, the staring the deactivation timer may be after a first number of symbols from the last signal in the plurality of signals.

In an example, first radio resources, associated with a first signal in the plurality of signals, may span/comprise one or more first symbols. Second radio resources, associated with a second signal in the plurality of signals, may span/comprise one or more second symbols. The staring the deactivation timer may be after a first number of symbols from a last/latest symbol in the one or more second symbols.

In an example, receiving the plurality of signals may comprise receiving repetitions of a downlink control channel (e.g., a downlink control channel carrying the downlink control information) in a first control resource set and a second control resource set. In an example, receiving the plurality of signals may comprise receiving repetitions of the downlink control information via a first control resource set and a second control resource set. The downlink control information may be mapped to first radio resources associated with a first signal of the plurality of signals; and the downlink control information may be mapped to second radio resources associated with a second signal of the plurality of signals.

In an example, the receiving the plurality of signals may comprise bundling first radio resources of a first control resource set and second radio resources of a second control resource set, wherein: a first signal, of the plurality of signals, may be received via the first radio resources; and a second signal, of the plurality of signals, may be received via second radio resources. The downlink control information may be mapped to a plurality of radio resources comprising: first radio resources associated with a first signal of the plurality of signals; and second radio resources associated with a second signal of the plurality of signals.

A control channel may be used for transmission of downlink control information. The reliability of control channel transmission may be important for proper wireless device and wireless network operation. The control channel transmission may not be reliable, for example in multiple transmission reception point scenarios, for wireless devices with reduced capability or in other scenarios. There is a need to enhance control channel transmission reliability. Example embodiments enhance the configuration signaling and control channel transmission processes to enhance the reliability of control channel transmission.

In example embodiments, a wireless device may receive one or more messages comprising configuration parameters. The one or more messages may comprise one or more RRC messages. The configuration parameters (e.g., the configuration parameters included in the one or more RRC messages) may comprise configuration parameters of one or more cells. The configuration parameters of a cell may comprise configuration parameters of one or more BWPs (e.g., one or more DL BWPs or one or more UL BWPs of a cell). The configuration parameters of a BWP (e.g., a DL BWP) may comprise control channel configuration parameters for a downlink control channel (e.g., PDCCH). The control channel configuration parameters of a downlink control channel may comprise CORESET configuration parameters of one or more CORESETs associated with the downlink control channel and search space configuration parameters of one or more search spaces associated the downlink control channel. In an example, the control channel configuration parameters may comprise identifiers of one or more CORESETs and one or more search spaces associated with the downlink control channel. In an example, an IE PDCCH-Config may be used to configure UE specific PDCCH parameters such as control resource sets (CORESET), search spaces and additional parameters for acquiring the PDCCH. In an example, an IE ControlResourceSet may be used to configure a time/frequency control resource set (CORESET) in which to search for downlink control information. In an example, an IE SearchSpace may define how/where to search for PDCCH candidates. Each search space may be associated with one ControlResourceSet. The IE search space may include an identifier of the search space and an identifier of a CORESET associated with the search space.

Figure 45:
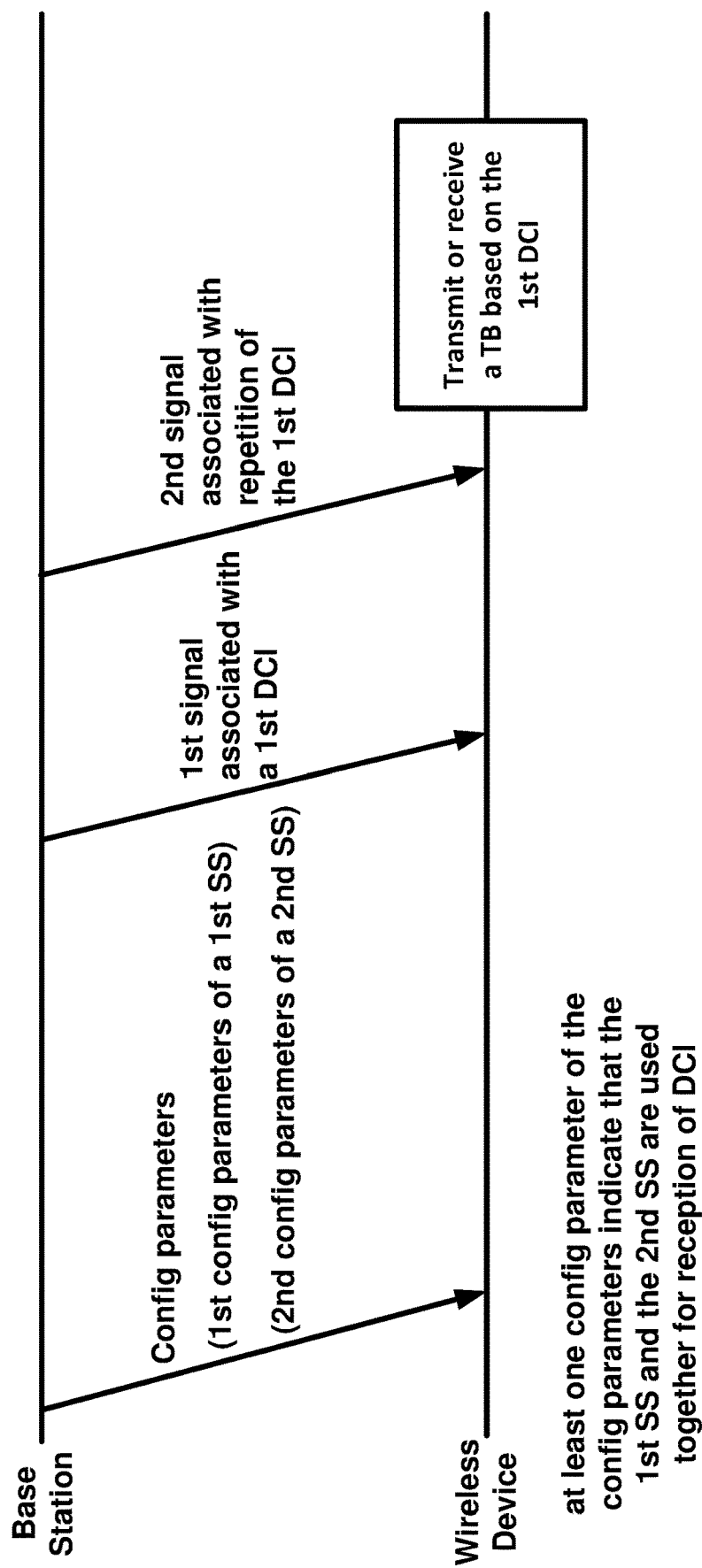
FIG. 45 shows an example process as per an aspect of an embodiment of the present disclosure.

In an example embodiment shown in FIG. 45, the configuration parameters received, by the wireless device, may include first configuration parameters of a first search space and second configuration parameters of a second search space. The configuration parameters may further include at least one configuration parameters indicating that the first search space and the second search space are used together for reception of downlink control information (DCI). The at least one configuration parameter may link the first search space and the second search space. The first search space may be used for reception of DCI and the second search space may be used for reception of a repetition of the DCI. The at least one configuration parameter may indicate that the first search space is used for reception of a DCI and the second search space is used for reception of a repetition of the DCI. In an example, the first configuration parameters of the first search space or the second configuration parameters of the second search space may include the at least one configuration parameter. In an example, a first value of a configuration parameter of the first search space and a second value of a corresponding configuration parameter of the second search space may be the same. In an example, the first value of the configuration parameter of the first search space and the second value of the corresponding configuration parameter of the second search space may be the same based on the first search space and the second search space being used together (e.g., being linked) for reception of DCI. In an example, the wireless device may expect that the first value of the configuration parameter of the first search space and the second value of the corresponding configuration parameter of the second search space to be the same.

The wireless device may receive a first signal associated with a first DCI based on the first search space. The wireless device may receive the first signal associated with the first DCI based on the first configuration parameters of the first search space. The wireless device may receive the first signal associated with the first DCI in response to monitoring the first search space based on the first configuration parameters of the first search space. First configuration parameters of the first search space may include a first monitoring periodicity and offset, a first duration, a first monitoringSymbolsWithinSlot, a first nrofcandidates, etc. The first configuration of the first search space may comprise a first searchSpaceType parameter indicating whether the type of the first search space is a common search space or a wireless device-specific search space. The first configuration parameters of the first search space may further comprise a first identifier of a first CORESET associated with the first search space. In an example, the first CORESET may be for a first cell or a first BWP of the first cell. The wireless device may receive the first signal based on resources associated with the first CORESET and indicated by the configuration parameters of the first CORESET. In an example, the first CORESET may be associated with a first TCI state. The configuration parameters of the first CORESET may indicate the first TCI state.

The wireless device may receive a second signal associated with a repetition of the first DCI based on the second search space. In an example, the wireless device may determine the second search space in response to receiving the first signal and based on the at least one configuration parameter indicating that the first search space and the second search space are used together for (e.g., are linked for) receiving DCI. The wireless device may receive the second signal associated with repetition of the first DCI based on the second configuration parameters of the second search space. The wireless device may receive the second signal associated with repetition of the first DCI in response to monitoring the second search space based on the second configuration parameters of the second search space. The second configuration parameters of the second search space may include a second monitoring periodicity and offset, a second duration, a second monitoringSymbolsWithinSlot, a second nrofcandidates, etc. The second configuration of the second search space may comprise a second searchSpaceType parameter indicating whether the type of the second search space is a common search space or a wireless device-specific search space. The second configuration parameters of the second search space may further comprise a second identifier of a second CORESET associated with the second search space. In an example, the second CORESET may be for a second cell or a second BWP of the second cell. In an example, the first cell and the second cell may be the same. In an example, the first BWP and the second BWP may be the same. In an example, the second CORESET may be associated with a second TCI state. The configuration parameters of the second CORESET may indicate the second TCI state. The wireless device may receive the second signal based on resources associated with the second CORESET and indicated by the configuration parameters of the second CORESET. In an intra-slot example, the first CORESET and the second CORESET may be in the same slot. In an inter-slot example, the first CORESET and the second CORESET may be in different slots.

In an example, the wireless device may determine the first DCI based on and in response to receiving the first signal and the second signal. The first DCI may comprise scheduling information, e.g., transmission parameters for transmission of a transport block or reception parameters for receiving a transport block. The wireless device may transmit or receive a transport block based on the scheduling information of the first DCI.

In an example, a first value of a configuration parameter of the first CORESET, associated with the first search space, and a second value of a corresponding configuration parameter of the second CORESET, associated with the second search space, may be the same. In an example, the first value of the configuration parameter of the first CORESET and the second value of the corresponding configuration parameter of the second CORESET may be the same based on the first search space and the search space being used together (e.g., being linked) for reception of DCI. In an example, the wireless device may expect that the first value of the configuration parameter of the first CORESET and the second value of the corresponding configuration parameter of the second CORESET to be the same.

Figure 46:
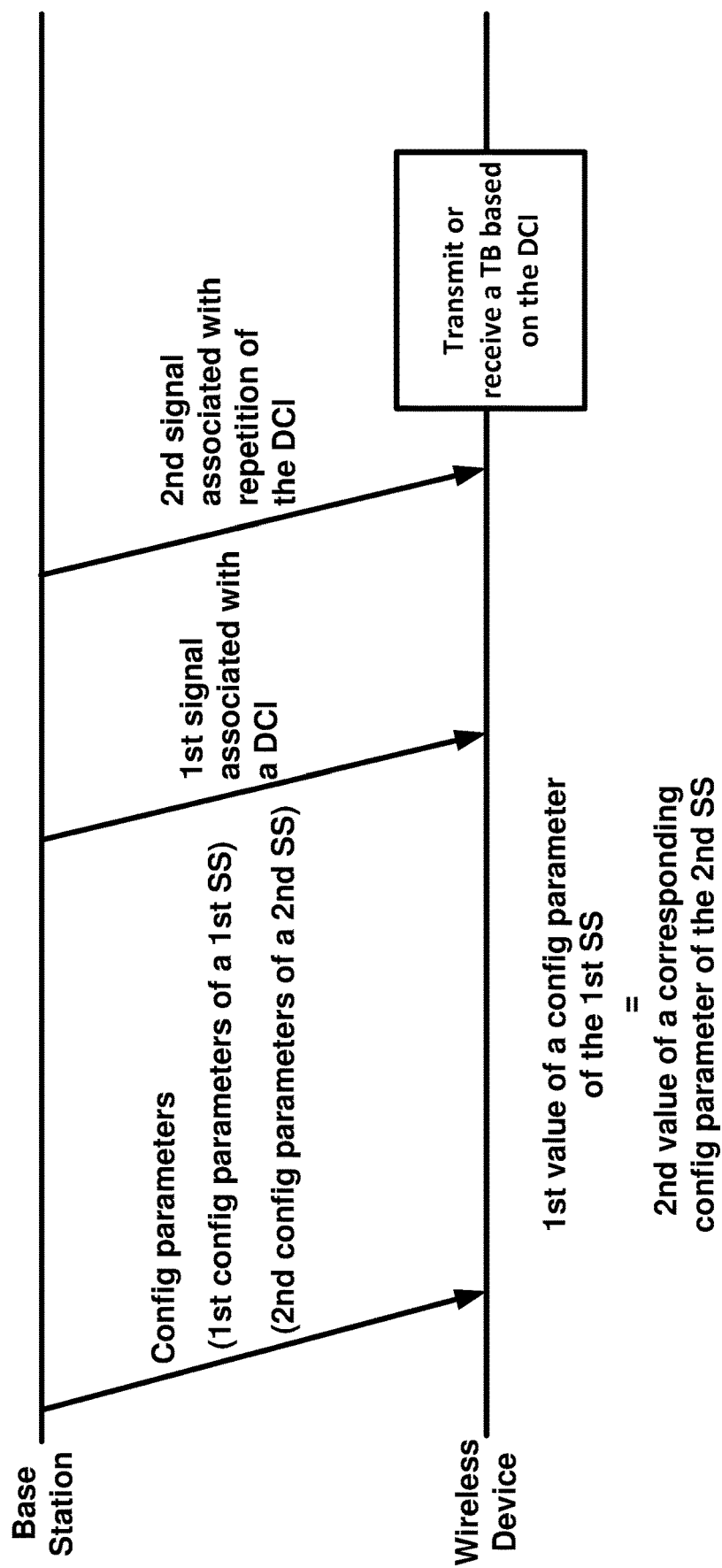
FIG. 46 shows an example process as per an aspect of an embodiment of the present disclosure.
Figure 47:
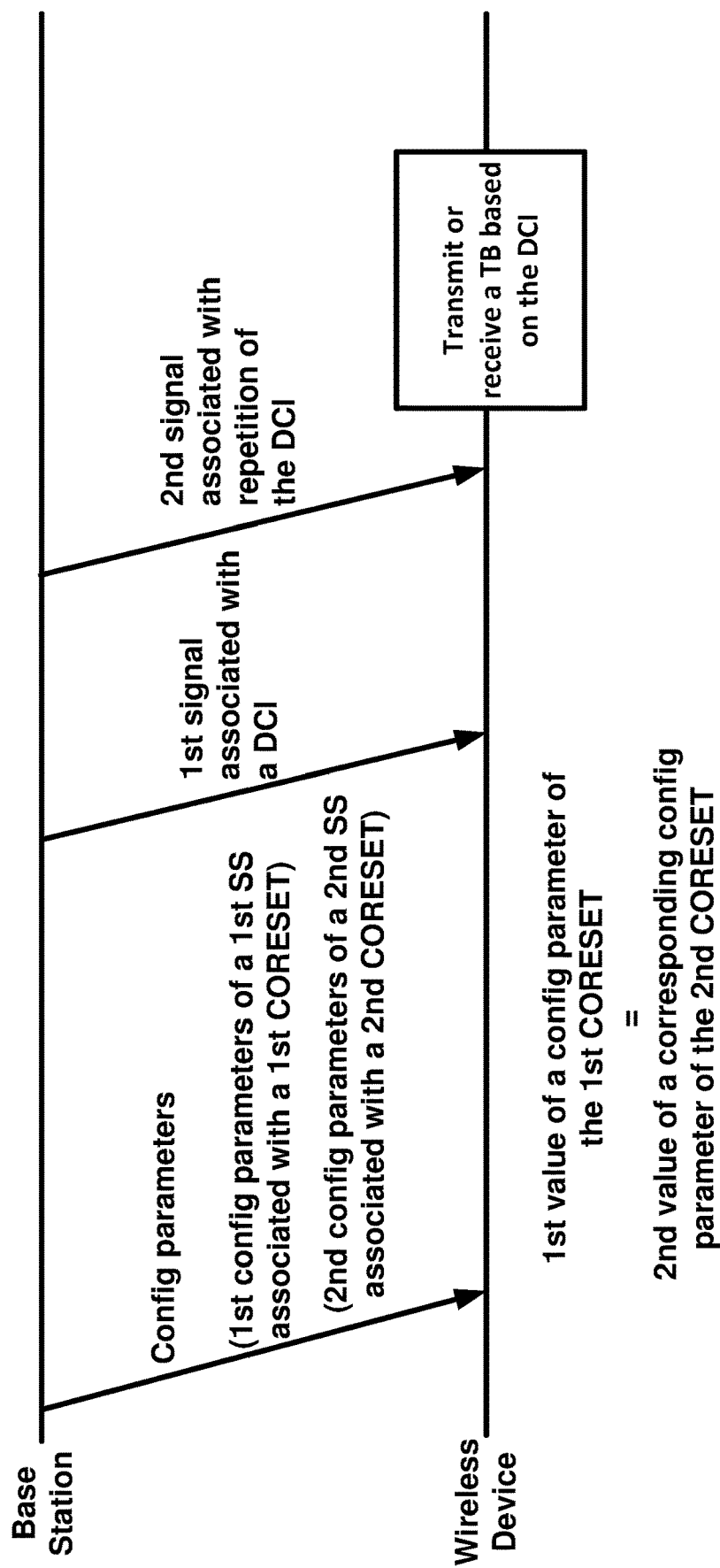
FIG. 47 shows an example process as per an aspect of an embodiment of the present disclosure.

In example embodiment shown in FIG. 46 and FIG. 47, the configuration parameters received, by the wireless device, may include first configuration parameters of a first search space and second configuration parameters of a second search space. The configuration parameters may further include at least one configuration parameters indicating that the first search space and the second search space are used together for reception of downlink control information (DCI). The at least one configuration parameter may link the first search space and the second search space. The first search space may be used for reception of DCI and the second search space may be used for reception of a repetition of the DCI. The at least one configuration parameter may indicate that the first search space is used for reception of a DCI and the second search space is used for reception of a repetition of the DCI. In an example, the first configuration parameters of the first search space or the second configuration parameters of the second search space may include the at least one configuration parameter.

The wireless device may receive a first signal associated with a DCI based on the first search space. The wireless device may receive the first signal associated with the DCI based on the first configuration parameters of the first search space. The wireless device may receive the first signal associated with the DCI in response to monitoring the first search space based on the first configuration parameters of the first search space. First configuration parameters of the first search space may include a first monitoring periodicity and offset, a first duration, a first monitoringSymbolsWithinSlot, a first nrofcandidates, etc. The first configuration of the first search space may comprise a first searchSpaceType parameter indicating whether the type of the first search space is a common search space or a wireless device-specific search space. The first configuration parameters of the first search space may further comprise a first identifier of a first CORESET associated with the first search space. In an example, the first CORESET may be for a first cell or a first BWP of the first cell. The wireless device may receive the first signal based on resources associated with the first CORESET and indicated by the configuration parameters of the first CORESET. In an example, the first CORESET may be associated with a first TCI state. The configuration parameters of the first CORESET may indicate the first TCI state.

The wireless device may receive a second signal associated with a repetition of the first DCI based on the second search space. In an example, the wireless device may determine the second search space in response to receiving the first signal and based on the at least one configuration parameter indicating that the first search space and the second search space are used together for (e.g., are linked for) receiving DCI. The wireless device may receive the second signal associated with repetition of the first DCI based on the second configuration parameters of the second search space. The wireless device may receive the second signal associated with repetition of the first DCI in response to monitoring the second search space based on the second configuration parameters of the second search space. The second configuration parameters of the second search space may include a second monitoring periodicity and offset, a second duration, a second monitoringSymbolsWithinSlot, a second nrofcandidates, etc. The second configuration of the second search space may comprise a second searchSpaceType parameter indicating whether the type of the second search space is a common search space or a wireless device-specific search space. The second configuration parameters of the second search space may further comprise a second identifier of a second CORESET associated with the second search space. In an example, the second CORESET may be for a second cell or a second BWP of the second cell. In an example, the wireless device may determine the first DCI based on and in response to receiving the first signal and the second signal. The first DCI may comprise scheduling information, e.g., transmission parameters for transmission of a transport block or reception parameters for receiving a transport block. The wireless device may transmit or receive a transport block based on the scheduling information of the first DCI.

In an example, a first value of a configuration parameter of the first search space and a second value of a corresponding configuration parameter of the second search space may be the same. In an example, the first value of the configuration parameter of the first search space and the second value of the corresponding configuration parameter of the second search space may be the same based on the first search space and the second search space being used together (e.g., being linked) for reception of DCI. In an example, the wireless device may expect that the first value of the configuration parameter of the first search space and the second value of the corresponding configuration parameter of the second search space to be the same. In an example, receiving the first signal based on the first configuration parameters of the first search space and receiving the second signal based on the second configuration parameters of the second search space are based on the first value of the configuration parameter of the first search space and the second value of the corresponding configuration parameter of the second search space being the same. In an example, a first value of a configuration parameter of the first CORESET, associated with the first search space, and a second value of a corresponding configuration parameter of the second CORESET, associated with the second search space, may be the same. In an example, the first value of the configuration parameter of the first CORESET and the second value of the corresponding configuration parameter of the second CORESET may be the same based on the first search space and the search space being used together (e.g., being linked) for reception of DCI. In an example, the wireless device may expect that the first value of the configuration parameter of the first CORESET and the second value of the corresponding configuration parameter of the second CORESET to be the same. In an example, receiving the first signal based on the first configuration parameters of the first search space and receiving the second signal based on the second configuration parameters of the second search space are based on the first value of the configuration parameter of the first CORESET and the second value of the corresponding configuration parameter of the second CORESET being the same.

Figure 48:
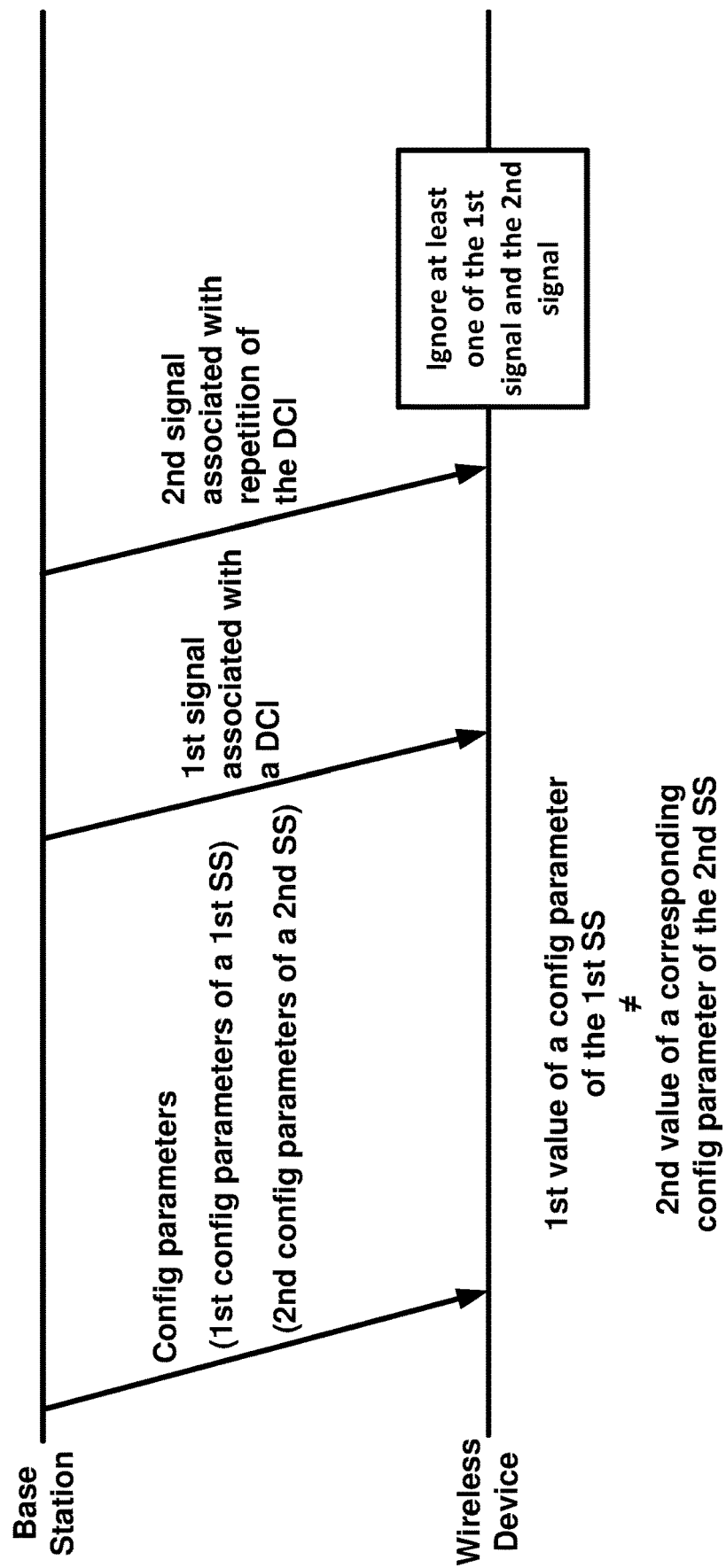
FIG. 48 shows an example process as per an aspect of an embodiment of the present disclosure.

In an example embodiment shown in FIG. 48, a first value of a configuration parameter of the first search space and a second value of a corresponding configuration parameter of the second search space may be different. In an example, the wireless device may expect that the first value of the configuration parameter of the first search space and the second value of the corresponding configuration parameter of the second search space to be the same. In an example, based on the first value of the configuration parameter of the first search space and the second value of the corresponding configuration parameter of the second search space being different, the wireless device may ignore at least one of the first signal and the second signal.

Figure 49:
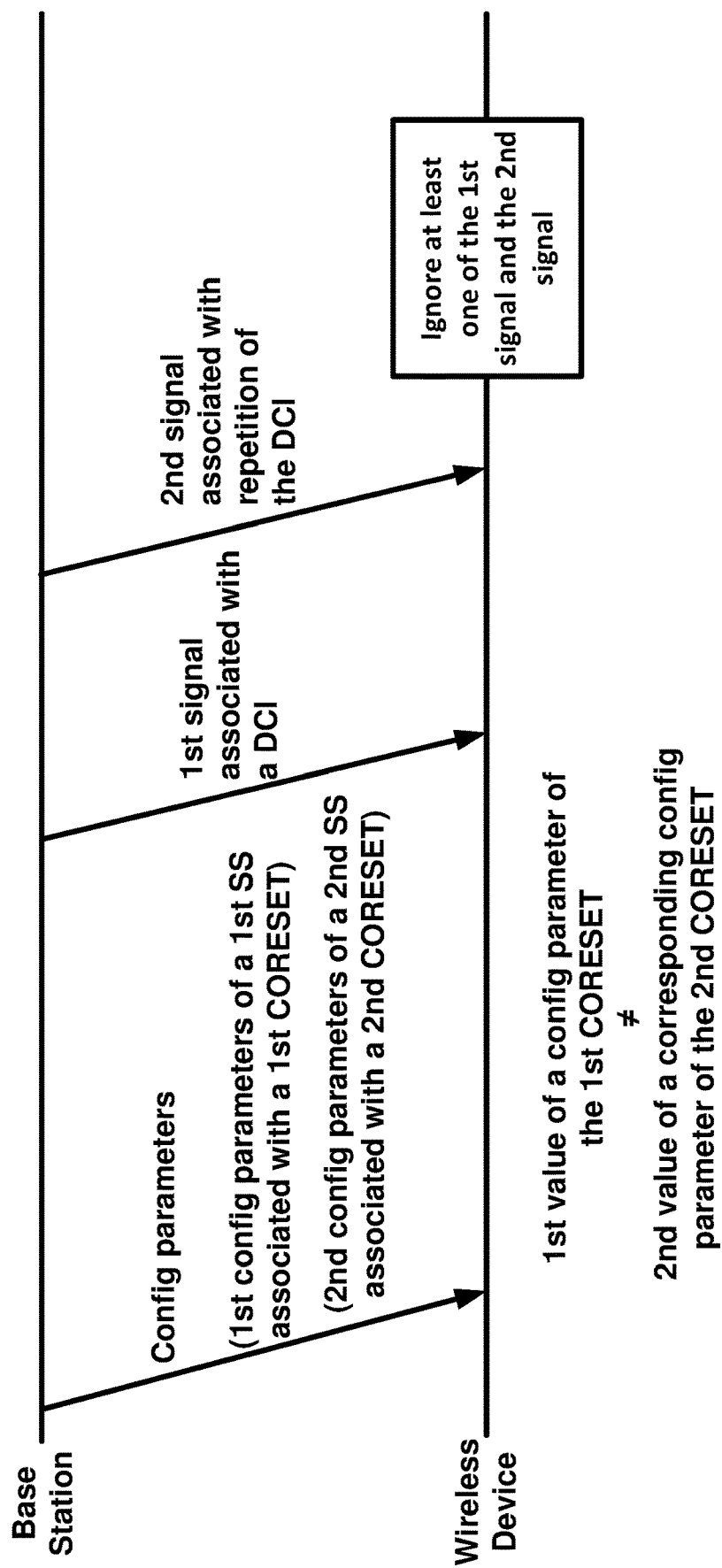
FIG. 49 shows an example process as per an aspect of an embodiment of the present disclosure.

In an example embodiment shown in FIG. 49, a first value of a configuration parameter of the first CORESET, associated with the first search space, and a second value of a corresponding configuration parameter of the second CORESET, associated with the second search space, may be different. In an example, the wireless device may expect that the first value of the configuration parameter of the first CORESET and the second value of the corresponding configuration parameter of the second CORESET to be the same based on the first search space and the search space being used together (e.g., being linked) for reception of DCI. In an example, based on the first value of the configuration parameter of the first CORESET and the second value of the corresponding configuration parameter of the second CORESET being different, the wireless device may ignore at least one of the first signal and the second signal.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 50:
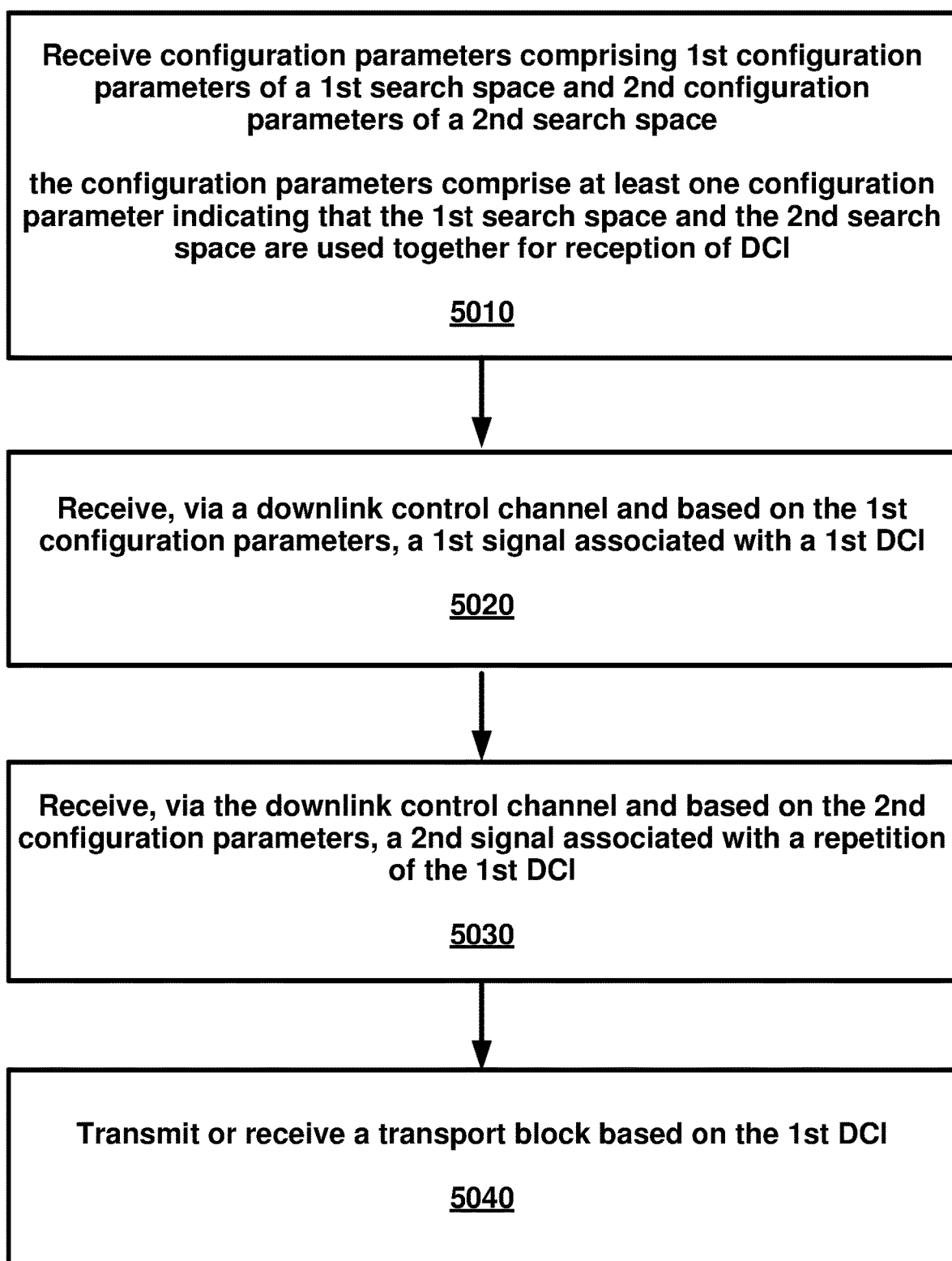
FIG. 50 shows an example flow diagram in accordance with several of various embodiments of the present disclosure.

FIG. 50 shows an example flow diagram in accordance with several of various embodiments of the present disclosure. At 5010, a wireless device may receive configuration parameters comprising first configuration parameters of a first search space and second configuration parameters of a second search space. The configuration parameters may comprise at least one configuration parameter indicating that the first search space and the second search space are used together for reception of downlink control information (DCI). AT 5020, the wireless device may receive, via a downlink control channel and based on the first configuration parameters of the first search space, a first signal associated with a first DCI. At 5030, the wireless device may receive, via the downlink control channel and based on the second configuration parameters of the second search space, a second signal associated with a repetition of the first DCI. At 5040, the wireless device may transmit or may receive a transport block based on the first DCI.

In an example embodiment, the wireless device may determine the first DCI based on the first signal, received at 5020, and the second signal received at 5030.

In an example embodiment, the first DCI may comprise scheduling information. The transmitting or the receiving the transport block, at 5040, may be based on the scheduling information.

In an example embodiment, the first search space may be associated with a first control resource set (CORESET). The second search space may be associated with a second CORESET. In an example embodiment, a first value of a configuration parameter of the first CORESET may be the same as a second value of a corresponding configuration parameter of the second CORESET.

In an example embodiment, the receiving the first signal, at 5020, may be based on first resources associated with the first CORESET. The receiving the second signal, at 5030, may be based on second resources associated with the second CORESET. In an example embodiment, the configuration parameters, received at 5010, may comprise first CORESET configuration parameters, of the first CORESET, indicating the first resources, and second CORESET configuration parameters, of the second CORESET, indicating the second resources. In an example embodiment, the first CORESET may be for a first cell and the second CORESET may be for a second cell. In an example embodiment, the first CORESET may be for a first bandwidth part (BWP) and the second CORESET may be for a second BWP. In an example embodiment, the first CORESET and the second CORESET may be in the same slot. In an example embodiment, the first CORESET and the second CORESET may be in different slots. In an example embodiment, the first configuration parameters of the first search space, received at 5010, may comprise a first parameter indicating a first identifier of the first CORESET. The second configuration parameters of the second search space, received at 5010, may comprise a second parameter indicating a second identifier of the second CORESET. In an example embodiment, the first CORESET may be associated with a first transmission configuration indicator (TCI) state. The second CORESET may be associated with a second TCI state.

In an example embodiment, the first configuration parameters of the first search space, received at 5010, may comprise the at least one configuration parameter.

In an example embodiment, the first search space and the second search space may be wireless device specific search spaces. In an example embodiment, the first search space may be associated with a first control resource set (CORESET). The second search space may be associated with a second CORESET. In an example embodiment, the first CORESET and the second CORESET may be in the same slot. In an example embodiment, the first CORESET and the second CORESET may be in different slots.

In an example embodiment, the first search space and the second search space may be common search spaces. In an example embodiment, the first search space may be associated with a first control resource set (CORESET). The second search space may be associated with a second CORESET. In an example embodiment, the first CORESET and the second CORESET may be in the same slot. In an example embodiment, the first CORESET and the second CORESET may be in different slots.

In an example embodiment, a parameter in the first configuration parameters of the first search space, received at 5010, may have the same value as a corresponding parameter in the second configuration parameters of the second search space received at 5010. In an example embodiment, the first search space may be associated with a first control resource set (CORESET). The second search space may be associated with a second CORESET. In an example embodiment, the first CORESET and the second CORESET may be in the same slot. In an example embodiment, the first CORESET and the second CORESET may be in different slots.

In an example embodiment, the wireless device may determine the second search space for receiving the second signal in response to receiving the first signal and based on the at least one configuration parameter indicating that the first search space and the second search space are used together for reception of downlink control information (DCI). In an example embodiment, the wireless device may determine to monitor the second search space for receiving the second signal in response to receiving the first signal and based on the at least one configuration parameter indicating that the first search space and the second search space are used together for reception of downlink control information (DCI).

In an example embodiment, a first value of a configuration parameter of the first search space, received at 5010, may be the same as a second value of a corresponding configuration parameter of the second search space received at 5010.

Figure 51:
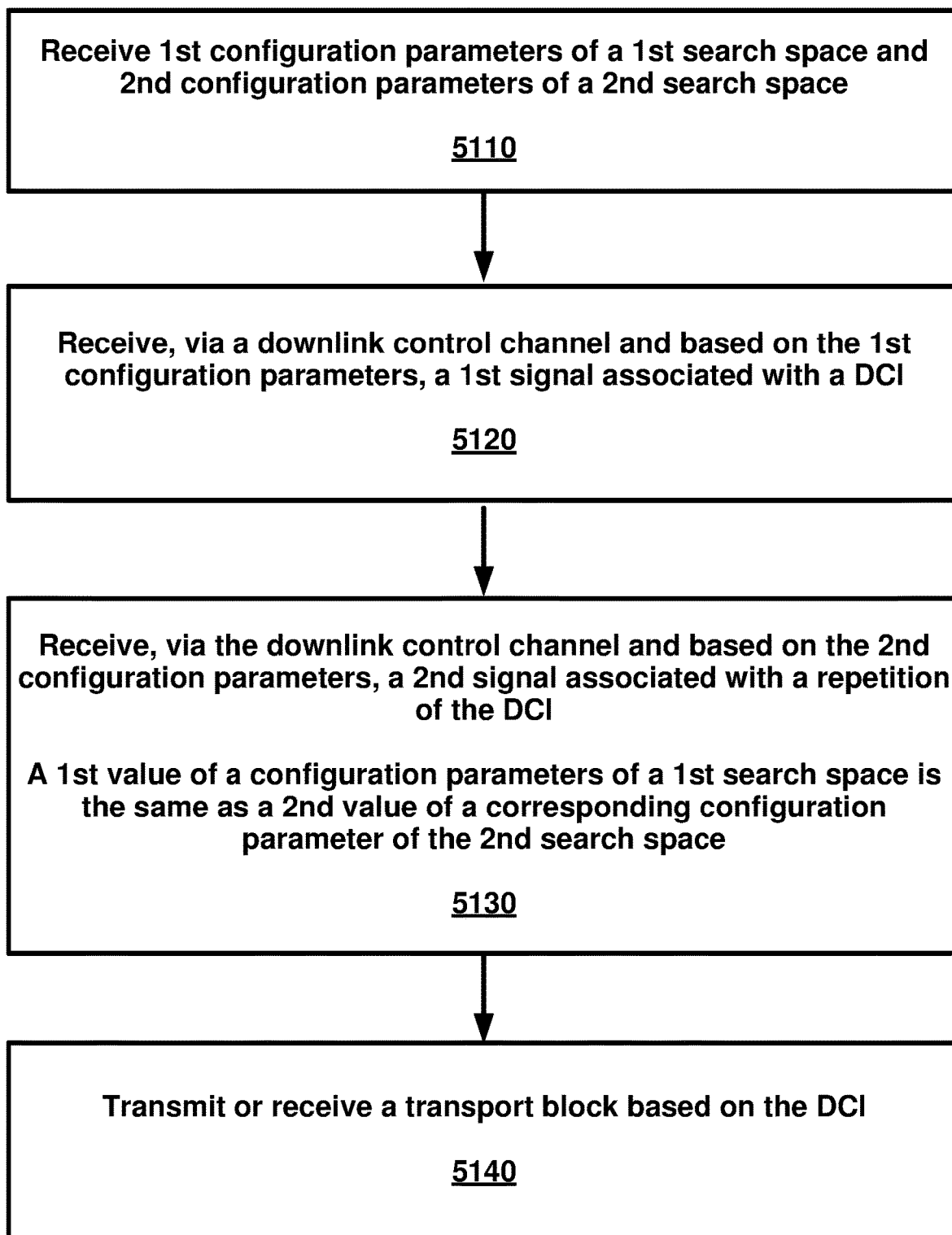
FIG. 51 shows an example flow diagram in accordance with several of various embodiments of the present disclosure.

FIG. 51 shows an example flow diagram in accordance with several of various embodiments of the present disclosure. At 5110, a wireless device may receive first configuration parameters of a first search space and second configuration parameters of a second search space. At 5120, the wireless device may receive via a downlink control channel and based on the first configuration parameters of the first search space, a first signal associated with a downlink control information (DCI). At 5130, the wireless device may receive, via the downlink control channel and based on the second configuration parameters of the second search space, a second signal associated with a repetition of the DCI. A first value of a configuration parameter of the first search space is the same as a second value of a corresponding configuration parameter of the second search space. The wireless device may transmit or may receive a transport block based on the DCI.

In an example embodiment, the wireless device may determine the DCI based on the first signal, received 5120, and the second signal received at 5130.

In an example embodiment, the DCI may comprise scheduling information. The transmitting or the receiving the transport block, at 5140, may be based on the scheduling information.

In an example embodiment, the first search space may be associated with a first control resource set (CORESET). The second search space may be associated with a second CORESET. In an example embodiment, the receiving the first signal may be based on first resources associated with the first CORESET. The receiving the second signal may be based on second radio resources associated with the second CORESET. In an example embodiment, the wireless device may receive: first CORESET configuration parameters, of the first CORESET, indicating the first resources, and second CORESET configuration parameters, of the second CORESET, indicating the second resources. In an example embodiment, the first CORESET may be for a first cell and the second CORESET may be for a second cell. In an example embodiment, the first CORESET may be for a first bandwidth part (BWP) and the second CORESET may be for a second BWP. In an example embodiment, the first CORESET and the second CORESET may be in the same slot. In an example embodiment, the first CORESET and the second CORESET may be in different slots.

In an example embodiment, the wireless device may receive at least one configuration parameter indicating that the first search space and the second search space are used together for reception of downlink control information (DCI).

In an example embodiment, the first value of the configuration parameter of the first search space may indicate a first identifier. The second value of the corresponding configuration parameter of the second search space may indicate a second identifier.

Figure 52:
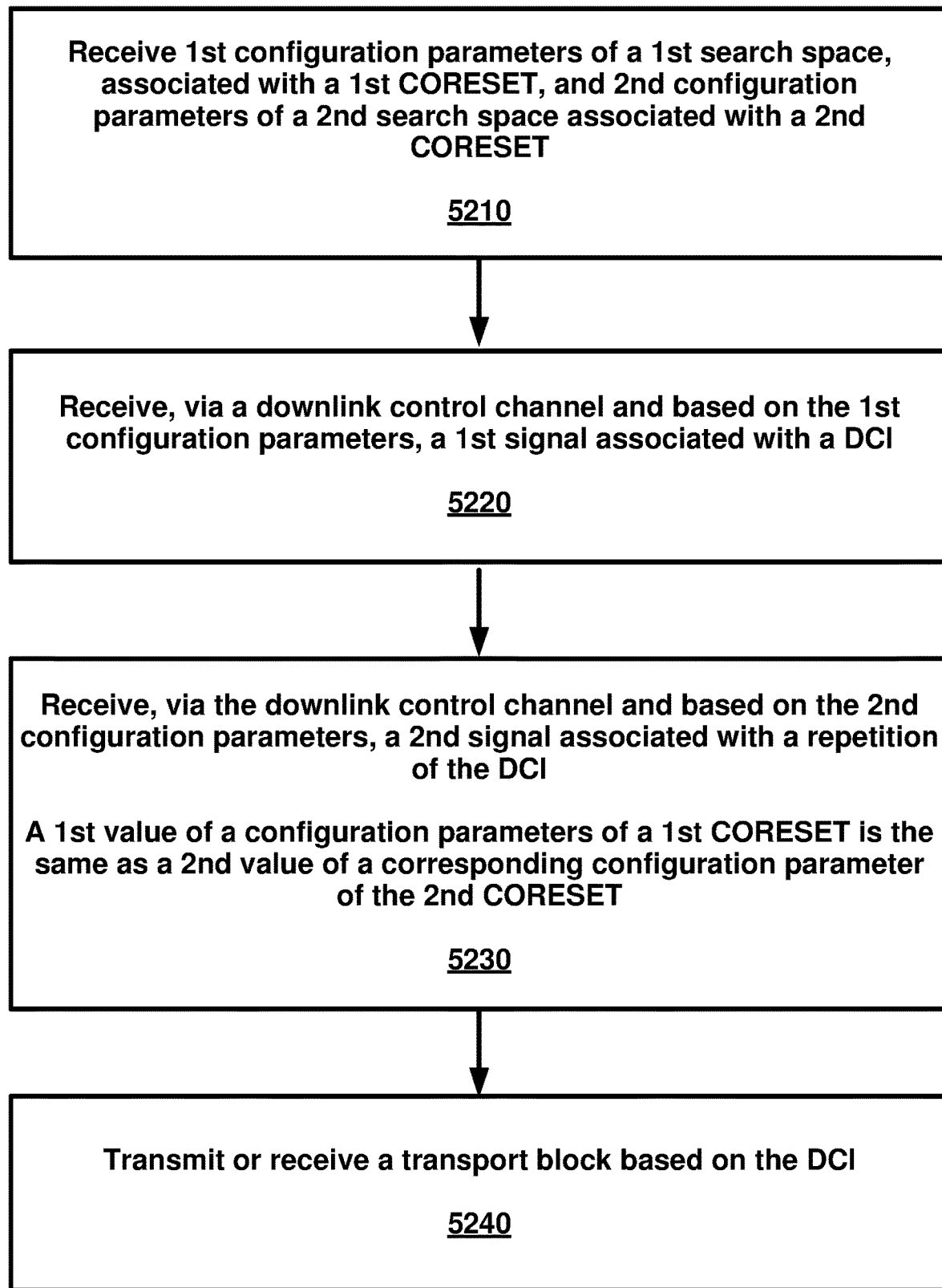
FIG. 52 shows an example flow diagram in accordance with several of various embodiments of the present disclosure.

FIG. 52 shows an example flow diagram in accordance with several of various embodiments of the present disclosure. At 5210, a wireless device may receive: first configuration parameters of a first search space associated with a first control resource set (CORESET), and second configuration parameters of a second search space associated with a second CORESET. At 5220, the wireless device may receive, via a downlink control channel and based on the first configuration parameters of the first search space, a first signal associated with a downlink control information (DCI). At 5230, the wireless device may receive, via the downlink control channel and based on the second configuration parameters of the second search space, a second signal associated with a repetition of the DCI. A first value of a configuration parameter of the first CORESET may be the same as a second value of a corresponding configuration parameter of the second CORESET. At 5240, the wireless device may transmit or may receive a transport block based on the DCI.

In an example embodiment, the receiving the first signal, at 5220, based on the first configuration parameters of the first search space and the receiving the second signal, at 5230, based on the second configuration parameters of the second search space may be based on the first value of the configuration parameter of the first CORESET being the same as the second value of the corresponding configuration parameter of the second CORESET.

In an example embodiment, the wireless device may determine the DCI based on the first signal, received at 5220, and the second signal received at 5230.

In an example embodiment, the DCI may comprise scheduling information. The transmitting or the receiving the transport block, at 5240, may be based on the scheduling information.

In an example embodiment, the receiving the first signal, at 5220, may be based on first resources associated with the first CORESET. The receiving the second signal, at 5230, may be based on second radio resources associated with the second CORESET. In an example embodiment, the wireless device may receive: first CORESET configuration parameters, of the first CORESET, indicating the first resources, and second CORESET configuration parameters, of the second CORESET, indicating the second resources. In an example embodiment, the first CORESET may be for a first cell and the second CORESET may be for a second cell. In an example embodiment, the first CORESET may be for a first bandwidth part (BWP) and the second CORESET may be for a second BWP. In an example embodiment, the first CORESET and the second CORESET may be in the same slot. In an example embodiment, the first CORESET and the second CORESET may be in different slots.

In an example embodiment, the wireless device may receive at least one configuration parameter indicating that the first search space and the second search space are used together for reception of DCI.

In an example embodiment, the first value of the configuration parameter of the first CORESET may indicate a first identifier. The second value of the corresponding configuration parameter of the second CORESET may indicate a second identifier. In an example embodiment, the first identifier may be associated with a first CORESET pool. The second identifier may be associated with a second CORESET pool. In an example embodiment, the first identifier may be associated with a first transmission configuration indicator (TCI) state. The second identifier may be associated with a second TCI state.

Figure 53:
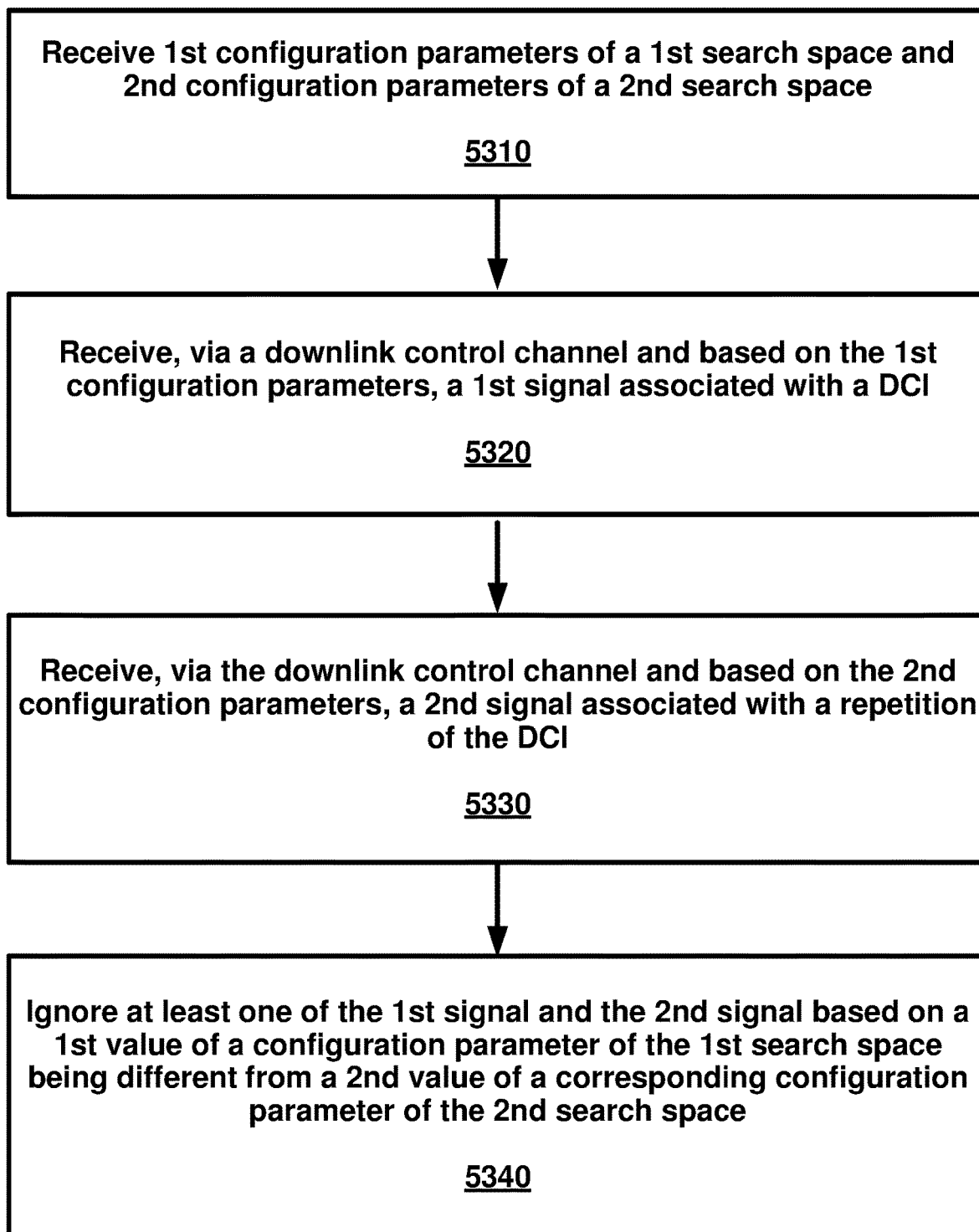
FIG. 53 shows an example flow diagram in accordance with several of various embodiments of the present disclosure.

FIG. 53 shows an example flow diagram in accordance with several of various embodiments of the present disclosure. At 5310, a wireless device may receive first configuration parameters of a first search space and second configuration parameters of a second search space. At 5320, the wireless device may receive, via a downlink control channel and based on the first configuration parameters of the first search space, a first signal associated with a downlink control information (DCI). At 5330, the wireless device may receive, via the downlink control channel and based on the second configuration parameters of the second search space, a second signal associated with a repetition of the DCI. At 5340, the wireless device may ignore at least one of the first signal and the second signal based on a first value of a configuration parameter of the first search space being different from a second value of a corresponding configuration parameter of the second search space.

In an example embodiment, the wireless device may determine the DCI based on the first signal, received at 5320, and not based on the second signal received at 5330.

In an example embodiment, the first search space may be associated with a first control resource set (CORESET). The second search space may be associated with a second CORESET. In an example embodiment, the receiving the first signal, at 5320, may be based on first resources associated with the first CORESET; and the receiving the second signal may be based on second radio resources associated with the second CORESET. In an example embodiment, the wireless device may receive: first CORESET configuration parameters, of the first CORESET, indicating the first resources; and second CORESET configuration parameters, of the second CORESET, indicating the second resources. In an example embodiment, the first CORESET may be for a first cell and the second CORESET may be for a second cell. In an example embodiment, the first CORESET may be for a first bandwidth part (BWP) and the second CORESET is for a second BWP. In an example embodiment, the first CORESET and the second CORESET are in the same slot. In an example embodiment, the first CORESET and the second CORESET may be in different slots.

In an example embodiment, the first value of the configuration parameter of the first search space may indicate a first identifier. The second value of the corresponding configuration parameter of the second search space may indicate a second identifier.

Figure 54:
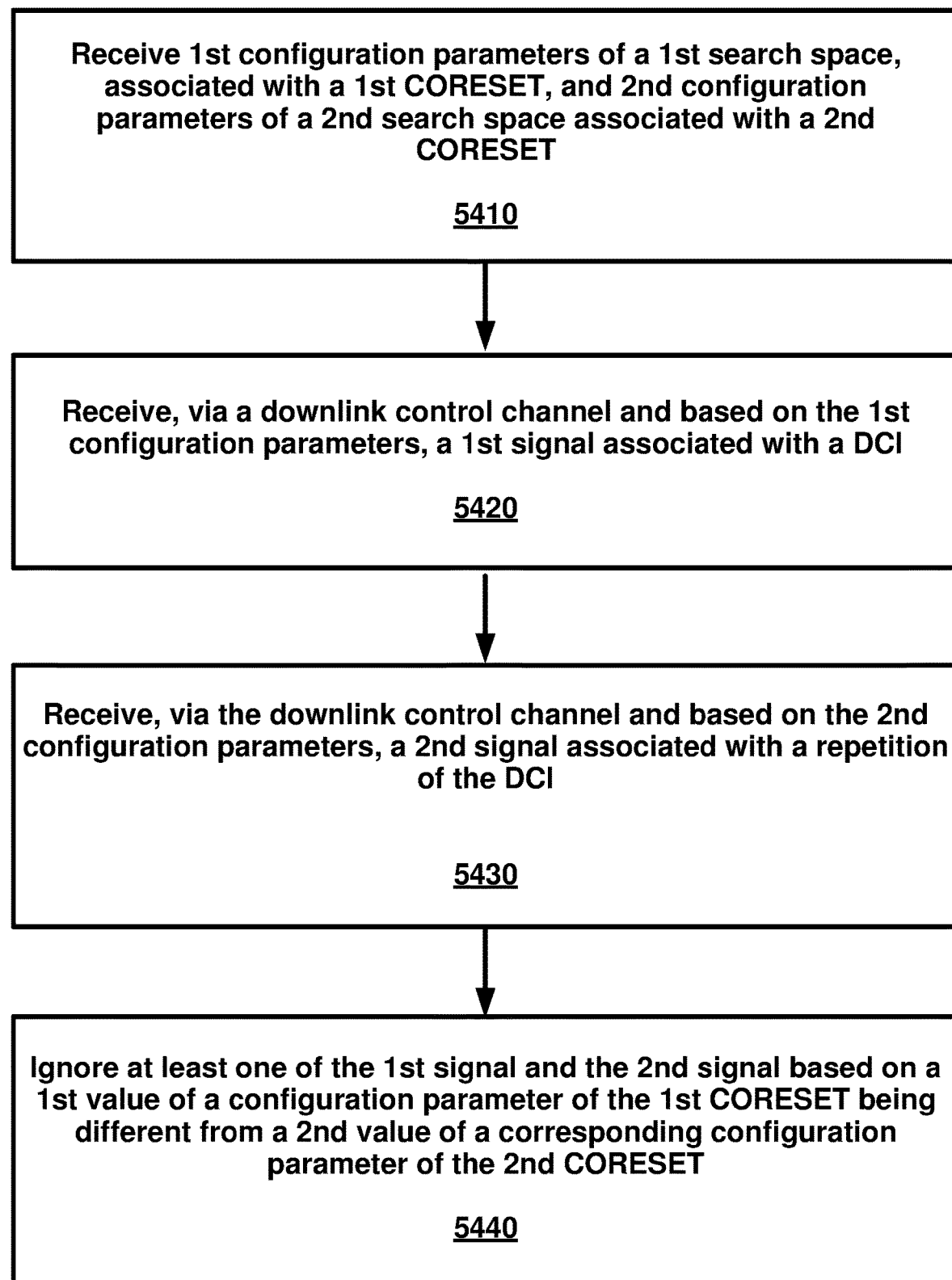
FIG. 54 shows an example flow diagram in accordance with several of various embodiments of the present disclosure.

FIG. 54 shows an example flow diagram in accordance with several of various embodiments of the present disclosure. At 5410, a wireless device may receive first configuration parameters of a first search space, associated with a first control resource set (CORESET) and second configuration parameters of a second search space associated with a second CORESET. At 5420, the wireless device may receive, via a downlink control channel and based on the first configuration parameters of the first search space, a first signal associated with a downlink control information (DCI). At 5430, the wireless device may receive, via the downlink control channel and based on the second configuration parameters of the second search space, a second signal associated with a repetition of the DCI. At 5440, the wireless device may ignore at least one of the first signal and the second signal based on a first value of a configuration parameter of the first CORESET being different from a second value of a corresponding configuration parameter of the second CORESET.

In an example embodiment, the wireless device may determine the DCI based on the first signal, received at 5420, and not based on the second signal received at 5430.

In an example embodiment, the receiving the first signal, at 5420, may be based on first resources associated with the first CORESET. The receiving the second signal may be based on second radio resources associated with the second CORESET. In an example embodiment, the wireless device may receive first CORESET configuration parameters, of the first CORESET, indicating the first resources. The wireless device may receive second CORESET configuration parameters, of the second CORESET, indicating the second resources. In an example embodiment, the first CORESET may be for a first cell and the second CORESET may be for a second cell. In an example embodiment, the first CORESET may be for a first bandwidth part (BWP) and the second CORESET may be for a second BWP.

In an example embodiment, the first CORESET and the second CORESET may be in the same slot.

In an example embodiment, the first CORESET and the second CORESET may be in different slots.

In an example embodiment, the first value of the configuration parameter of the first CORESET may indicate a first identifier. The second value of the corresponding configuration parameter of the second CORESET may indicate a second identifier. In an example embodiment, the first identifier may be associated with a first CORESET pool. The second identifier may be associated with a second CORESET pool. In an example embodiment, the first identifier may be associated with a first transmission configuration indicator (TCI) state. The second identifier may be associated with a second TCI state.

FIG. 55 shows an example flow diagram in accordance with several of various embodiments of the present disclosure. At 5510, a wireless device may transmit, to a base station, a capability message comprising an information element indicating a minimum number of symbols to apply a spatial quasi-colocation (QCL) information. At 5520, the wireless device may receive configuration parameters, of a first control resource set (CORESET) and a second CORESET, indicating one or more first symbols for the first CORESET and one or more second symbols for the second CORESET. At 5530, the wireless device may receive, based on the first CORESET and during the one or more first symbols, a first signal associated with a downlink control information (DCI). At 5540, the wireless device may receive, based on the second CORESET and during the one or more second symbols, a second signal associated with a repetition of the DCI. At 5550, the wireless device may determine the DCI based on the first signal and the second signal. At 5560, the wireless device may receive a transport block based on the DCI. A duration between a last symbol of the one or more second symbols and the transport block may be larger than the minimum number of symbols.

In an example embodiment, the minimum number of symbols, indicated by a value of the information element, may be required by the wireless device to perform a downlink control channel reception and to apply the spatial QCL information received in a downlink control information for processing a downlink data channel.

In an example embodiment, at least one symbol of the one or more second symbols may be after the one or more first symbols.

In an example embodiment, the one or more first symbols may be in a first slot and the one or more second symbols are in a second slot.

In an example embodiment, the DCI, determined at 5550, may indicate a transmission configuration indicator (TCI) state indicating a spatial QCL.

In an example embodiment, the receiving the transport block, at 5560, may be based on the duration between the last symbol of the one or more second symbols and the transport block being larger than the minimum number of symbols.

FIG. 56 shows an example flow diagram in accordance with several of various embodiments of the present disclosure. At 5610, a wireless device may receive configuration parameters comprising: first configuration parameters of a first control resource set (CORESET) and a second CORESET, indicating one or more first symbols for the first CORESET and one or more second symbols for the second CORESET; and a second configuration parameter indicating a value of a discontinuous reception (DRX) timer. At 5620, the wireless device may receive, based on the first CORESET and during the one or more first symbols, a first signal associated with a first downlink control information (DCI). At 5630, the wireless device may receive, based on the second CORESET and during the one or more second symbols, a second signal associated with a repetition of the first DCI. At 5640, the wireless device may determine the first DCI based on the first signal and the second signal. At 5650, the wireless device may start the DRX timer after a last symbol of the one or more second symbols.

In an example embodiment, the wireless device may receive a second DCI while the DRX timer is running.

In an example embodiment, the DRX timer may be an inactivity timer.

In an example embodiment, at least one symbol of the one or more second symbols may be after the one or more first symbols.

In an example embodiment, the one or more first symbols may be in a first slot and the one or more second symbols may be in a second slot.

Figure 57:
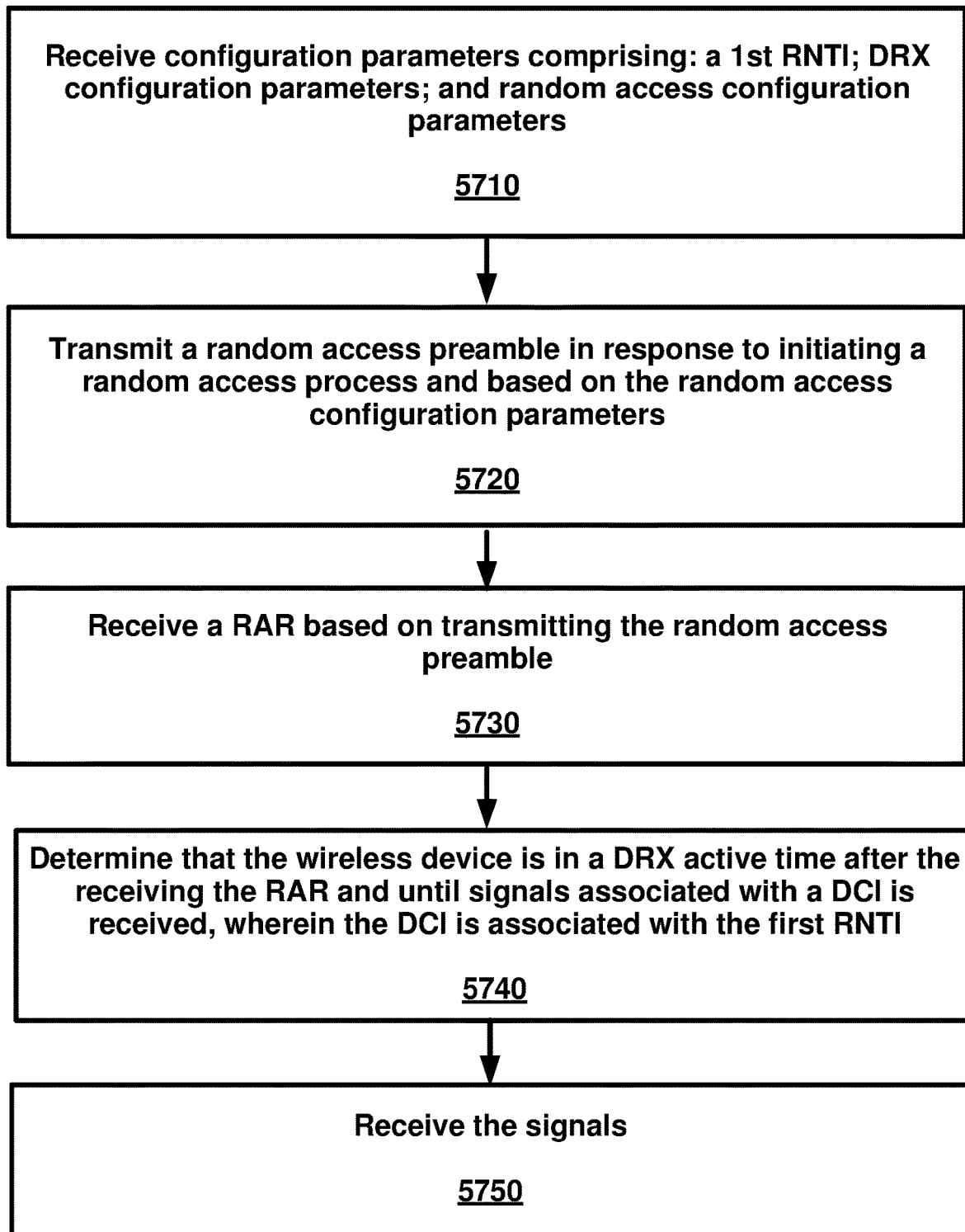
FIG. 57 shows an example flow diagram in accordance with several of various embodiments of the present disclosure.

FIG. 57 shows an example flow diagram in accordance with several of various embodiments of the present disclosure. At 5710, a wireless device may receive configuration parameters comprising: a first radio network temporary identifier (RNTI); discontinuous reception (DRX) configuration parameters; and random access configuration parameters. At 5720, the wireless device may transmit a random access preamble in response to initiating a random access process and based on the random access configuration parameters. At 5730, the wireless device may receive a random access response (RAR) based on the transmitting the random access preamble. At 5740, the wireless device may determine that the wireless device is in a DRX active time after the receiving the RAR and until a plurality of signals associated with a downlink control information (DCI) are received, wherein the DCI may be associated with the first RNTI. At 5750, the wireless device may receive the plurality of signals.

Figure 58:
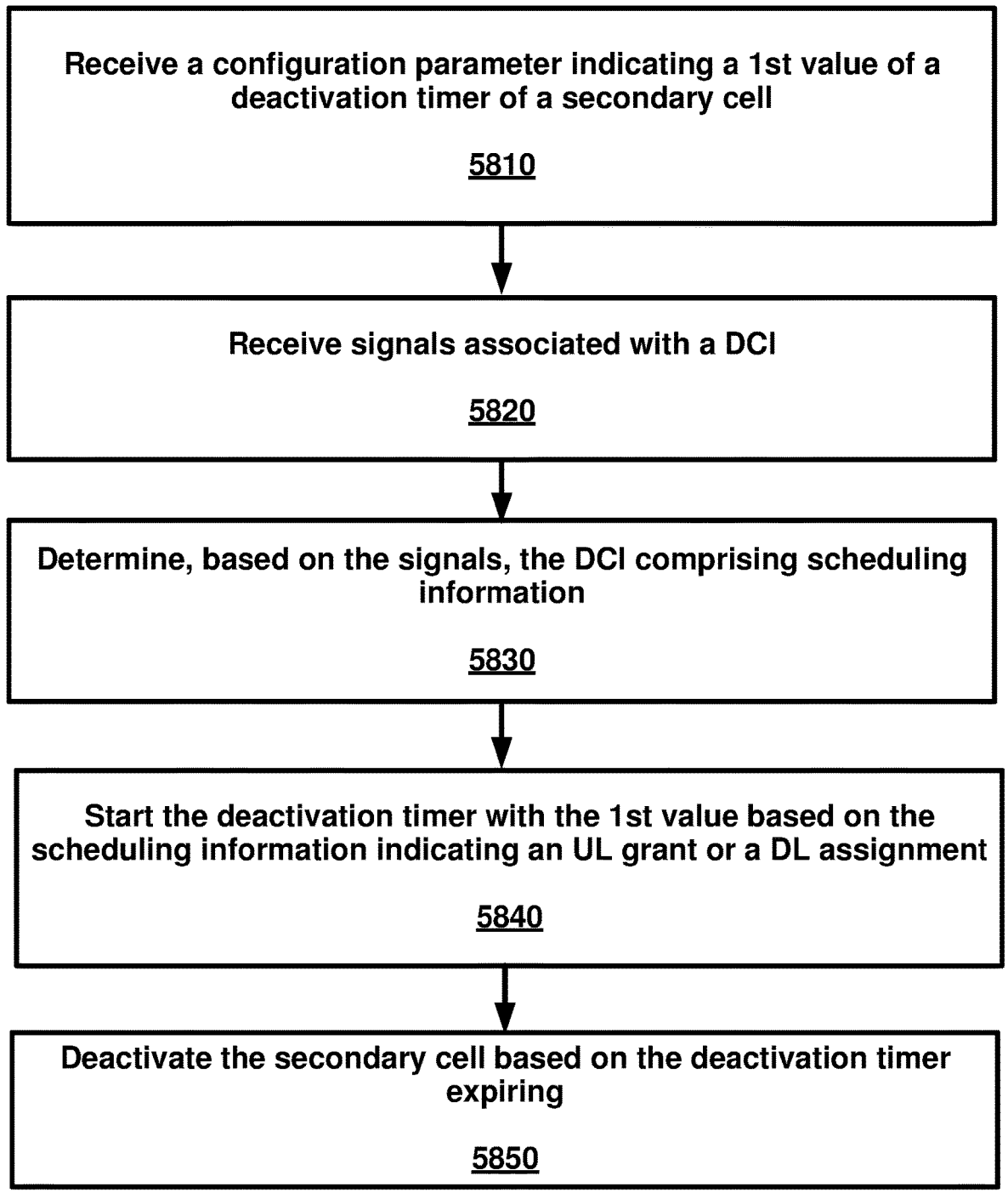
FIG. 58 shows an example flow diagram in accordance with several of various embodiments of the present disclosure.

FIG. 58 shows an example flow diagram in accordance with several of various embodiments of the present disclosure. At 5810, a wireless device may receive a configuration parameter indicating a first value of a deactivation timer of a secondary cell. At 5820, the wireless device may receive a plurality of signals, associated with a downlink control information. At 5830, the wireless device may determine, based on the plurality of signals, the downlink control information comprising scheduling information. At 5840, the wireless device may, based on the scheduling information indicating an uplink grant or downlink assignment, start the deactivation timer with the first value. At 5850, the wireless device may deactivate the secondary cell based on the deactivation timer expiring.

In an example embodiment, the uplink grant or the downlink assignment is for the secondary cell.

In an example embodiment, the receiving the plurality of signals, at 5820, may be via the secondary cell.

In an example embodiment, the staring the deactivation timer may be after a first number of symbols from the last signal in the plurality of signals.

In an example embodiment, first radio resources, associated with a first signal in the plurality of signals received at 5820, may span one or more first symbols. Second radio resources, associated with a second signal in the plurality of signals received at 5820, may span one or more second symbols. The staring the deactivation timer, at 5840, may be after a first number of symbols from a last symbol in the one or more second symbols.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A.

Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
receiving, by a wireless device, configuration parameters comprising first configuration parameters of a first search space and second configuration parameters of a second search space, wherein the configuration parameters comprise at least one configuration parameter indicating that the first search space and the second search space are used together for reception of downlink control information (DCI);
receiving, via a downlink control channel and based on the first configuration parameters of the first search space, a first signal associated with a first DCI;
receiving, via the downlink control channel and based on the second configuration parameters of the second search space, a second signal associated with a repetition of the first DCI; and
transmitting or receiving a transport block based on the first DCI.

2. The method of claim 1, wherein:
the first search space is associated with a first control resource set (CORESET); and
the second search space is associated with a second CORESET.

3. The method of claim 2, wherein:
the receiving the first signal is based on first resources associated with the first CORESET; and
the receiving the second signal is based on second resources associated with the second CORESET.

4. The method of claim 2, wherein the first CORESET and the second CORESET are in the same slot.

5. The method of claim 2, wherein CORESET configuration parameters of a CORESET comprise a duration parameter indicating a time duration in number of symbols.

6. The method of claim 2, wherein:
the first configuration parameters of the first search space comprise a first parameter indicating a first identifier of the first CORESET; and
the second configuration parameters of the second search space comprise a second parameter indicating a second identifier of the second CORESET.

7. The method of claim 2, wherein:
the first CORESET is associated with a first transmission configuration indicator (TCI) state; and
the second CORESET is associated with a second TCI state.

8. The method of claim 1, wherein the first configuration parameters of the first search space comprise the at least one configuration parameter.

9. The method of claim 1, wherein the first search space and the second search space are wireless device specific search spaces.

10. The method of claim 9, wherein:
the first search space is associated with a first control resource set (CORESET); and
the second search space is associated with a second CORESET.

11. The method of claim 10, wherein the first CORESET and the second CORESET are in the same slot.

12. The method of claim 10, wherein CORESET configuration parameters of a CORESET comprise a duration parameter indicating a time duration in number of symbols.

13. The method of claim 1, wherein the first search space and the second search space are common search spaces.

14. The method of claim 13, wherein:
the first search space is associated with a first control resource set (CORESET); and
the second search space is associated with a second CORESET.

15. The method of claim 14, wherein the first CORESET and the second CORESET are in the same slot.

16. The method of claim 14, wherein CORESET configuration parameters of a CORESET comprise a duration parameter indicating a time duration in number of symbols.

17. The method of claim 1, wherein a parameter in the first configuration parameters of the first search space has the same value as a corresponding parameter in the second configuration parameters of the second search space.

18. The method of claim 17, wherein:
the first search space is associated with a first control resource set (CORESET); and
the second search space is associated with a second CORESET.

19. The method of claim 18, wherein the first CORESET and the second CORESET are in the same slot.

20. The method of claim 18, wherein CORESET configuration parameters of a CORESET comprise a duration parameter indicating a time duration in number of symbols.

* * * * *